United States Patent [19]
Li et al.

[11] Patent Number: 5,982,541
[45] Date of Patent: Nov. 9, 1999

[54] HIGH EFFICIENCY PROJECTION DISPLAYS HAVING THIN FILM POLARIZING BEAM-SPLITTERS

[75] Inventors: Li Li, Orleans; Brian Thomas Sullivan, Gloucester; Jerzy A. Dobrowolski, Ottawa, all of Canada

[73] Assignee: Nationsl Research Council of Canada, Ottawa, Canada

[21] Appl. No.: 09/051,403

[22] PCT Filed: Aug. 13, 1997

[86] PCT No.: PCT/CA97/00567

§ 371 Date: Aug. 27, 1998

§ 102(e) Date: Aug. 27, 1998

[87] PCT Pub. No.: WO98/07279

PCT Pub. Date: Feb. 19, 1998

Related U.S. Application Data

[63] Continuation-in-part of application No. 08/694,415, Aug. 12, 1996
[60] Provisional application No. 60/023,412, Aug. 14, 1996.

[30] Foreign Application Priority Data

Aug. 13, 1996 [CA] Canada .................................. 2183188

[51] Int. Cl.$^6$ .......................... G03B 21/14; G02F 1/1335
[52] U.S. Cl. .......................... 359/497; 359/352; 359/498; 353/20; 349/9
[58] Field of Search .................................. 353/20; 349/5, 349/6, 8, 9, 10; 359/246, 494, 495, 497, 498, 502, 352

[56] References Cited

U.S. PATENT DOCUMENTS

| | | | |
|---|---|---|---|
| 5,181,054 | 1/1993 | Nicolas et al. .............................. | 353/20 |
| 5,453,859 | 9/1995 | Sannohe et al. ........................... | 359/63 |
| 5,517,340 | 5/1996 | Doany et al. .............................. | 359/41 |

FOREIGN PATENT DOCUMENTS

| | | |
|---|---|---|
| 0 361 559 | 4/1990 | European Pat. Off. . |
| 0 560 636 | 9/1993 | European Pat. Off. . |
| WO 88 10545 | 12/1988 | WIPO . |
| WO 93/24857 | 12/1993 | WIPO . |
| WO 97 07518 | 2/1997 | WIPO . |

OTHER PUBLICATIONS

Bergstein, "Novel Thin–Film Polarizer for the Visible and Infrared," Journal of the Optical Society of America, Paper No. TUD18 of the 1971 Spring Meeting of OSA, vol. 61, Apr. 1971.

Lees, et al, "Versatile Frustrated Total Internal Reflection Polarizer for the Infrared," Optics Letters, vol. 4, No. 2, Feb., 1979, pp. 66–67.

*Primary Examiner*—Georgia Epps
*Assistant Examiner*—Margaret Burke
*Attorney, Agent, or Firm*—Marks & Clerk

[57] ABSTRACT

A projection display system includes a thin film polarizing beam splitter/combiner has first and second light transmissive substrates in the form of prisms and a plurality of thin film layers disposed between the prisms. The thin film layers and have predetermined thicknesses and refractive indices which allow unpolarized incident light to be separated into s-polarized and p-polarized light beams. Both frustrated total internal reflection and thin film interference are simultaneously employed to allow s-polarized light to be transmitted and p-polarized light to be reflected over a wide range of wavelengths and angles of incidence. The device further includes two spatial light modulators for encoding an image to be projected. By providing a different signal to each spatial light modulator, a three-dimensional display results.

27 Claims, 44 Drawing Sheets

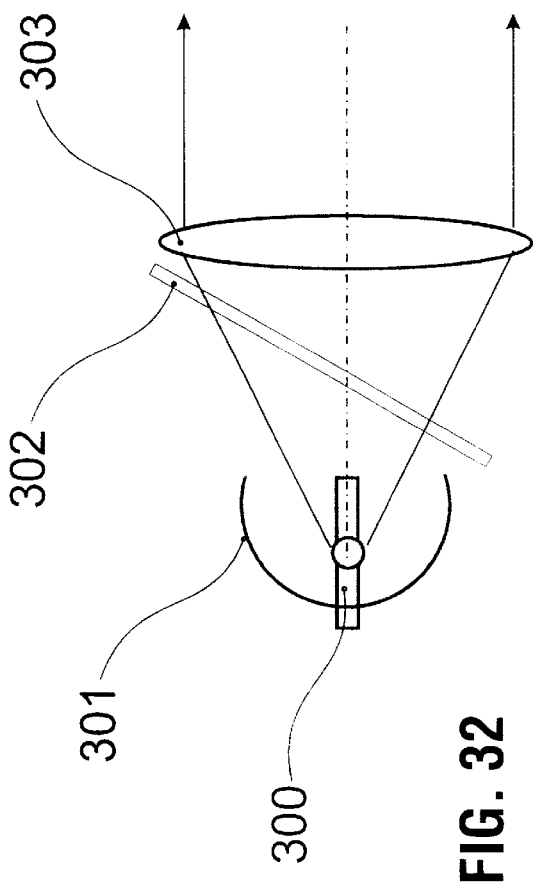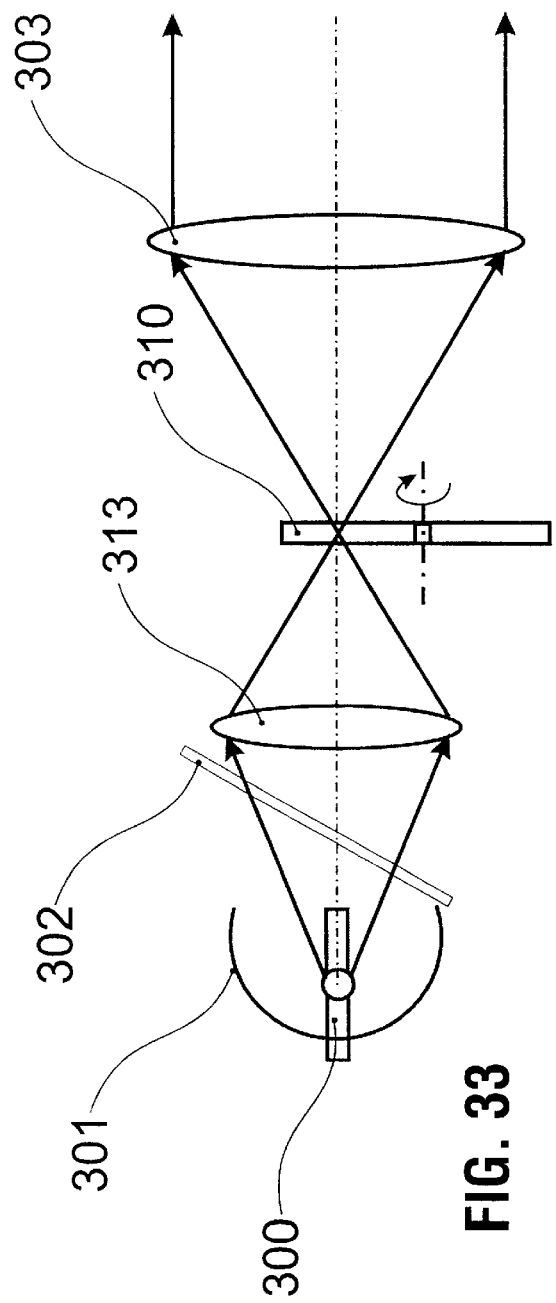

HIGH EFFICIENCY PROJECTION DISPLAYS HAVING THIN FILM POLARIZING BEAM-SPLITTERS

CROSS REFERENCE TO RELATED APPLICATIONS

This application is a 371 of PCT/CA97/00567 which is a continuation-in-part of U.S. patent application Ser. No. 08/694,415, filed Aug. 12, 1996, and claims priority under 35 USC 119(e) of U.S. Provisional application Ser. No. 60/023,412, filed Aug. 14, 1996.

FIELD OF THE INVENTION

Background of the Invention

Polarizers and polarizing beam-splitters (PBS) are optical components that are currently widely used in optical instruments, lasers, electro-optic displays, optical recording and in the fabrication of other optical components. There are several parameters that can be used to describe the performance of a polarizer or polarizing beam-splitter. These parameters are: the wavelength range over which the polarizer or polarizing beam-splitter is effective, the angular field of the incident light in which the polarizer or polarizing beam-splitter is effective and the extinction ratio of the desired polarized light to the unwanted polarized light after the light passes through a polarizer or polarizing beam-splitter.

Commonly available polarizers and polarizing beam-splitters can be divided into several types that depend upon different physical principles: pile-of-plates polarizers, reflection polarizers, dichroic sheet polarizers, polarizers based on birefringent crystals, metallic grid polarizers, and thin film interference polarizers.

Pile-of-plates polarizers consist of a stack of parallel transparent plates that are placed in series. They are mainly used in the ultraviolet and infrared parts of the spectrum. Normally, light is incident at each interface at the Brewster angle such that all the p-polarized light and only some of the s-polarized light is transmitted. If a sufficient number of such plates are placed in series, the transmitted light can be highly polarized and have a high extinction ratio. Although these polarizers act over a very broad spectral region, their angular field is limited.

Reflection polarizers are based on a similar principle but use light reflected from one or more surfaces to polarize a light beam. One advantage of this polarizer is that its performance is independent of the wavelength. However, its performance is very sensitive to the angle of the incident beam. An additional complication is that the reflected light propagates in a different direction from that of the incident light.

Dichroic polarizers are both wide-angle and broad-band and are based on the absorption of light of one polarization. They can be very thin and are convenient to use. They are made of plastic and can be produced in large sizes and at low cost. However, at least 50% of light is lost by absorption in these polarizers and the extinction ratio is not very high. Therefore, these polarizers are typically used in low power applications in which damage to the device due to light absorption is not a concern.

Polarizers based on birefringent materials also perform well over a broad band of wavelengths and a wide range of angles. These polarizers are based on the total internal reflection of light in birefringent crystals. Normally these polarizers are comprised of two birefringent crystal prisms that are in contact with each other. The optical axes of the two prisms are arranged in such a way that the refractive indices at both sides of the contact surface are the same for the ordinary light (polarized in one direction) and are higher in the first prism and lower in the second prism for the extraordinary light (polarized in the other direction), or vice versa. When unpolarized light is incident upon the interface between the two prisms and if the angle of incidence is larger than the critical angle for the extraordinary light, the ordinary light will be substantially transmitted while the extraordinary light will be totally reflected. Therefore, a very high extinction ratio is achieved. Many different arrangements for such polarizers exist. However this type of polarizer is costly and cannot be made in large sizes because of the limited availability of birefringent crystal materials.

Metallic grid polarizers transmit light whose electric field vector is parallel to the grid lines and reflect light whose electric field vector is perpendicular to the grid lines. These polarizers are effective over a wide spectral region and a wide range of angles. However, because of the difficulty of making large grids of very small spacings, their use is confined to the infrared or longer wavelengths.

Multilayer thin film plate polarizers basically consist of quarterwave layers and generally have a high extinction ratio. Unfortunately, they operate over a narrow spectral region and have a small angular field. Another type of thin film polarizers invented by MacNeille (U.S. Pat. No. 2,403, 731), makes use of the Brewster angle. MacNeille polarizers are comprised of thin films embedded between two prisms and their extinction ratio increases with the number of layers. MacNeille polarizers operate over a very broad spectral region, but are only effective over a very narrow range of angles, usually the angular field measured in air is of the order of ±3°. In addition, the extinction ratios for the reflected and transmitted beams are different. There is some contamination of s-polarized light in the transmitted p-polarized light. Mouchart et. al, in a paper entitled "Modified MacNeille cube polarizers for a wide angular field," Appl. Opt. 28, 2847 (1989), have shown that it is possible to broaden the angular field of MacNeille polarizers, but only at the expense of reducing the width of the spectral region over which they are effective.

D. Lees and P. Baumeister, in a paper entitled "Versatile frustrated-total-reflection polarizer for the infrared," Opt. Lett. 4, 66 (1979) describe a thin film infrared polarizer based on the principle of frustrated total internal reflection Fabry-Perot filters. In this device a high refractive index spacer layer is sandwiched between two low refractive index layers to form an etalon that is deposited onto the surface of a germanium prism. The light is incident at an angle that is greater than the critical angle—one that is chosen in such a way that the phase difference between s- and p-polarized light is 180°. Therefore, if the Fabry-Perot etalon condition is satisfied for the p-polarization, all the p-polarized light will be transmitted while the s-polarized light is reflected, and vice versa. The phase difference between the s-polarized and p-polarized light depends on the refractive index of the substrate and the angle of incidence. Because of the limited range of refractive indices of materials for the visible part of the spectrum, such polarizers can only be constructed for the infrared. Furthermore, because these polarizers are essentially narrow band filters, the band-width is small. Another disadvantage of these polarizers is that they also have a small angular field. This is because the phase change on reflection and the optical thickness of the spacer layer change with angle in opposite directions.

Polarizers are essential optical components in liquid crystal displays (LCDs). Currently, most liquid crystal displays are based on twisted nematic liquid crystals that require the use of two polarizers. The principles and advantages/disadvantages of LCDs are described in the following prior art references. L. E. Tananas Jr., *Flat panel displays and CRTs,* Van Nostrand Reinhold Company, New York, 1985. Terry J. Scheffer et al, "Supertwisted-Nematic (STN) LCDS," SID'95 Seminar Lecture Notes, 1995. Webster E. Howard, "Supertwisted-Nematic (STN) LCDS," SID'95 Seminar Lecture Notes, 1995. Twisted nematic (TN) liquid crystal displays can be passive or active matrix addressed. A basic TN LC cell or picture element (pixel) consists of a liquid crystal layer and two transparent electrodes, and they are is normally sandwiched by the first polarizer and the second polarizer (also called analyzer). The transmitting axes of the two polarizers are perpendicular (or parallel) to each other. Unpolarized incident light passes through the first polarizer and becomes linearly polarized. When no voltage is applied to the liquid crystal layer, the liquid crystal acts as a halfwave plate and rotates the polarization of the incident polarized light by 90°. The light will therefore be transmitted by the second polarizer; and, the pixel is said to in the "on" state. When a voltage is applied to a liquid crystal pixel, the liquid crystal molecules align themselves with the electric field and the light does not undergo rotation in the plane of polarization. In this instance, the light is blocked by the second polarizer and the pixel is in an "off" state.

Currently, dichroic sheet polarizers are the only choice for both flat panel and projection LCD displays due to their wide angular fields and broad band widths. The reason for this is that other currently available polarizers either have limited angular field, limited band width or are limited in size or are too expensive to use (birefringence crystals). However, dichroic sheet polarizers are based on the absorption of light of one polarization in order to obtain polarized light. This absorption causes two problems: 50–54% of the incident light is absorbed by the first polarizer and this makes the display less energy efficient; and, the light absorbed by the first polarizer and by the second polarizer (from the "off" pixels) is transformed into heat which can cause the polarizer's performance to deteriorate. This problem can be very serious in projection displays where high power light beams are applied.

Although LCDs are relatively more efficient than other types of flat panel displays such as those based on TFELs and on plasmas, the typical total transmission of light in an active matrix addressed direct-view flat panel LCD is still only about 3–7%. The total transmission of LCD projection displays is higher because of the use of three panels. It follows from the above that both problems mentioned are due to the absorption of light in dichroic sheet polarizers and so their elimination or replacement by polarizers based on other principles is highly desirable.

To avoid the use of dichroic sheet polarizers, other types of LCDs that do not use the polarization scheme have been proposed. For example, polymer dispersed LCDs (PDLCDs) which use light scattering to distinguish between an "on" or "off" pixel have been demonstrated. However, PDLCDs do not have high contrast and are still technically immature compared to TN LCDs.

Another way to overcome the light loss problem is to use a polarization recovery scheme; such schemes are proposed by Noriji Oishi, "Polarization forming optical device," U.S. Pat. No. 5,359,455, 1994., by Masso Imai, "LCD Projector," U.S. Pat. No. 5,283,600, 1994; and by Glueck, E. Ginter, E. Lueder and T. Kallfass, "Reflective TFT-Addressed LC Light-Valve TV Projectors with High Light efficiency," SID'95, 235238(1995). In these schemes, the polarization plane of the light with the unwanted polarization is rotated by 90° and the light is then redirected into the optical image system. Therefore, no light is lost. However, only NEC has thus far offered a commercial LCD projection display using a polarization recovery scheme. The above polarization recovery schemes require the use of thin film MacNeille polarizing beam-splitters which have a very small angular field (±2° in glass) and their extinction ratio is good for only one polarization and is not so good for the other polarization. Because of this, extra dichroic sheet polarizers are needed to clean up the beam. Furthermore, the above schemes do not solve the problem of the light absorption by the second polarizers.

Fuad E. Doany et al describes a way to form high performance projection display with two light valves, U.S. Pat. No. 5,517,340, issued May 14, 1996. They use one polarizing beam-splitter to split light into two polarized beams and then direct the beams to the corresponding light valves. The images from the light valves are reflected and then combined by the PBS to form a single image which is projected onto a screen. In their display, they use polarizing beam-splitters (PBS) in a cube form that are based on conventional thin film PBSs. According to the limited performance of the conventional PBSs, displays based on this approach will suffer poor image contrast and low efficiency and can not be made practical. This is because of the low extinction ratios and limited angular field of the conventional PBSs.

To summarize, all proposed approaches to overcome problems associated with the use of dichroic polarizers in LCDs will require the use of non-absorbing, broad-band and high extinction ratio polarizing beam-splitters. Unfortunately, none of the current available polarizers or polarizing beam-splitters meet all the above requirements.

Li Li and J. A. Dobrowolski have proposed a method of designing of broad-band and wide-angle polarizing beam-splitters, see the paper "Visible broadband, wide-angle thin film multilayer polarizing beam splitter," Appl. Opt. Vol. 35,n.13,p2221(1996). The proposed polarizing beam-splitters are better than the conventional MacNeille polarizers; however, extra dichroic sheet polarizers are still required.

Therfire an object of the invention is to provide a high efficiency projection display system that will work over a wide range of angles.

SUMMARY OF THE INVENTION

According to the present invention there is provided a projection display system comprising a light source for generating an input beam of light; a polarizing beam discriminator employing frustrated total internal reflection and thin film interference to discriminate between s and p polarized light, said discriminator separating s and p polarized light beams from said input beam; spatial light modulator means for encoding an image onto said respective s and p polarized beams; means for combining said encoded s and p polarized beams into an output beam, said combining means employing frustrated total internal reflection and interference; and means for focussing the output beam onto a display means.

The means for combining the encoded beams is preferably the same discriminator employed to separate the uncoded beams in to s- and p- polarized beams, in which case the encoded beams are reflected back into the device in accordance with a scheme that depends on the type of spatial light modulators employed. However, this is not necessary and it is equally possible to combine the beams with a second similar polarizing beam discriminator downstream of the first. Instead of reflecting the encoded beams back into the first device, the encoded beams are transmitted to a second device where they are combined into the output beam.

The invention makes use of a thin film polarizing device of the type claimed per se in our co-pending application Ser. No. PCT/CA96/00545. This device has a thin film arrangement for separating s-polarized light and p-polarized light by reflecting p-polarized light and transmitting s-polarized light. The device comprises first and second light transmissive substrates; and, a plurality of thin film layers disposed between the first and second light transmissive substrates. The thin film layers comprise high refractive index layers and low refractive index layers, the high refractive index layers having one or more different refractive indices, and the low refractive index layers having one or more different refractive indices; the first and second light transmissive substrates, each in the form of a prism having a refractive index greater than the refractive index of each of the low refractive index layers; the prisms being shaped in such a manner as to allow the incident light to be incident upon the thin film layers at a plurality of angles greater than or equal to the critical angle for the highest refractive index of the low refractive index layers; the thickness of the low refractive index layers of the plurality of thin film layers being small enough so that light incident upon the thin film layers at an angle greater than the critical angle can be partially coupled out through the low refractive index layers such that frustrated total internal reflection occurs, thus permitting interference to take place between the light reflected at the interfaces of all the thin film layers, and in addition, the thicknesses of the thin film layers being such that the equivalent optical admittance of the plurality of the thin film layers for s-polarized light is substantially the same as the optical admittance of the substrate for s-polarized light for a wide range of angles of incidence and a broad band of wavelengths when the incident light is incident upon the low refractive index layers at an angle greater that the critical angle, thereby allowing substantially all the incident s-polarized light to be substantially transmitted; the plurality of the thin film layers having an equivalent optical admittance for p-polarized light that is substantially different from the optical admittance of the substrate for p-polarized light for a wide-range of angles of incidence and a broad-band of wavelengths and thus substantially reflecting all the incident p-polarized light. This polarizing beam-splitter 30 lends itself to use in various embodiments of the novel 2-D and 3-D projection system claimed herein.

The invention makes provides a high efficiency projection display system that employs a non-absorbing, broad-band, wide-angle and high extinction ratio thin film polarizing beam-splitter. The display system that utilizes both s-polarized and p-polarized light and projects both two-dimensional(2D) and three-dimensional(3D) images.

Aspects of this invention make use of a novel design of a very broad band (wavelength ratios as large as 50:1), very wide angular field (up to ±61° in the infrared) thin film polarizing device. These thin film polarizing devices are based on frustrated total internal reflection. However, the design approach permits polarizers with varying performance specifications to be produced for the ultraviolet, visible, infrared, far infrared to the microwave spectral regions.

BRIEF DESCRIPTION OF THE DRAWINGS

The present invention and exemplary embodiments of the invention will be described in accordance to the following drawings in which:

FIG. 32. shows a Light element 1 with a white lamp;

FIG. 33. shows a Light element 2 with a rotating colour filter wheel;

DETAILED DESCRIPTION OF THE INVENTION

The thin film polarizing device employed in the present invention is based not only on the principle of the frustrated total internal reflection but also on the interference of light in thin films. Because of this, the thin film polarizing devices are more versatile than devices obtained by conventional thin film design methods. General references to the design of thin film coatings including thin film polarizers or polarizing beam-splitters, can be found in the book entitled "Optical interference filters," written by H. A. Macleod (MacGraw Hill, 1986, New York). The phenomenon of frustrated total internal reflection is described in the paper "Some current developments in multilayer optical filters," by A. F. Turner in J. Phys. Radium 11, 440(1950), and related applications can also be found in the paper "Optical tunneling and its applications in optical filters," by P. W. Baumeister in App. Opt. 6, 897(1967).

Clearly, the interference effect of light will not only depend on the reflection coefficients $r_1$ and $r_2$, but also on the phase difference $\Delta\phi$ between two adjacent reflected or transmitted beams. The phase difference $\Delta\phi$ can be expressed by the following equations:

$$\begin{cases} \Delta\varphi = \varphi_2 - \varphi_1 + \delta_1 \\ \delta_1 = \frac{2\pi}{\lambda} n_1 d_1 \cos\theta_1 \end{cases} \quad (5)$$

where $\lambda$ is the wavelength of the incident light and $\delta_1$ is the phase thickness of the layer 4.

Figure 1:
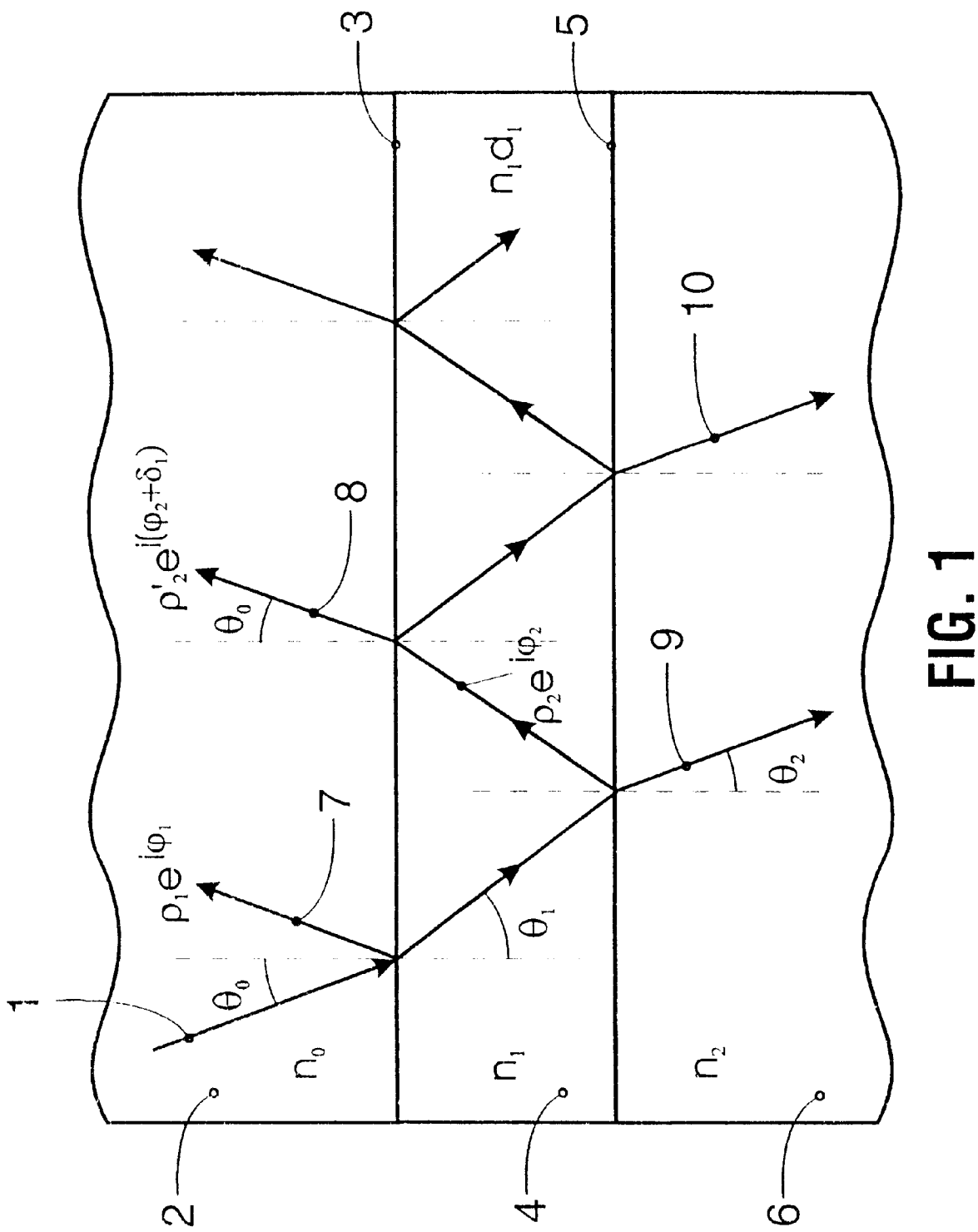
FIG. 1. is a schematic view showing the beams of light transmitted and reflected by the interfaces of a single thin film structure.
Figure 2:
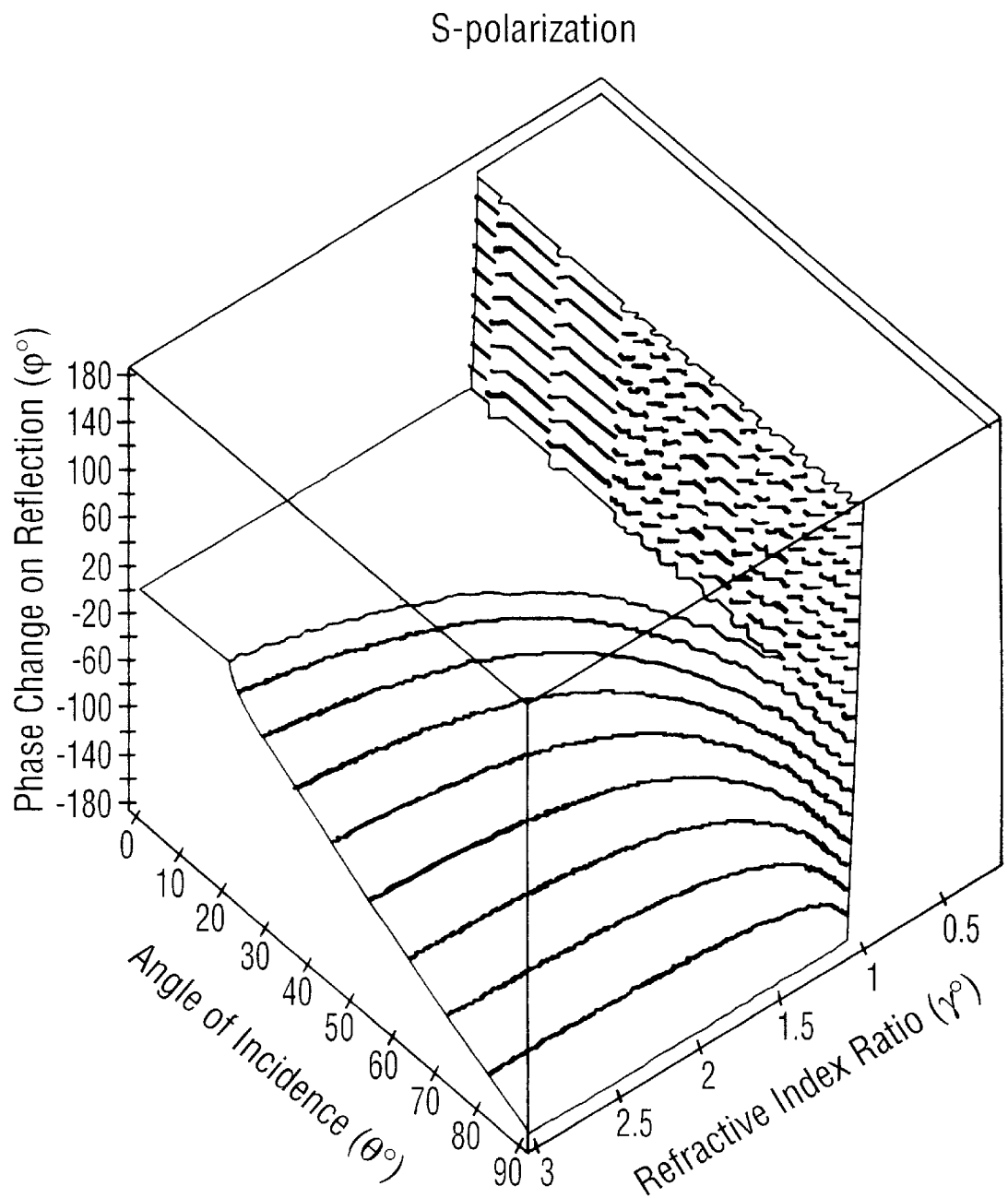
FIG. 2. is a three-dimensional view of the phase change on reflection as a function of the angle of incidence and of the refractive index ratio for s-polarized light.
Figure 3:
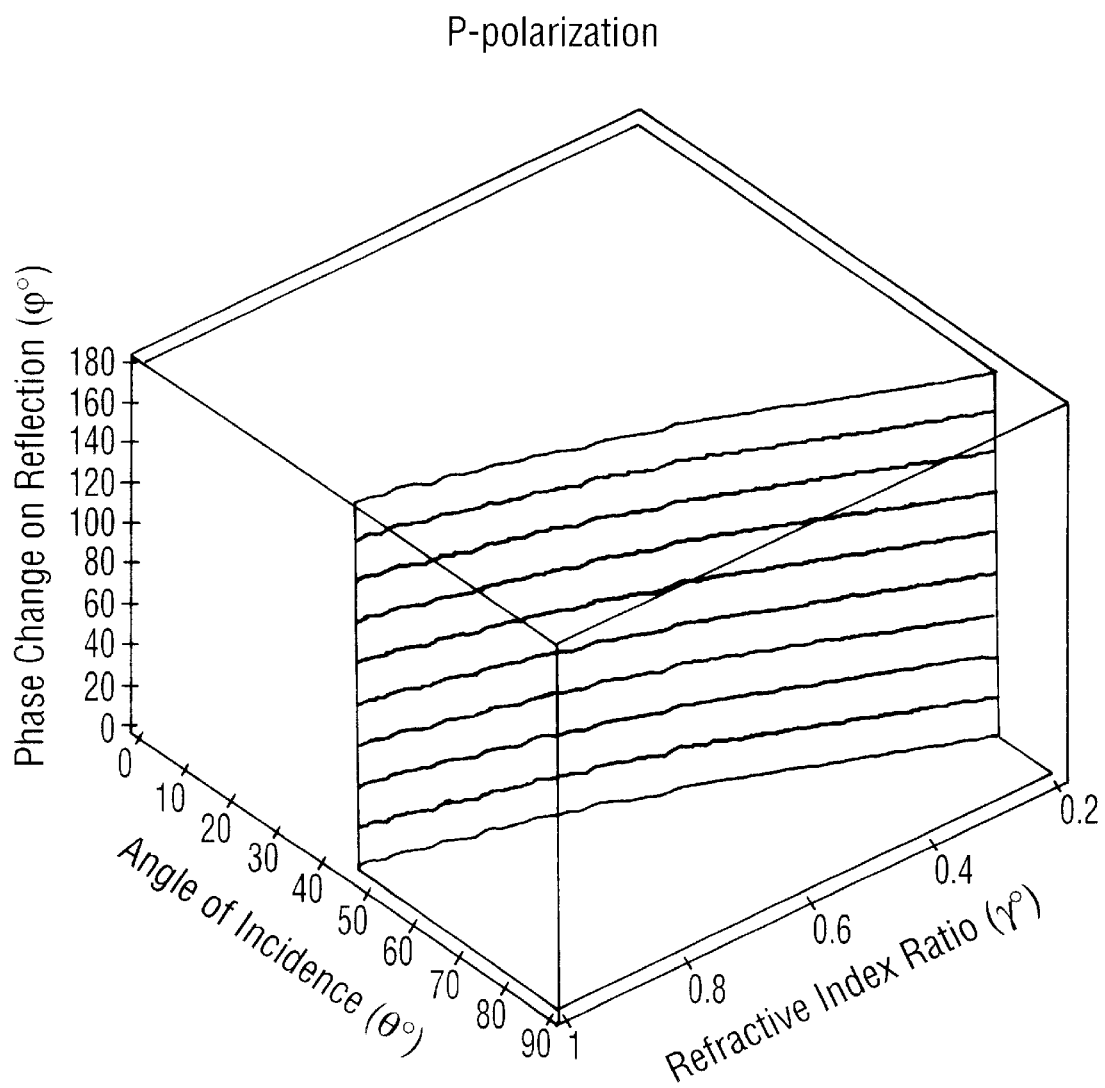
FIG. 3. is a three-dimensional view of the phase change on reflection as a function of the angle of incidence and of the refractive index ratio for p-polarized light, the refractive index ratio γ is between 0.2 and 1.

In conventional thin film designs, either the angles of incidence of light are less than the critical angle or no critical angles exist. This means that for non-absorbing materials the phase changes on reflection $\phi_1$ and $\phi_2$ for both s- and p-polarized light are either 0° or 180° as shown in FIG. 2 and FIG. 3. This is because $\eta_0$, $\eta_1$ and $\eta_2$ are real numbers. Thus, once the coating materials have been chosen, phase changes on reflection at the interfaces have little effect on the thin film design. Only variations in the layer thicknesses can be used to obtain a desired performance.

Figure 4:
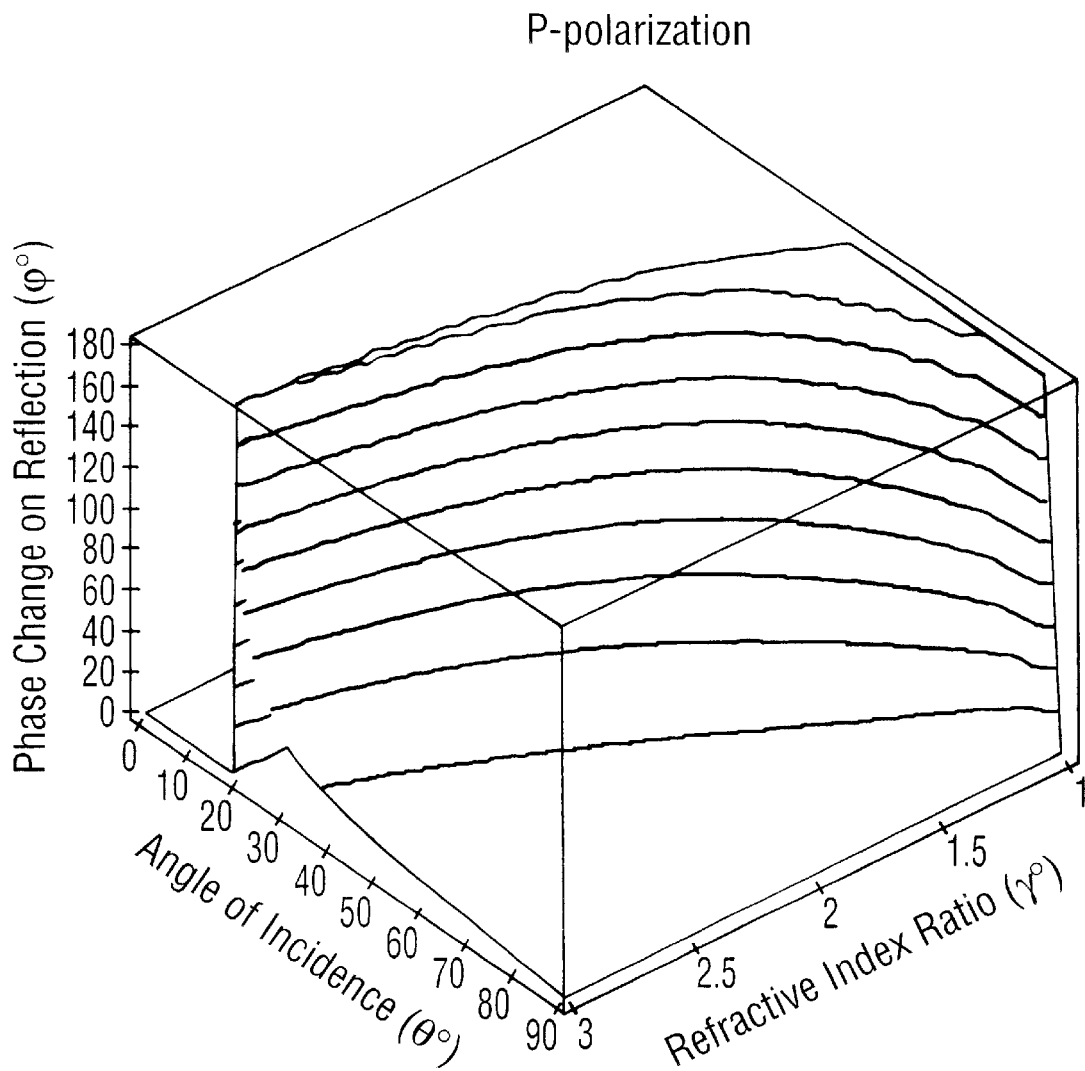
FIG. 4. is a three-dimensional view of the phase change on reflection as a function of the angle of incidence and of the refractive index ratio for p-polarized light, the refractive index ratio γ is between 1 and 3.
Figure 5:
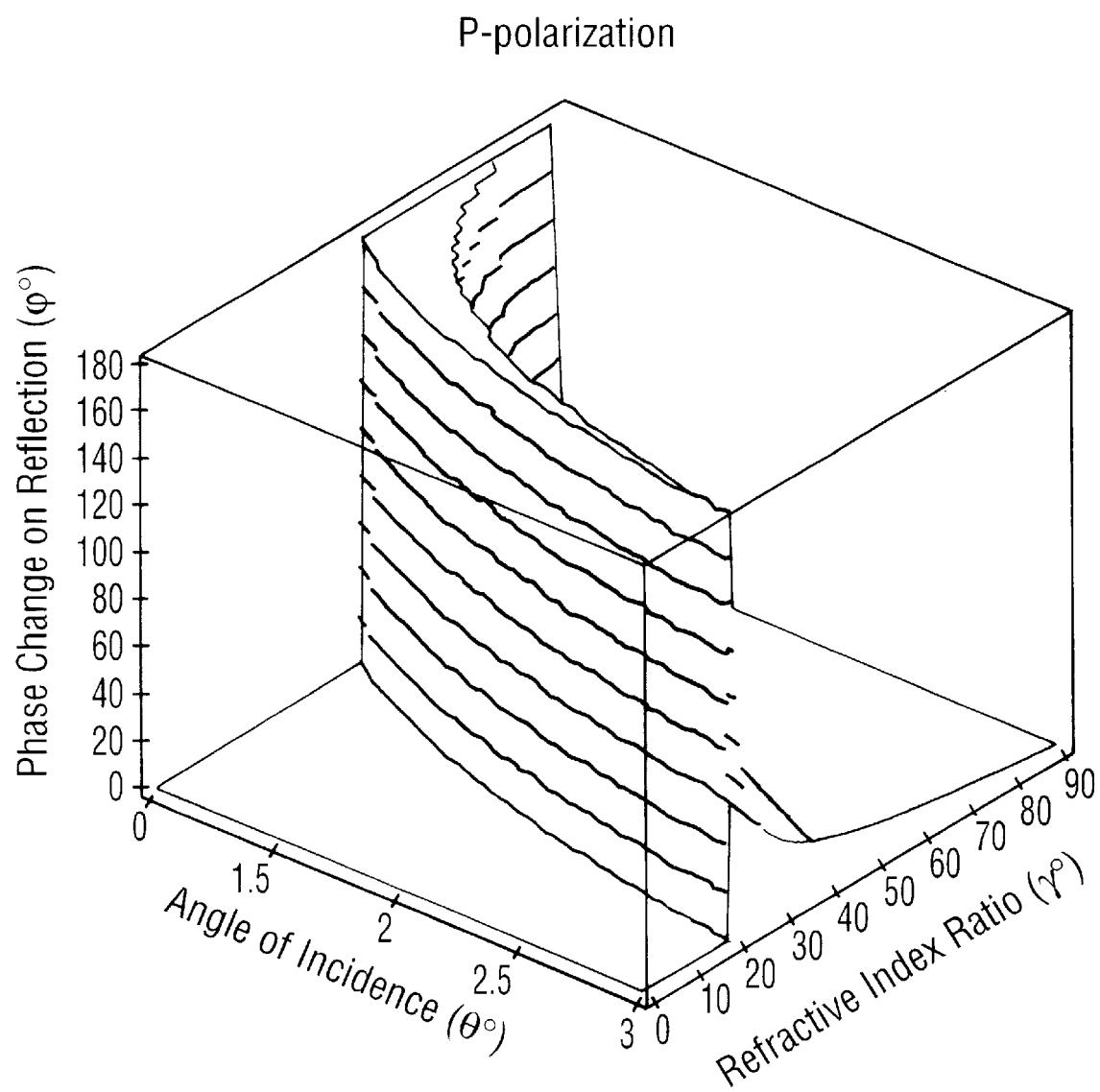
FIG. 5. shows another three-dimensional view of the phase change on reflection for p-polarized light as in FIG. 4.

However, when $n_0 > n_1$ and when the angle of incidence $\theta_0$ is larger than the critical angle $\theta_c = \sin^{-1}(n_0/n_1)$, the reflection coefficient $r_1$ at the interface 3 will no longer be a real number. As a consequence, the phase change on reflection will also be much more complicated. Three-dimensional diagrams of the phase changes on reflection for both s- and p-polarized light, respectively, at the interface 3, are plotted as a function of the angle of incidence $\theta_0$ and of the refractive index ratio $\gamma$ ($\gamma=n_0/n_1$) for s-polarized light (FIG. 2) and p-polarized light (FIGS. 3, 4 and 5). These figures are particularly revealing of phenomena that are utilized in accordance with this invention:

1. As stated before, when the angle of incidence $\theta_0$ is less than the critical angle $\theta_C$, the phase change on reflection for s-polarized light is 0° (FIG. 2). The phase change on reflection for p-polarized light is 0° when the angle of incidence $\theta_0$ lies between 0° and the Brewster angle $\theta_B = \tan^{-1}(n_0/n_1)$ ($\theta_C > \theta_B$) and it is 180° when the angle of incidence is between the Brewster angle $\theta_B$ and the critical angle $\theta_C$ (FIG. 4).

2. When the angle of incidence $\theta_0$ is larger than the critical angle $\theta_C$ the phase change on reflection for s-polarized light changes from 0° to 180° as the angle of incidence $\theta_0$ increases from the critical angle $\theta_C$ to 90° (FIG. 2). For p-polarized light, the phase change on reflection decreases from 180° to 0° as the angle of incidence $\theta_0$ increases from the critical angle $\theta_C$ to 90° (FIGS. 4 and 5).

Some conclusions can be also drawn from the above diagrams. First, the phase change on reflection increases or decreases rapidly when the angle of incidence $\theta_0$ is close to the critical angle $\theta_C$ or when the refractive index ratio $\gamma$ is small. In other words, under those conditions, the dispersion of the phase change on reflection with the angle of incidence is very large. Second, if the thickness of the low refractive index layer 4 is small compared to the wavelength of the incident light, some light will leak out from the low refractive index layer 4 and enter the exit medium 6 even though the total internal reflection condition is satisfied. This phenomenon is called frustrated total internal reflection. Third, and most importantly, the phase change on reflection characteristics for s- and p-polarized light are very different.

The above phenomena make it possible to design thin film coatings that are based not only on the interference effect of light in thin films but also on the frustrated total internal reflection of light in thin films. Therefore, in a multilayer structure consisting of alternating low and high refractive index layers, phase changes on reflection at the interfaces as well as the layer thicknesses contribute to the interference effects. This provides an extra degree of freedom for the design of optical thin film coatings. The thin film coatings can thus have very different requirements for s- and p-polarized light.

It is evident from FIGS. 2, 4 and 5 that, when light passes from a high refractive index layer to a low refractive index layer and when the angle of incidence is larger than the critical angle, the phase changes on reflection for the s- and p-polarized light are no longer 0° or 180°. Since the phase changes on reflection are different, such multilayer structures are useful for the design of thin film polarizing devices in accordance with the present invention.

In multilayer structures of this type, low and high refractive index layers affect the propagation of light very differently. When the angle of incidence is larger than the critical angle, for the low refractive index layer, the optical admittance $\eta_L$ and the phase thickness $\delta_L$ are imaginary. Hence, the layer thickness of the low refractive index therefore purely affect the amplitude of the reflected light. In other words, the low refractive index layer acts as an attenuator or behaves like a metal layer, but without the effect of light absorption. If the thickness of the low refractive index layer is small compared to the wavelength of light, frustrated total internal reflection will occur at all the $n_H/n_L$ interfaces and some of the light will leak out from the low refractive index layers and enter the adjacent layers. The amount of light leakage depends on the thickness of the low refractive index layer and also on the angle of incidence. On the other hand, at $n_L/n_H$ interfaces, the total internal reflection condition of light is not satisfied, and therefore, the high refractive index layers act as phase adjusters. Their layer thicknesses contribute to the phase changes on reflection and do not attenuate the light. All the light beams reflected from the $n_H/n_L$ and $n_L/n_H$ interfaces will interfere with each other and, as a result, modify the reflection and transmission of the light.

The above phenomena of the interference and frustrated total internal reflection in thin films is fully utilized in the thin film polarizing device in accordance with the present invention. Several approaches can be used for the design of such thin film polarizing devices. For example, one can use one of various optimization methods described in the paper by J. A. Dobrowolski and R. A. Kemp, Appl. Opt. 29, 2876(1990), or the needle design method described by S. A. Furman and A. V. Tikhonrovov in the book entitled "Optics of multilayer system," published by Edition Frontiers in 1992, Gif-sur-Yvette, or the equivalent optical admittance method as described in the book by J. Tang and Q. Zhen, entitled "Applied thin film optics," published by Shanghai Publishing House of Sciences and Technologies in 1984, Shanghai. Of these methods, the equivalent optical admittance method, applied to a symmetrical periodic layer structure is the best for a good understanding of the physics of the thin film polarizing device in employed in the present invention.

Figure 6:
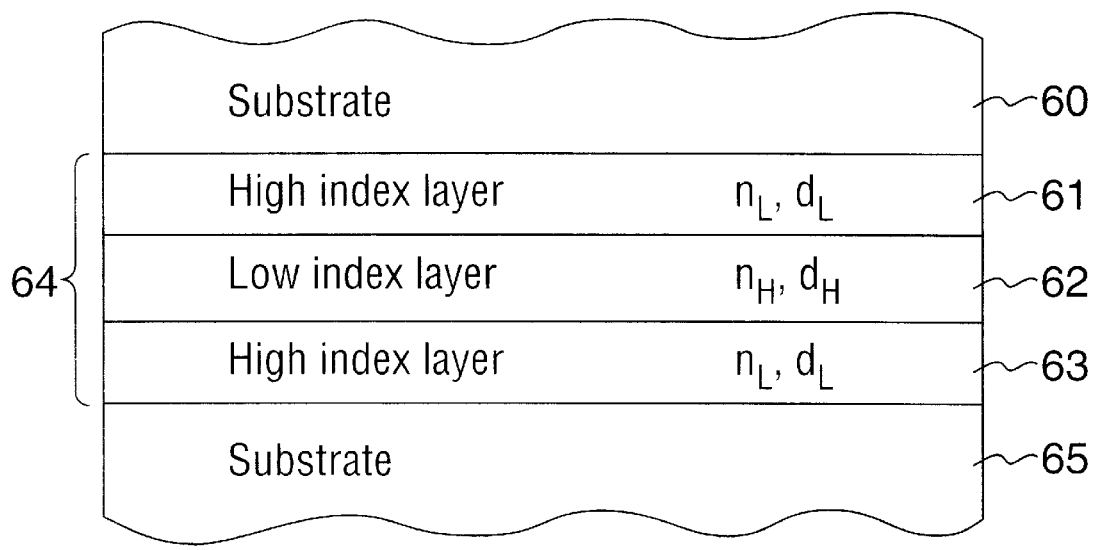
FIG. 6. is a cross-sectional view of a basic thin film structure having low, high and low refractive index layers embedded between two substrates.
Figure 7:
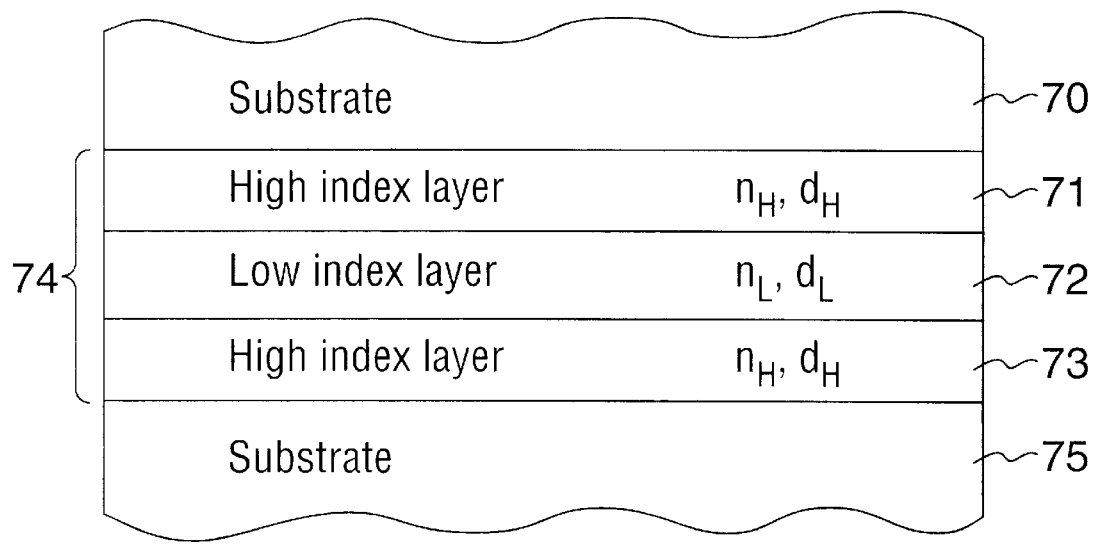
FIG. 7. is a cross-sectional view of another basic thin film structure having high, low and high refractive index layers embedded between two substrates.

In FIG. 6, a basic thin film symmetrical structure 64 is comprised of a low refractive index layer 61, a high refractive index layer 62 and a low refractive index layer 63 and the layers are embedded between two identical substrates 60 and 65. The two low refractive index layers 61 and 63 are identical. Alternatively, as shown in FIG. 7, a basic thin film symmetrical structure 74 consists of a high refractive index layer 71, a low refractive index layer 72 and a high refractive index layer 73. Layers 71 and 73 are identical and all three layers are embedded between two identical substrates 73 and 75. The analysis for both structures 64 and 74 is similar. In order to simplify the explanation process, in the following text, the analysis for the structure 64 shown in FIG. 6 will be discussed in detail and the analysis for structure 74 is similar. The equivalent optical admittance E and the equivalent phase thickness Γ of the basic thin film symmetrical structure 64 can be calculated from the equations derived in the book "Applied Thin Film Optics" by J. Tang.

tion Γ for both s-polarized light and p-polarized light are plotted in FIGS. 8 and 9 and FIGS. 10 and 11, respectively. It is clear from the above equations that both the equivalent optical admittance and the equivalent phase thickness Γ could be complex. Hence, both the real and the imaginary parts of the two parameters are plotted in the above diagrams.

$$\begin{cases} E = \sqrt{\dfrac{\eta_L^2\left(\sin 2\delta_L\cos\delta_H + \dfrac{1}{2}(\eta_L/\eta_H + \eta_H/\eta_L)\cos 2\delta_L\sin\delta_H - \dfrac{1}{2}(\eta_L/\eta_H - \eta_H/\eta_L)\sin\delta_H\right)}{\left(\sin 2\delta_L\cos\delta_H + \dfrac{1}{2}(\eta_L/\eta_H + \eta_H/\eta_L)\cos 2\delta_L\sin\delta_H + \dfrac{1}{2}(\eta_L/\eta_H - \eta_H/\eta_L)\sin\delta_H\right)}} \\ \Gamma = \arccos\left(\cos 2\delta_L\cos\delta_H - \dfrac{1}{2}(\eta_L/\eta_H + \eta_H/\eta_L)\sin 2\delta_L\sin\delta_H\right) \end{cases} \quad (6)$$

where $\eta_L$, $\eta_H$, $\delta_L$ and $\delta_H$ are given by:

$$\begin{cases} \eta_L = n_L\cos\theta_L \\ \eta_H = n_H\cos\theta_H, \text{ for s-polarized light} \\ \eta_0 = n_0\cos\theta_0 \end{cases} \quad (7)$$

$$\begin{cases} \eta_L = n_L/\cos\theta_L \\ \eta_H = n_H/\cos\theta_H, \text{ for p-polarized light} \\ \eta_0 = n_0/\cos\theta_0 \end{cases} \quad (8)$$

$$\begin{cases} \delta_L = 2\pi n_L d_L \cos\theta_L/\lambda \\ \delta_H = 2\pi n_H d_H \cos\theta_H/\lambda \end{cases} \quad (9)$$

When the angle of incidence $\theta_0$ is larger than the critical angle for the low refractive index layer, $\eta_L$ and $\cos\theta_L$ will be imaginary, and $\eta_H$ and $\cos\theta_H$ will be real.

In order to transmit all the s-polarized light, the equivalent optical admittance E of the basic structure 64 should be equal to the optical admittance of the substrate $\eta_0$ for the s-polarized light, i.e., $$E^s = n_0 \cos\theta_0 \quad (10)$$

For a given angle of incidence $\theta_0$ and a wavelength of incident light, it is possible to find solutions for the layer thicknesses $d_1$ and $d_2$ that satisfy Eq. (10). Because there are two variables and only one equation to satisfy, there will be an infinite number of solutions. Therefore, it is possible to specify a second angle of incidence or a second wavelength in order to broaden the angular field or the band width of the thin film polarizing device.

It can be shown that a multilayer structure consisting of S periods of the above basic structure can be replaced by a single layer with the same equivalent optical admittance E and an equivalent phase thickness of $S^*\Gamma$. The reflectance and transmittance of such multilayer structure for s- and p-polarized light are best calculated using a computer program based on the matrix method as described in the book "Optical interference filters" by H. A. Macleod.

Figure 8:
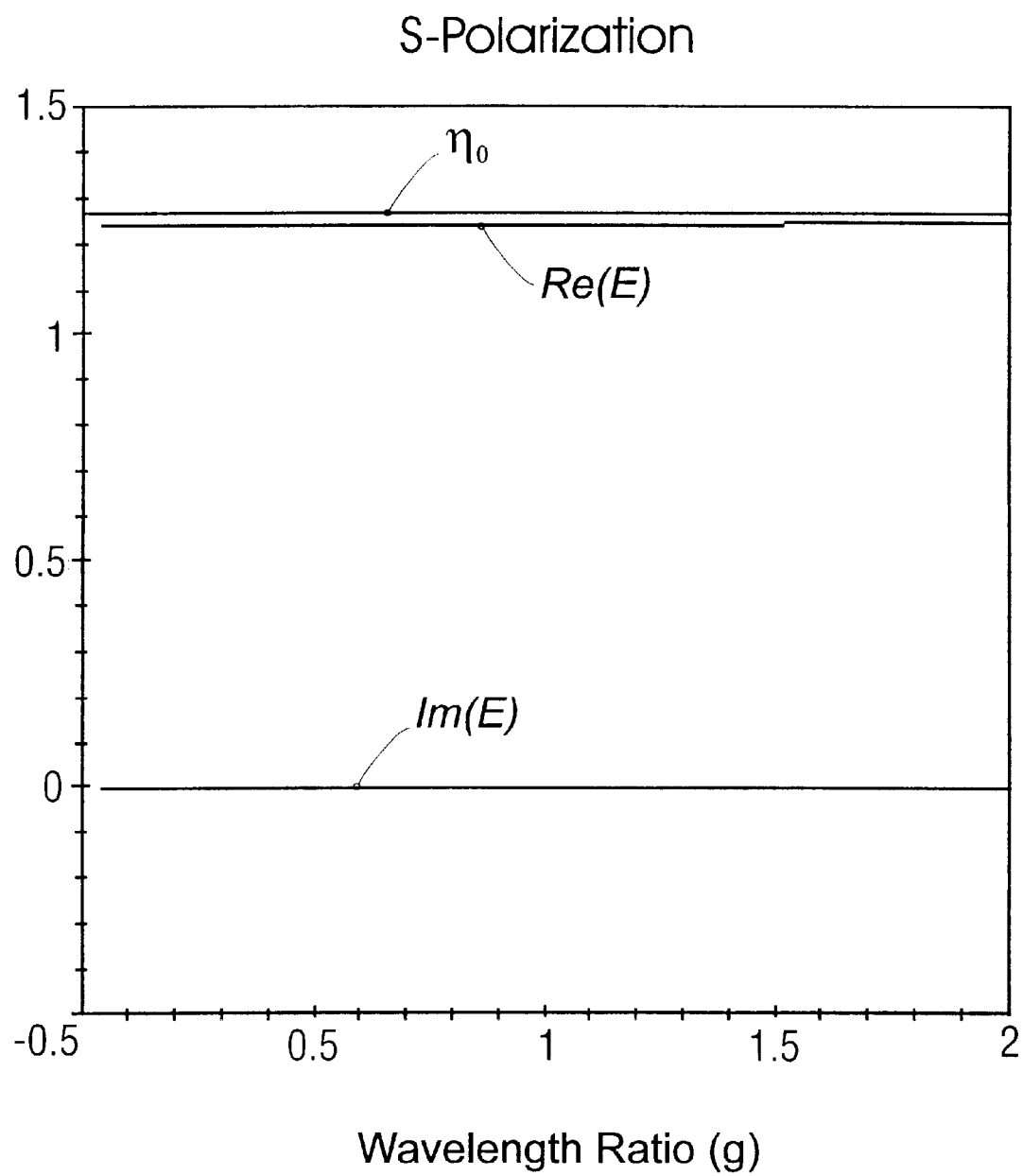
FIG. 8. shows the real and imaginary parts of the equivalent optical admittance of a basic symmetrical three-layer structure and the optical admittance of the substrate as a function of wavelength ratio for s-polarized light.
Figure 9:
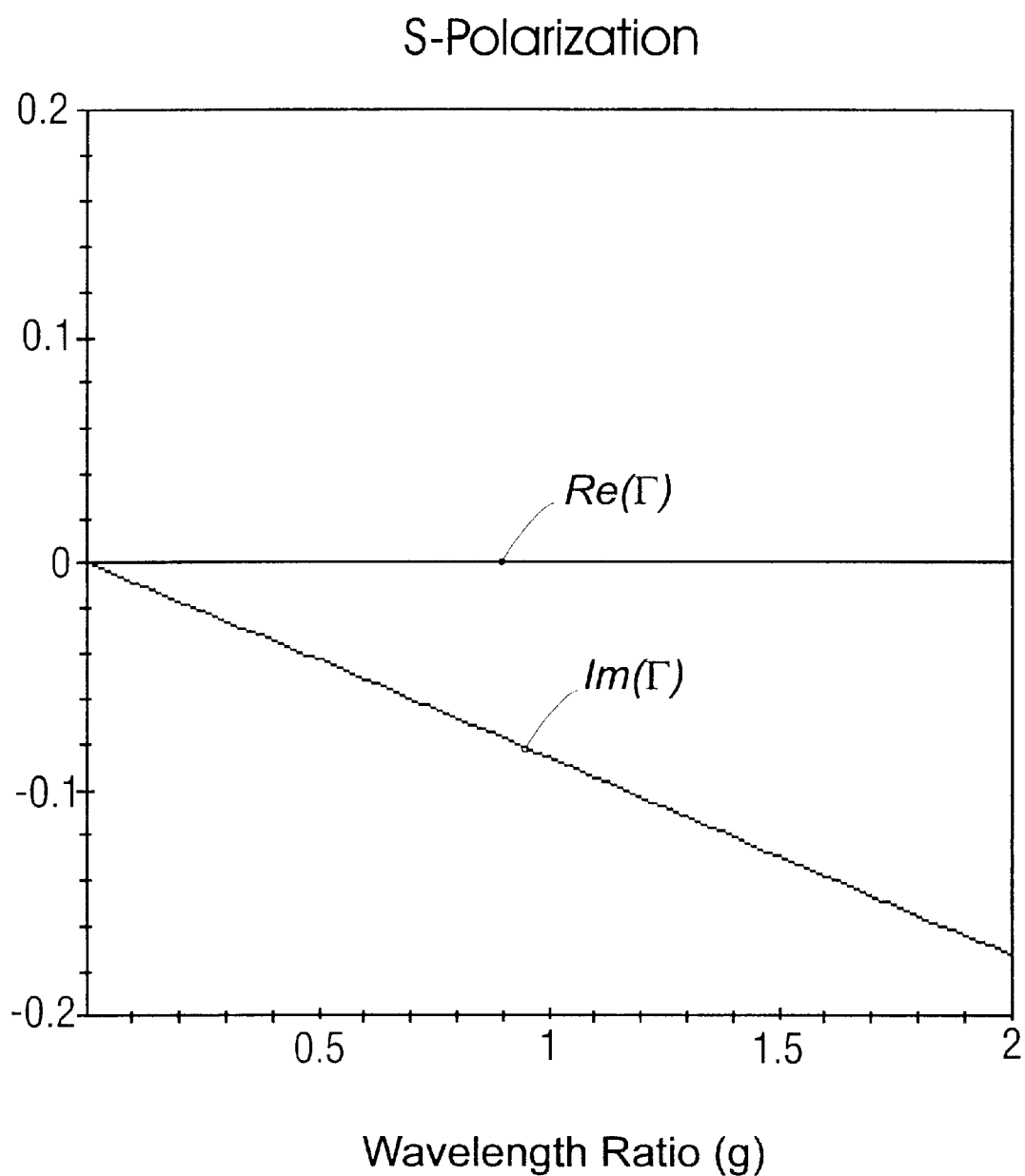
FIG. 9. shows the real and imaginary parts of the equivalent phase thickness of the same basic structure as in FIG. 8 for s-polarized light.
Figure 12:
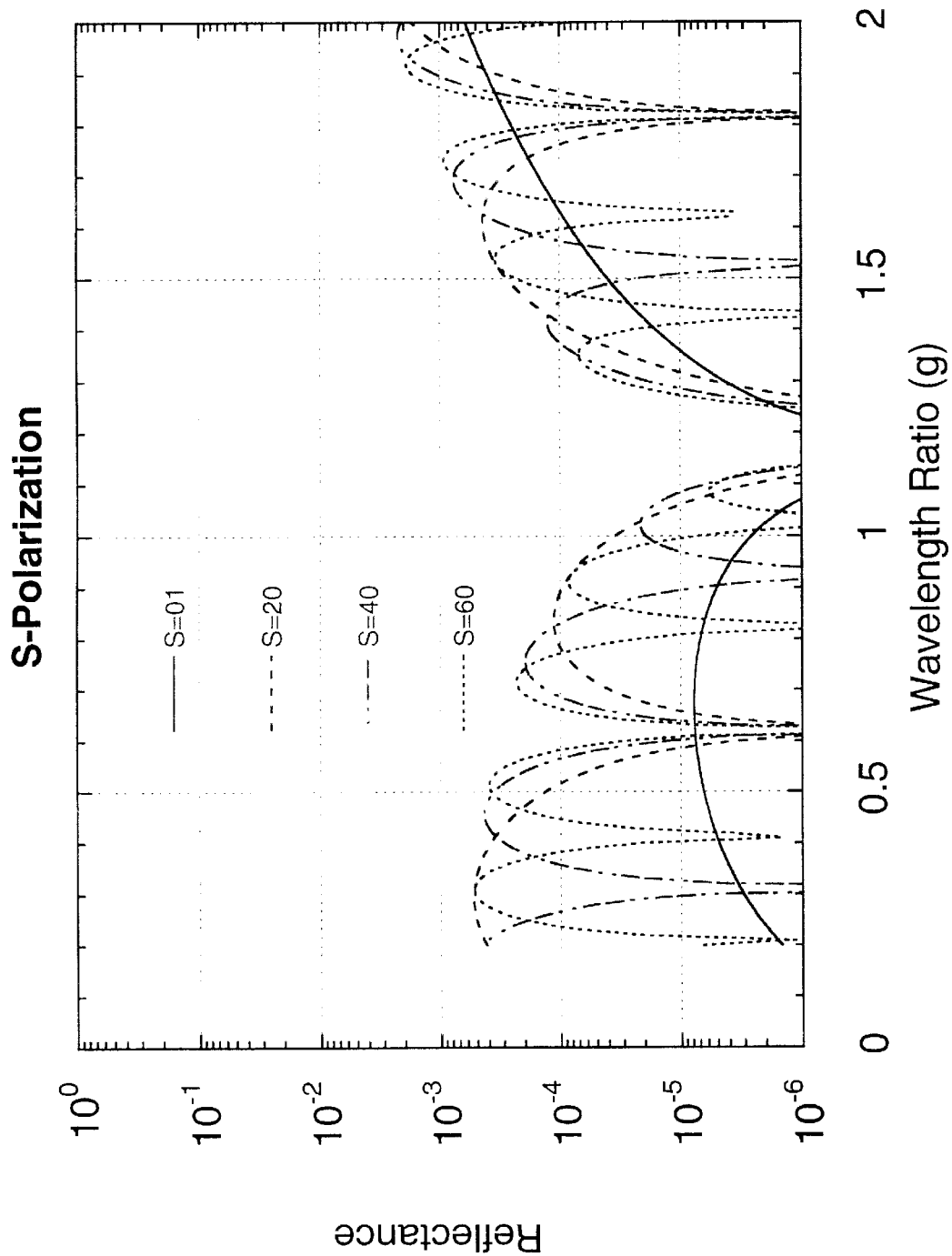
FIG. 12. shows the calculated reflectance curves for s-polarized light as a function of wavelength ratio for thin film systems having 1, 20, 40 and 60 periods of a three-layer basic structure as in FIG. 8. The angle of incidence $\theta_0$ is 57.3°.
Figure 13:
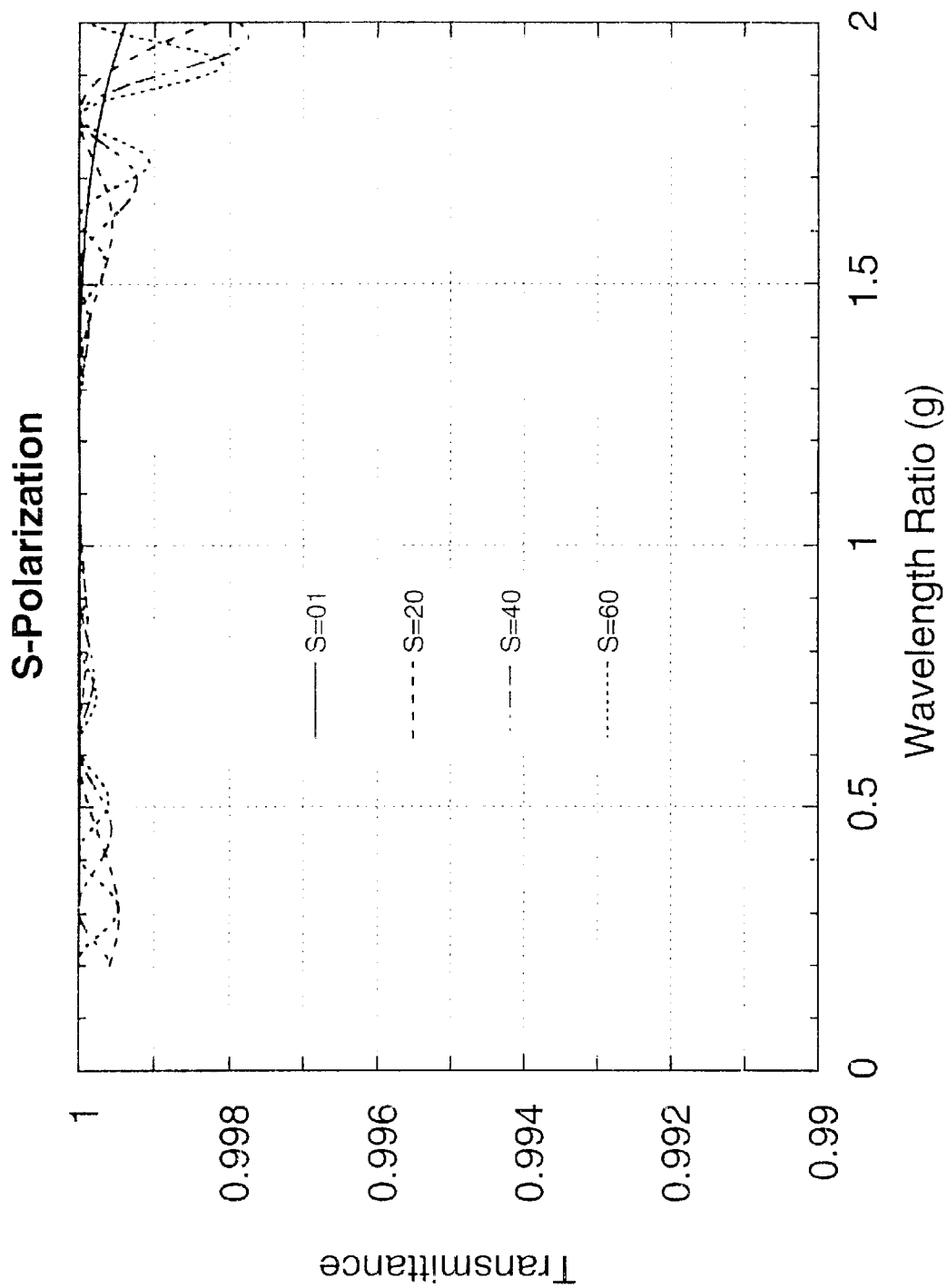
FIG. 13. shows the calculated transmittance curves for s-polarized light as a function of wavelength ratio for the same thin film systems as shown in FIG. 12. The angle of incidence $\theta_0$ is 57.3°.

To demonstrate the performance of the above basic thin film structure, a thin film system with a $n_0/aL/bH/aL/n_0$ structure has been designed. Here, a and b stand for the optical thicknesses of the low and high refractive index layers respectively, and $n_0=2.35$, $n_L=1.45$, $n_H=4.0$. For an angle of incidence $\theta_0=57.3°$ and a wavelength $\lambda_0=4$ μm, the optical thicknesses α and β were then calculated to be 17.9 nm and 31.3 nm. The corresponding calculated equivalent optical admittance E and equivalent phase change on reflec- As shown in FIG. 8, the equivalent optical admittance for s-polarized light has only real part and is completely matched to the optical admittance of the substrate $\eta_0$ over a very broad spectral region $0.2<g=\lambda_0/\lambda<2$. Therefore, very little s-polarized light is reflected and most of the s-polarized light is transmitted over this broad wavelength region. This is confirmed by the calculated reflectance and transmittance of the s-polarized light shown in FIGS. 12 and 13. As the number of periods of the basic structure S increases, the equivalent optical admittance is the same for s-polarized light. Therefore, the calculated reflectance does not show any significant change over the above broad wavelength region as is shown in FIG. 12. Hence, the performance for s-polarized light is essentially the same, regardless of the number of periods S.

Figure 10:
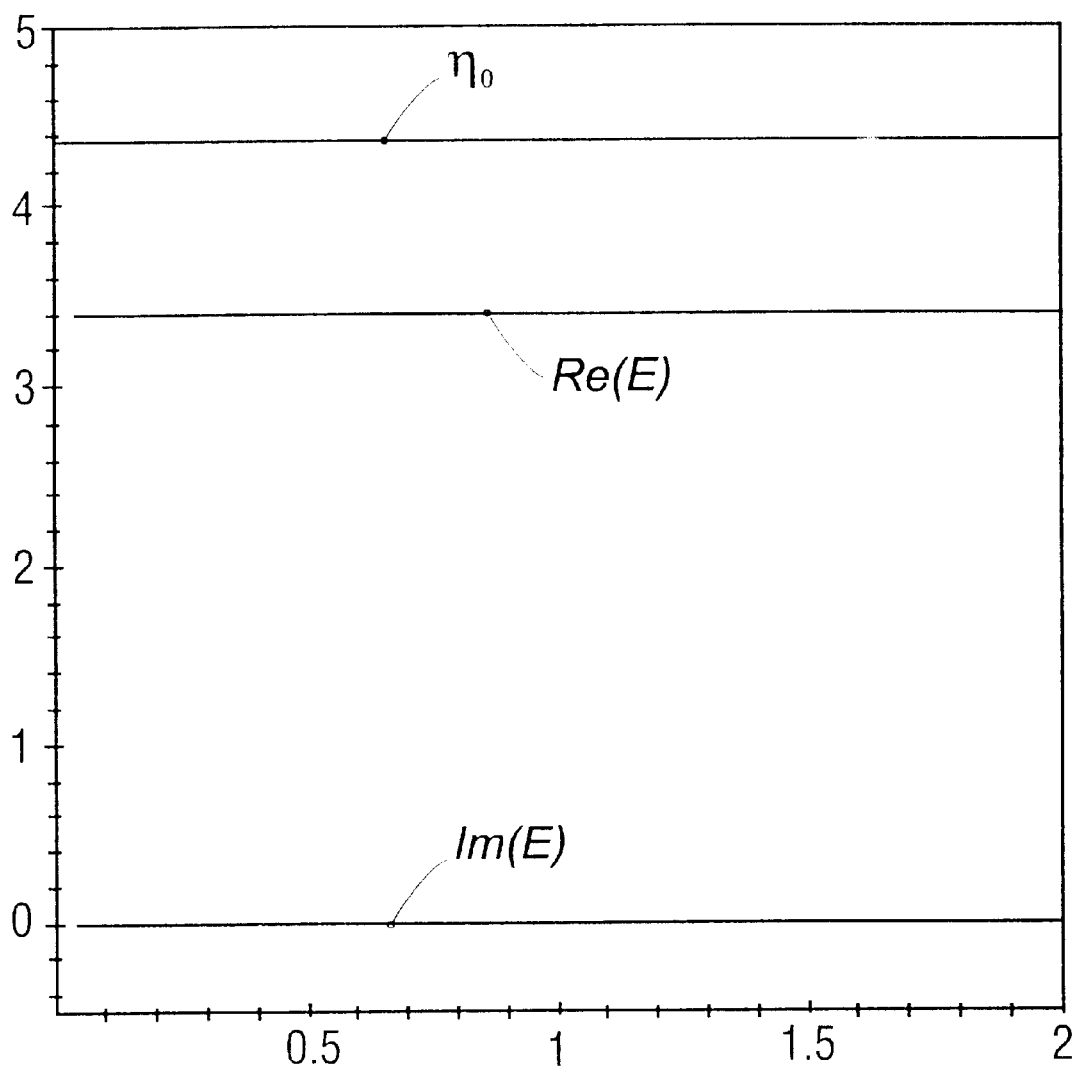
FIG. 10. shows the real and imaginary parts of the equivalent optical admittance of the same basic structure as in FIG. 8 and the optical admittance of the substrate as a function of wavelength ratio for p-polarized light.
Figure 11:
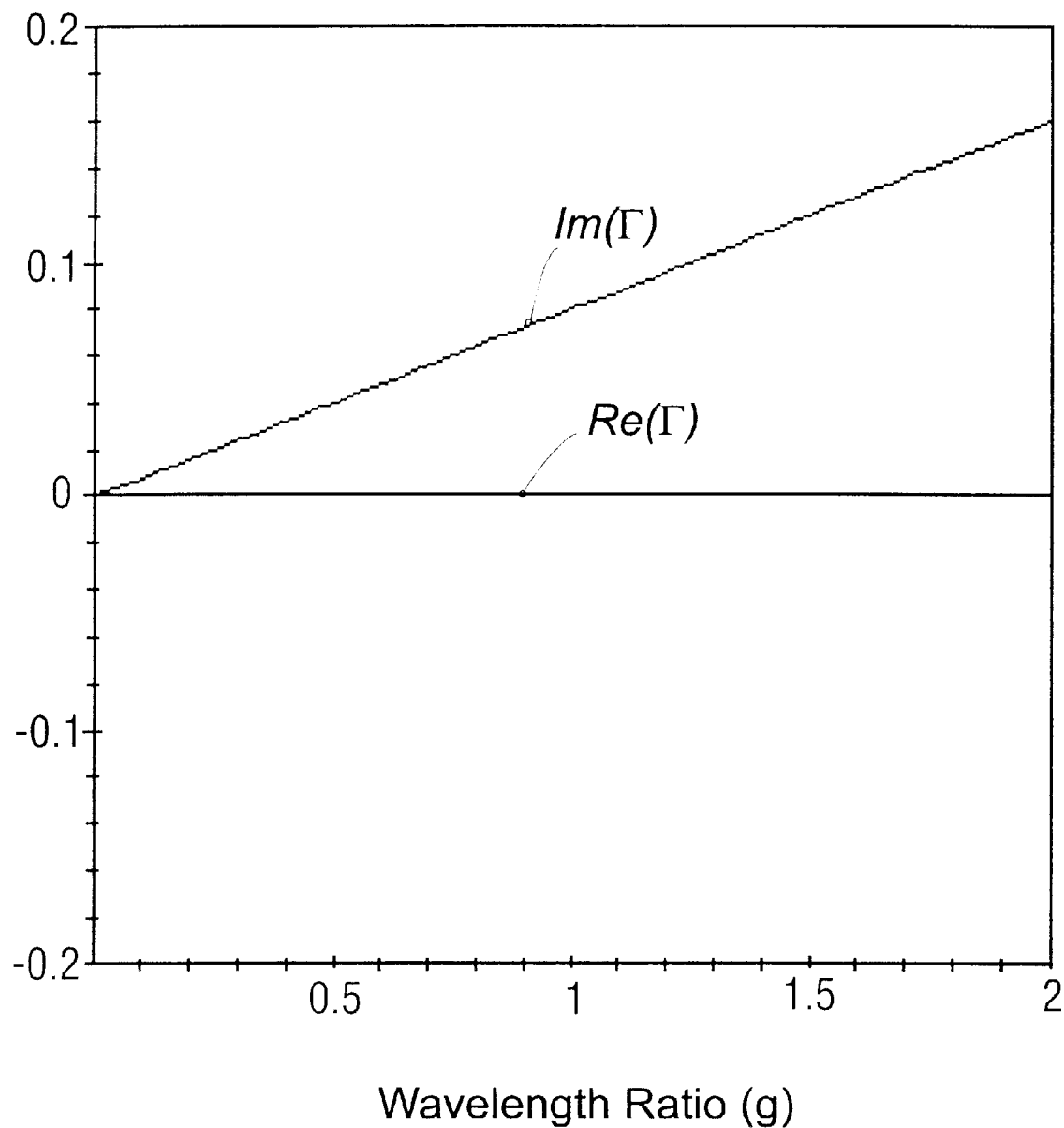
FIG. 11. shows the real and imaginary parts of the equivalent phase thickness of the same basic structure as in FIG. 8 for p-polarized light.
Figure 14:
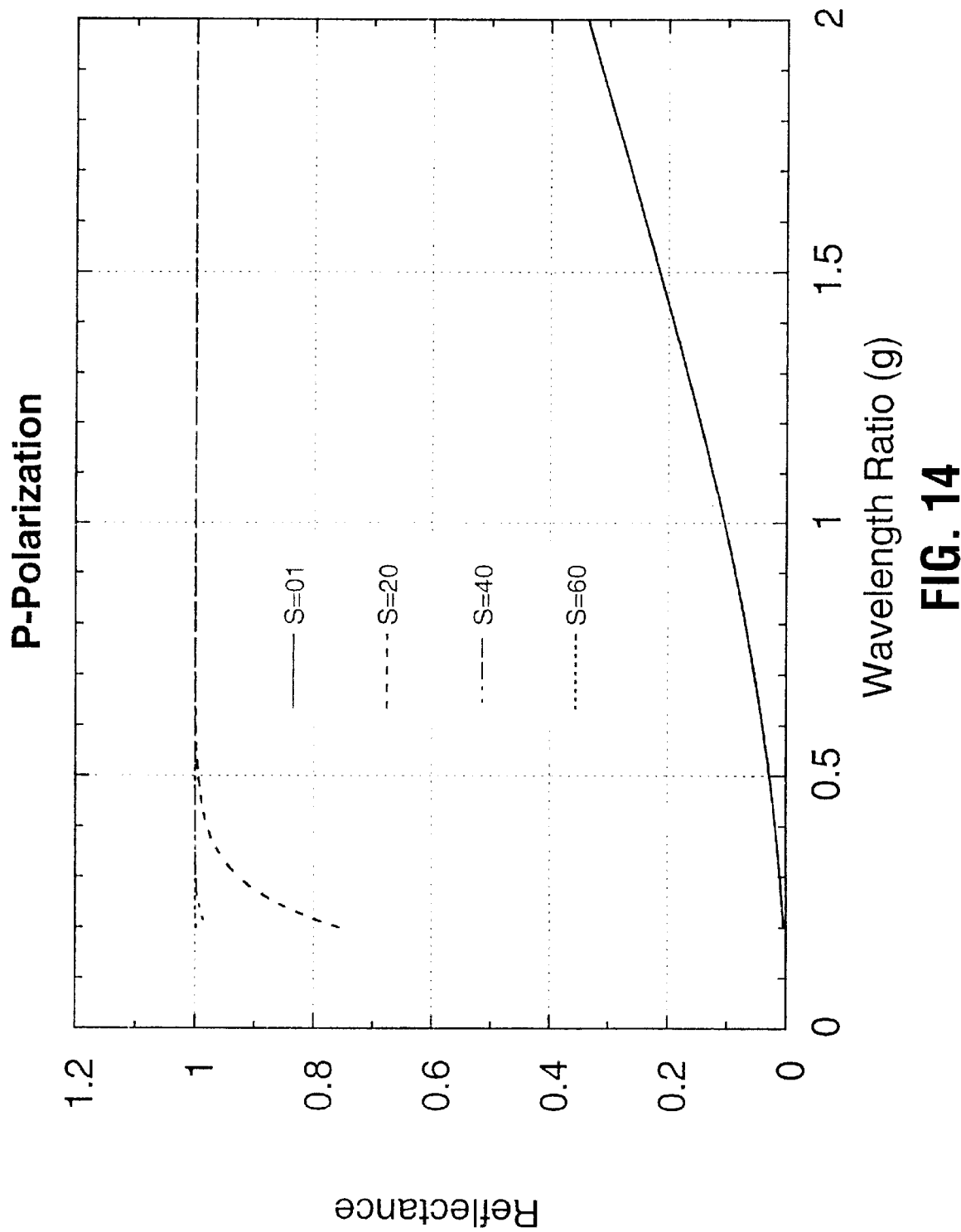
FIG. 14. shows the calculated reflectance curves for p-polarized light as a function of wavelength ratio for the same thin film systems as shown in FIG. 12. The angle of incidence $\theta_0$ is 57.3°.
Figure 15:
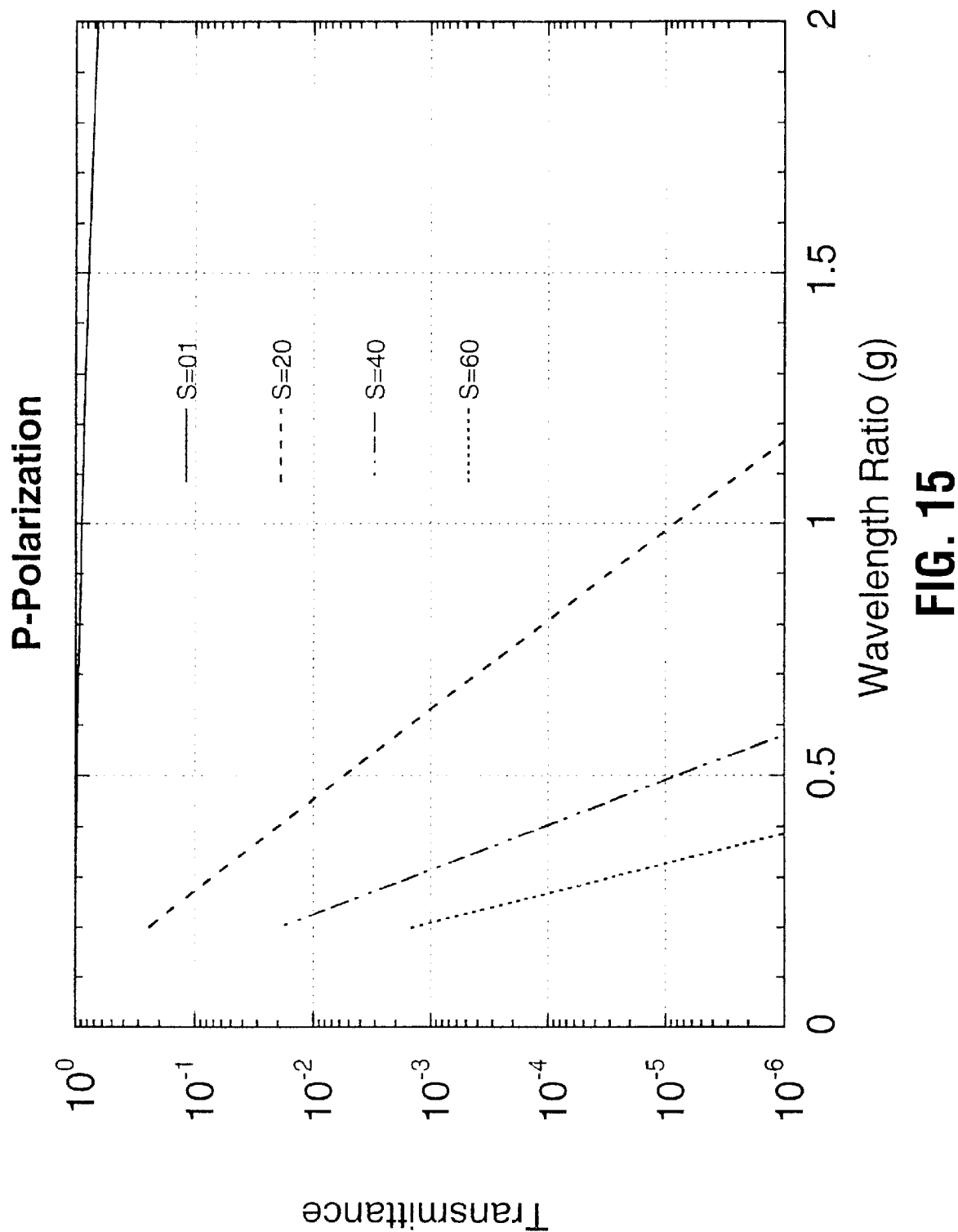
FIG. 15. shows the calculated transmittance curves for p-polarized light as a function of wavelength ratio for the same thin film systems as shown in FIG. 12. The angle of incidence $\theta_0$ is 57.3°.

As shown in FIG. 10, the equivalent optical admittance for the p-polarized light has only real part and it is different from the optical admittance of the substrate. Therefore, some of the p-polarized light will be reflected and the rest will be transmitted as shown in FIGS. 14 and 15 respectively. The equivalent phase thickness Γ has only positive imaginary part (FIG. 11), hence, the whole thin film structure acts like a amplitude attenuator for the p-polarized light. The transmittance or reflectance for p-polarized light will depend strongly on the number of periods S or the equivalent phase thickness of $S^*\Gamma$, the imaginary part of the equivalent phase thickness Γ as well as on the wavelength λ. The larger S or the shorter the wavelength is, the smaller the transmittance for p-polarized light is. It is possible to achieve almost any degree of attenuation in transmission for the p-polarized light by increasing S as shown in FIG. 15.

Figure 16:
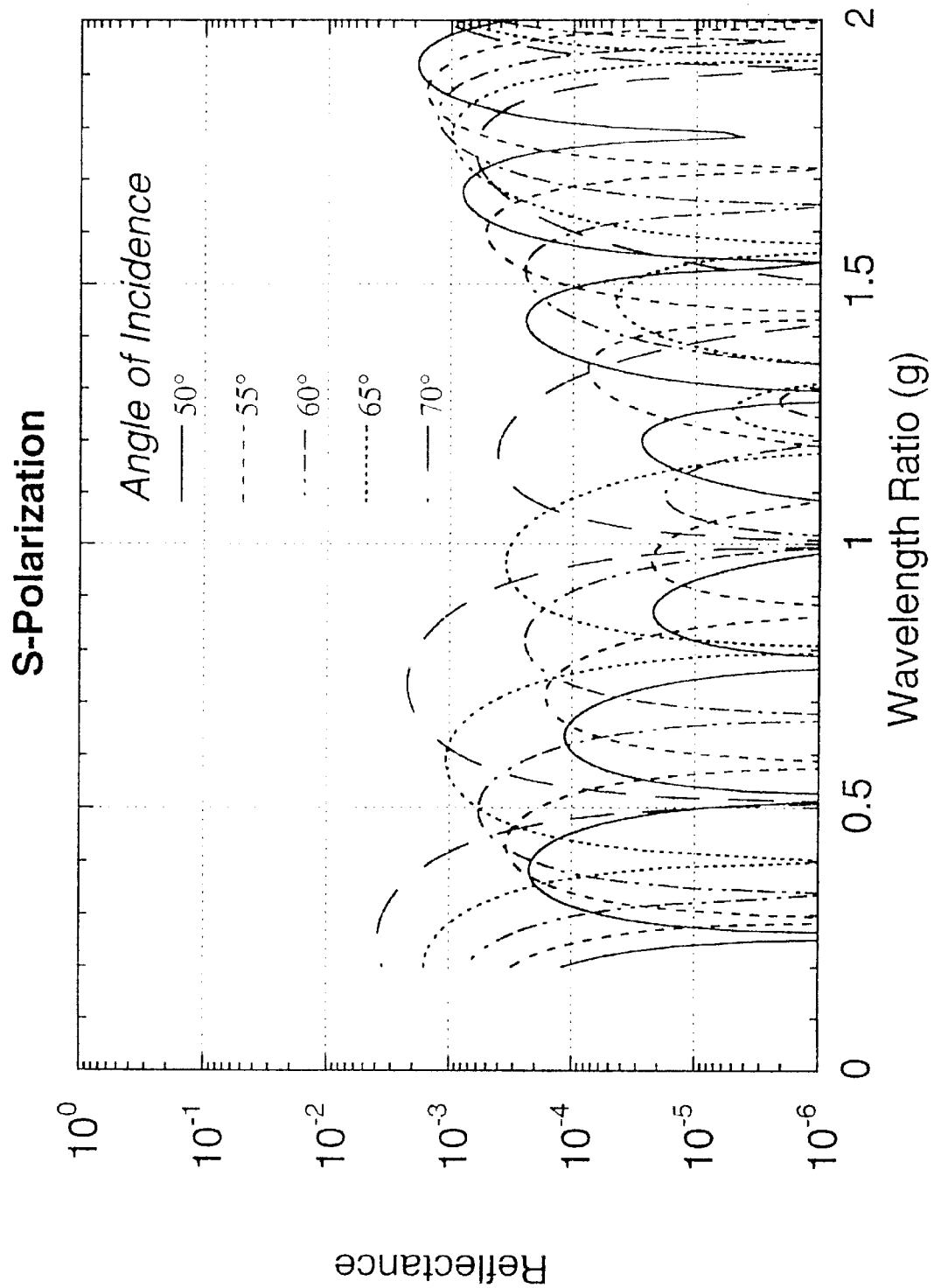
FIG. 16. shows the calculated reflectance curves for s-polarized light as a function of wavelength ratio for a thin film system having 40 periods of the basic structure as in FIG. 8. The angles of incidences are 50°, 55°, 60°, 65° and 70°.
Figure 17:
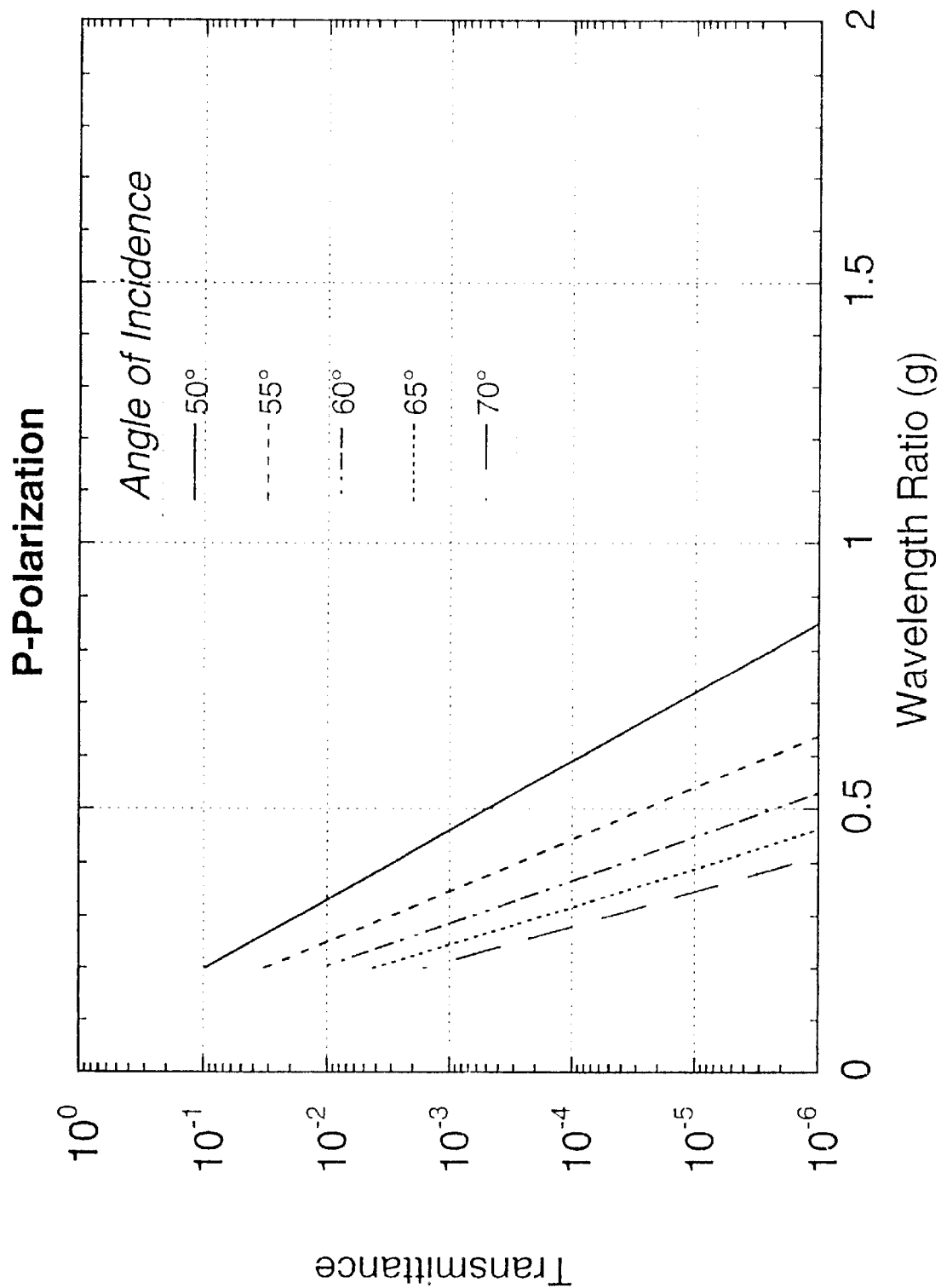
FIG. 17. shows the calculated transmittance curves for p-polarized light as a function of wavelength ratio for the same thin film system as in FIG. 16. The angles of incidences are 50°, 55°, 60°, 65° and 70°.

The calculated reflectance for s-polarized light and transmittance for p-polarized light are also plotted in FIGS. 16 and 17, respectively, for different angles of incidence $\theta_0$. In this case, the number of periods S was fixed to 40.

Clearly, the above thin film system acts as a very good polarizing beam-splitter over a very broad spectral region $0.2<g=\lambda_0/\lambda<2$ and a very wide range of angles of incidence from 50° to 70° measured within the substrate. The high to low wavelength ratio is about 10 and the equivalent angular field in air is ±24°. By comparison, a typical thin film MacNeille polarizer has a wavelength ratio of 2 and an angular field of ±3° in air.

Thus, a thin film system having S periods of such a basic thin film structure can be used as a novel broad-band and wide-angle polarizing device. It can be used for separating s-polarized and p-polarized light by transmitting s-polarized light and reflecting p-polarized light. This is contrary to a conventional thin film plate polarizer or a MacNeille polarizing beam-splitter that reflects s-polarized light and transmits p-polarized light.

Figure 18:
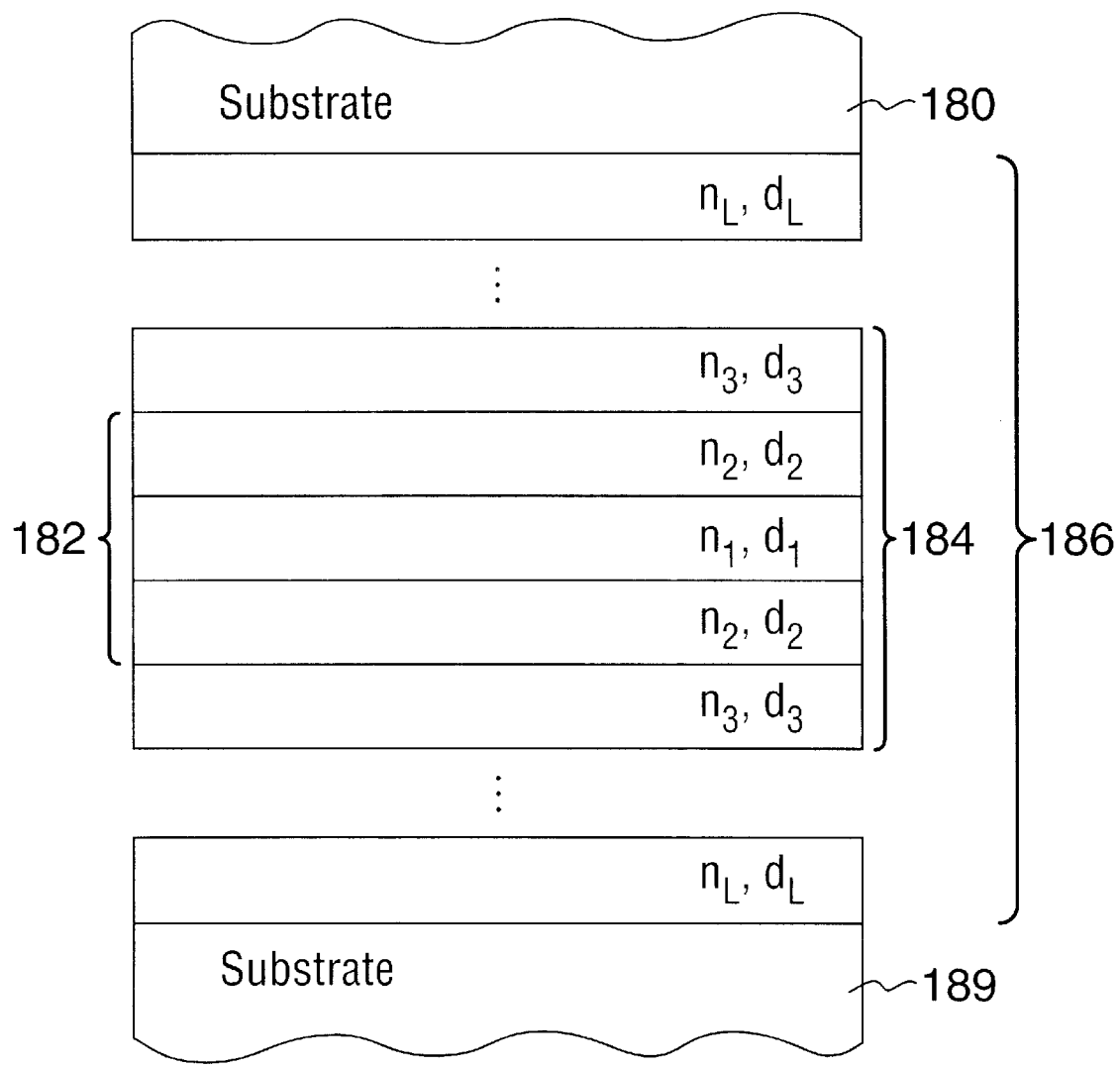
FIG. 18. is a cross-sectional view of an extended basic symmetrical thin film structure having (2L−1) layers, L is larger than 1.

Although the above explanations are based on a simple three layer basic structure, clearly, without departing from the spirit and scope of the present invention, the basic structure can be extended to consist of more than three layers of alternate high and low refractive index layers as shown as in FIG. 18. The basic thin film structure 186 has (2L−1) alternatively low and high refractive index layers and the layers are embedded between two identical substrates 180 and 189. Clearly, the analysis and equations described for the three-layer basic structure in the above section can also be equally applied to the thin film structure described in FIG. 18. Apparently, the center three layers 182 can be replaced by a single equivalent layer $EQ_1$. This equivalent layer $EQ_1$ together with the adjacent two layers marked as 184 in turn can be replaced by another equivalent layer $EQ_2$. Repeating the same process, the whole thin film structure 186 can finally be replaced by a single equivalent layer $EQ_{L-1}$.

The apparent advantage having more than three layers in the basic structure in accordance with the present invention is that there are more parameters to choose in order to meet the requirements for different design wavelengths or angles of incidence. According to Eq. (10), if the equivalent optical admittance of the equivalent layer $EQ_{L-1}$ is equal to the optical admittance of the substrate, all the s-polarized light will be transmitted while some of p-polarized light will be reflected. By increasing the number of periods in the basic structure, all the p-polarized light can be reflected. If the refractive indices in the basic structure are fixed and the layer thicknesses are allowed to vary, there will be (2L−1) variables and only one equation to solve. Therefore, there will be much more freedom to choose the layer thicknesses to meet additional requirements. Thus, much wider bandwidth or wider angular field thin film polarizing device can be obtained.

Figure 19:
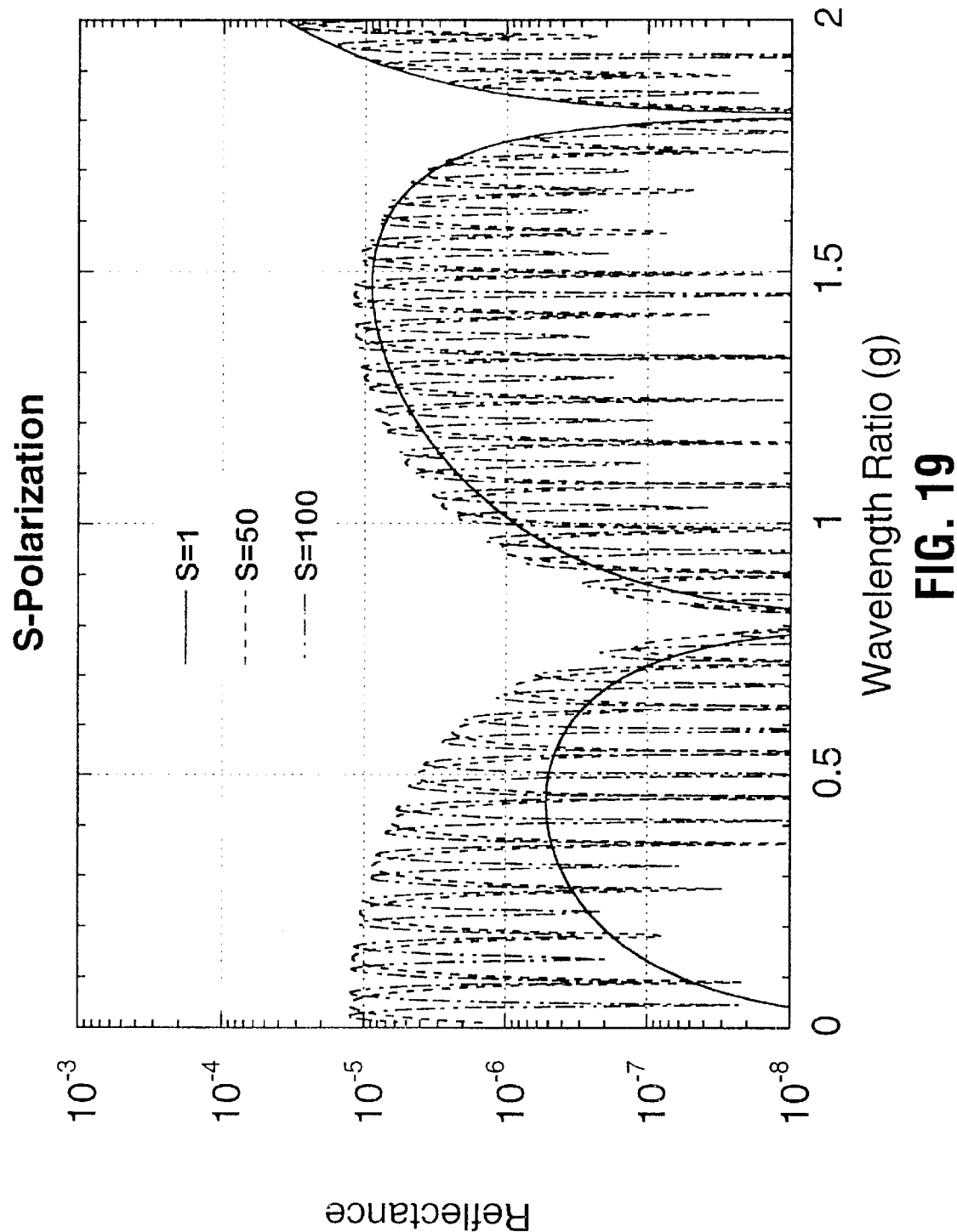
FIG. 19. shows the calculated reflectance curves for s-polarized light as a function of wavelength ratio for thin film systems having 1, 50 and 100 periods of a five-layer basic structure. The angle of incidence $\theta_0$ is 57.3°.
Figure 20:
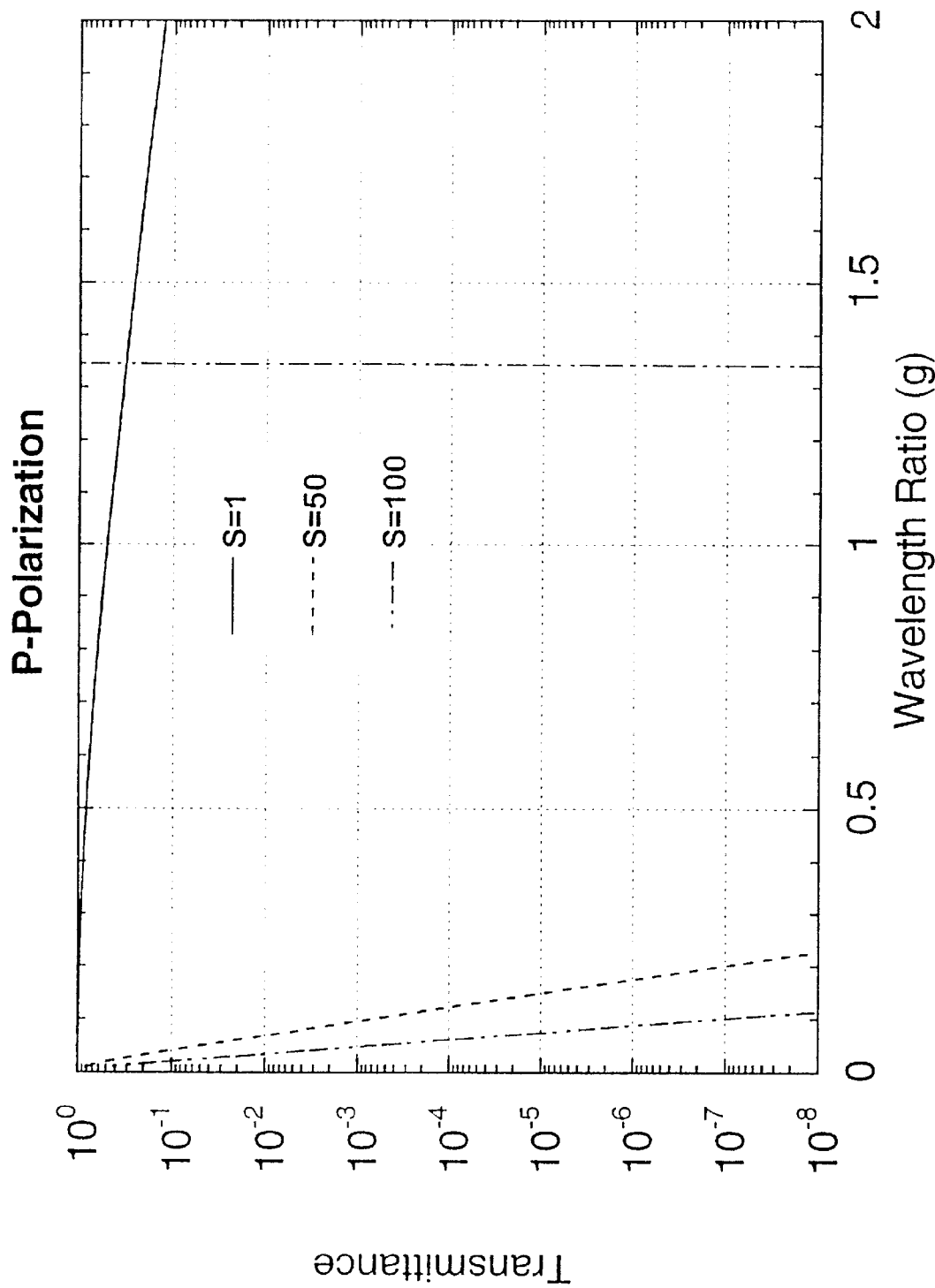
FIG. 20. shows the calculated transmittance curves for p-polarized light as a function of wavelength ratio for the same thin film systems as shown in FIG. 19. The angle of incidence $\theta_0$ is 57.3°.
Figure 21:
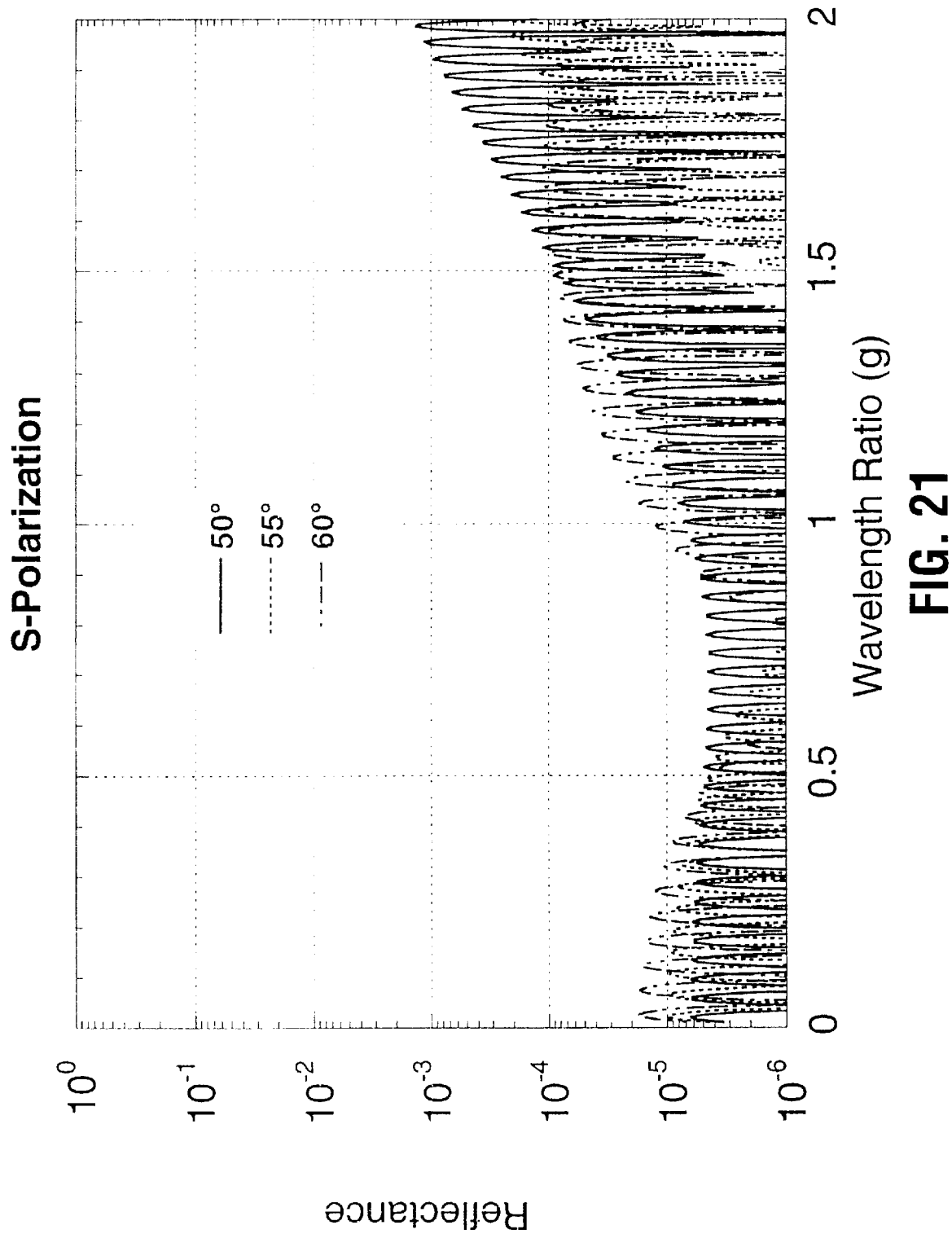
FIG. 21. shows the calculated reflectance curves for s-polarized light as a function of wavelength ratio for a thin film system having 100 periods of the basic structure as in FIG. 19. The angles of incidences are 50°, 55° and 60°.
Figure 22:
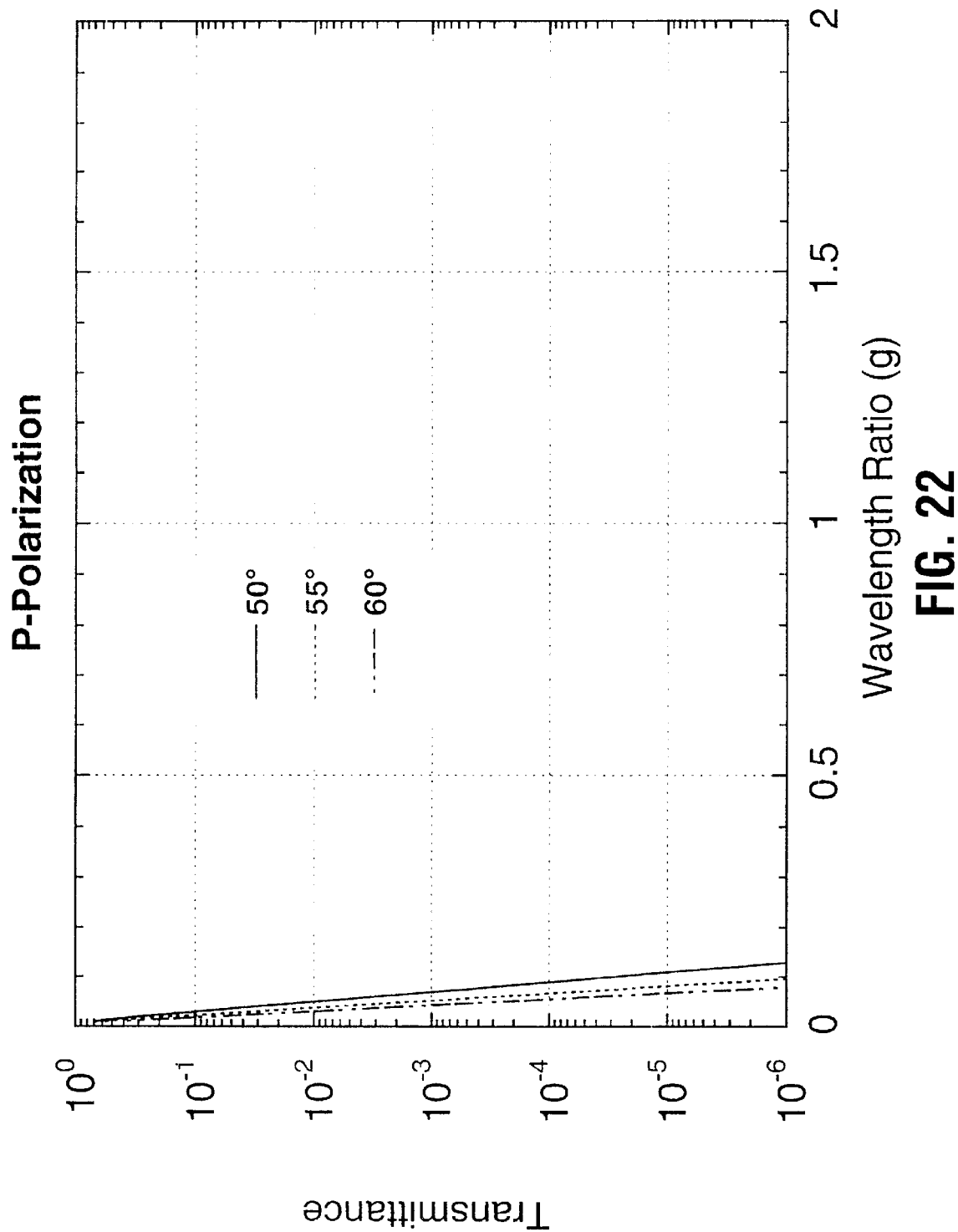
FIG. 22. shows the calculated transmittance curves for p-polarized light as a function of wavelength ratio for the same thin film system as in FIG. 19. The angles of incidences are 50°, 55°, and 60°.

To illustrate the above principle, a thin film polarizing device having five layers in the basic structure ($n_0$/aL/bH/cL/bH/aL/$n_0$) has been designed. Here, a, b and c stand for the optical thicknesses of the layers, and $n_0$=2.35, $n_L$=1.45, $n_H$=4.0. The original design wavelength is 4 μm and the angle of incidence is 57.3°. The optical thicknesses a, b and c were calculated to be 11.8 nm, 10.6 nm and 41.8 nm, respectively. The calculated reflectance and transmittance curves are plotted as a function of the wavelength ratio in FIGS. 19 and 20 respectively. The thin film polarizing devices are shown with 1, 50 or 100 periods of the basic structure. The calculated reflectance and transmittance curves at different angles of incidence are also plotted in FIGS. 21 and 22 for the case with S=100. Clearly, the thin film polarizing device is effective over a very broad band of wavelengths. For the thin film polarizing device having 100 basic structures, the high to low wavelength ratio is as large as 50:1. The highest reflectance for s-polarized light is less than $3 \times 10^{-5}$ and the highest transmittance for p-polarized light is about $1 \times 10^{-1}$ at g=0.02 for angles of incidence between 50° to 60°. This highest value of transmittance for p-polarized light can be reduced by increasing the number of periods while the reflectance for s-polarized light will be essentially the same.

In addition, it is understood that each low refractive index layer in the basic structure can be replaced by a number of low refractive index layers having different refractive indices and each high index layer can be replaced by a number of high refractive index layers providing the critical angle condition is satisfied for each of the low refractive index layers. In addition, the performance of the initial thin film polarizing device based on the above symmetrical thin film structure can be further improved with the assistance of a computer optimization program wherein the layer thickness of each layer in the thin film system will be optimized. In the optimization process, the dispersion of the refractive indices can be taken into account. It is also possible to have two substrates having different refractive indices providing the critical angle condition is satisfied for the substrate having the lower refractive index. Normally, after the optimization procedure, the thin film system will not retain the symmetrical structure any more unless special steps are taken.

In principle, it is always possible to design a thin film polarizing device having a multilayer shown in FIG. 18, providing that the angle $\theta_0$ is larger than the critical angle for low refractive index layers ($n_L < n_0 < n_H$). However, the phase dispersion is very large when the angle of incidence is close to the critical angle. Thus, in practice, it is easier to design wide angle thin film polarizing devices in accordance with the present invention when the angle of incidence is not that close to the critical angle. In addition, the phase dispersion is large when the refractive index ratio $n_H/n_L$ is small. This is particularly the case in the visible part of the spectrum because there the highest available refractive index ratio is about 1.75. In the infrared the refractive index ratio is of the order of 4.0. For this reason infrared broad band and wide angle polarizers have a much better performance than corresponding visible thin film polarizing devices.

Figure 23:
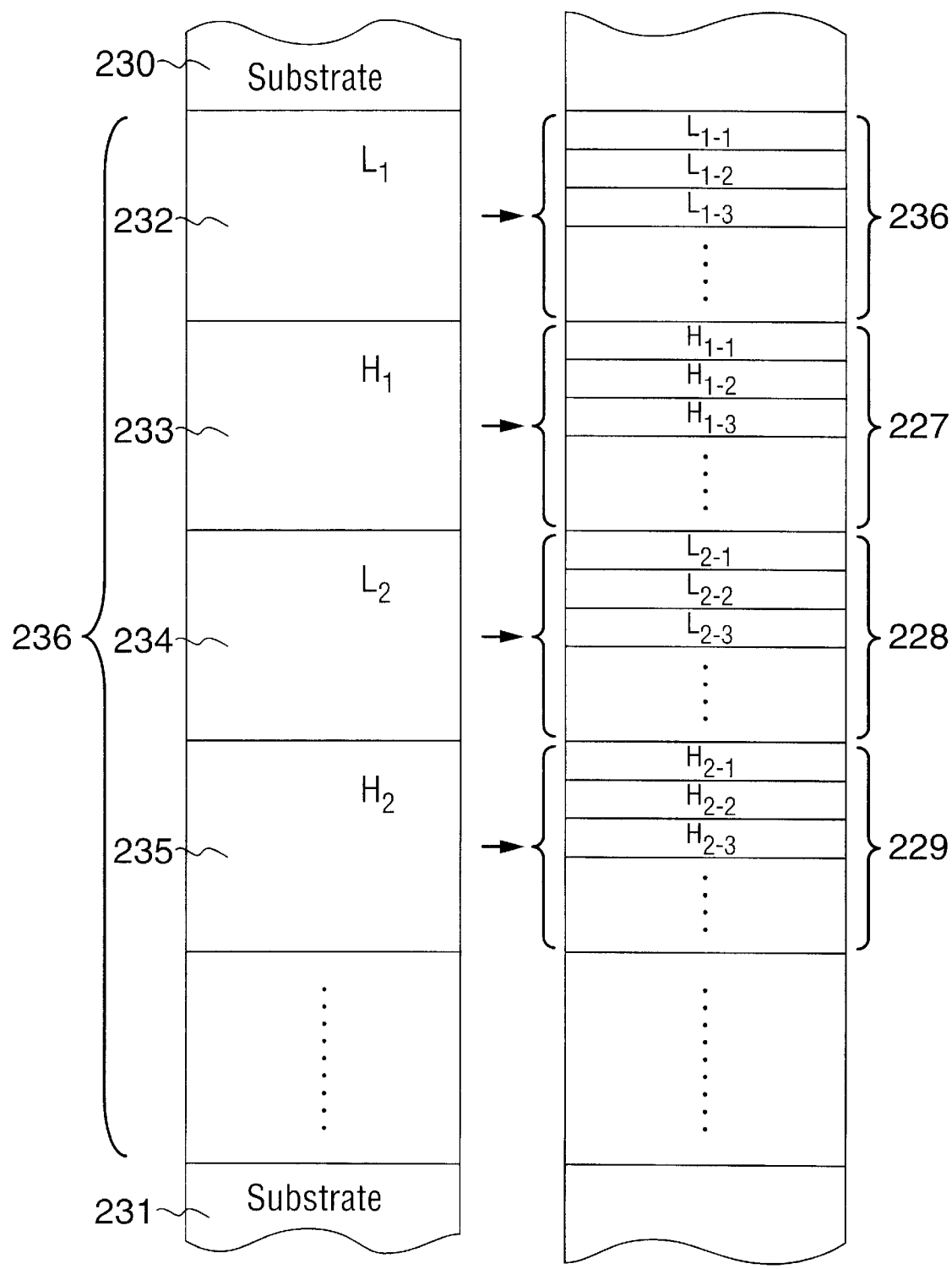
FIG. 23. is a cross-sectional view of a thin film system used in the thin film polarizing device in accordance with the present invention.
Figure 24:
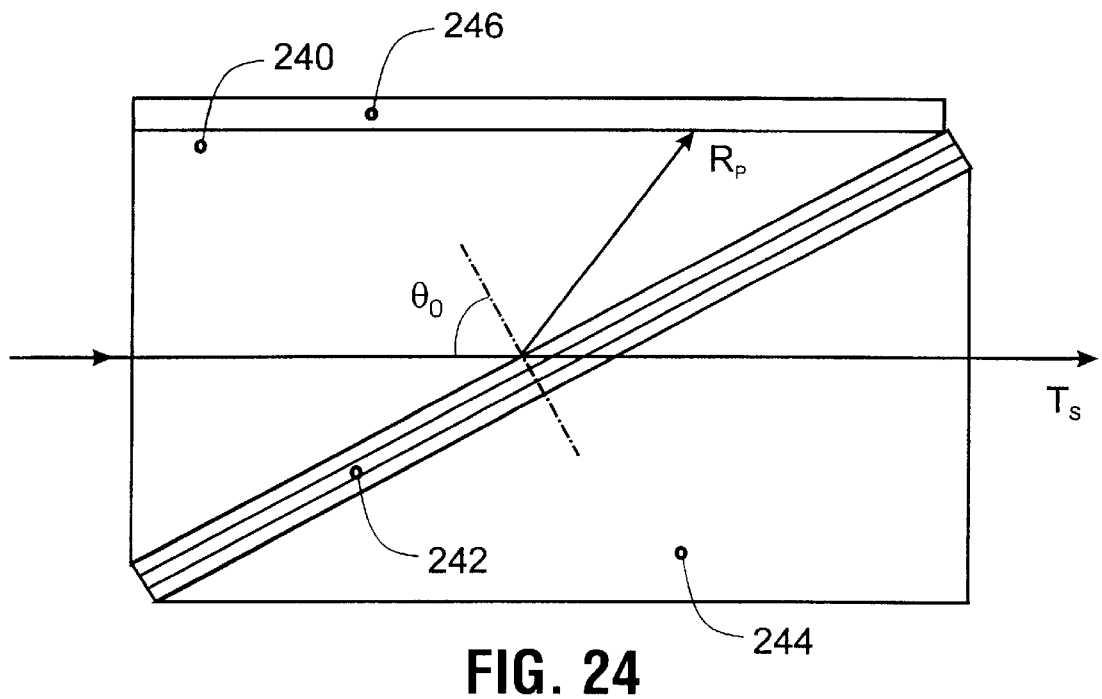
FIG. 24. is a cross-sectional view of one embodiment of a thin film polarizing device in accordance with the present invention. The device acts as a polarizer and only transmitted s-polarized light is used.
Figure 25:
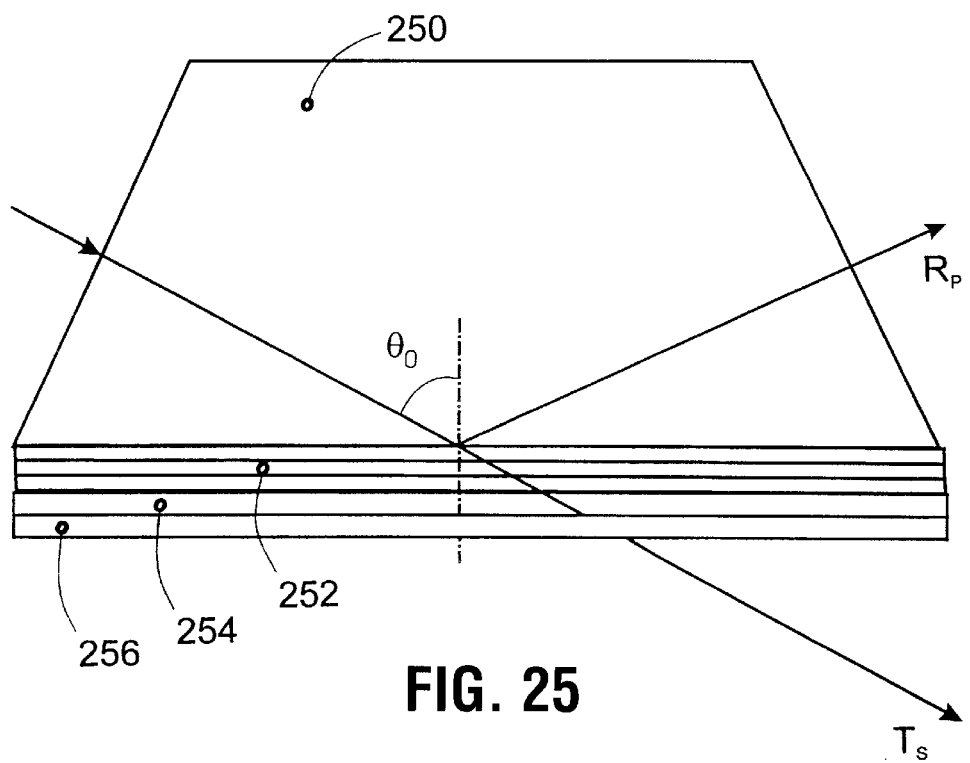
FIG. 25. is a cross-sectional view of another embodiment of a thin film polarizing device in accordance with the present invention. The device acts also as a polarizer and only reflected p-polarized light is used.
Figure 26:
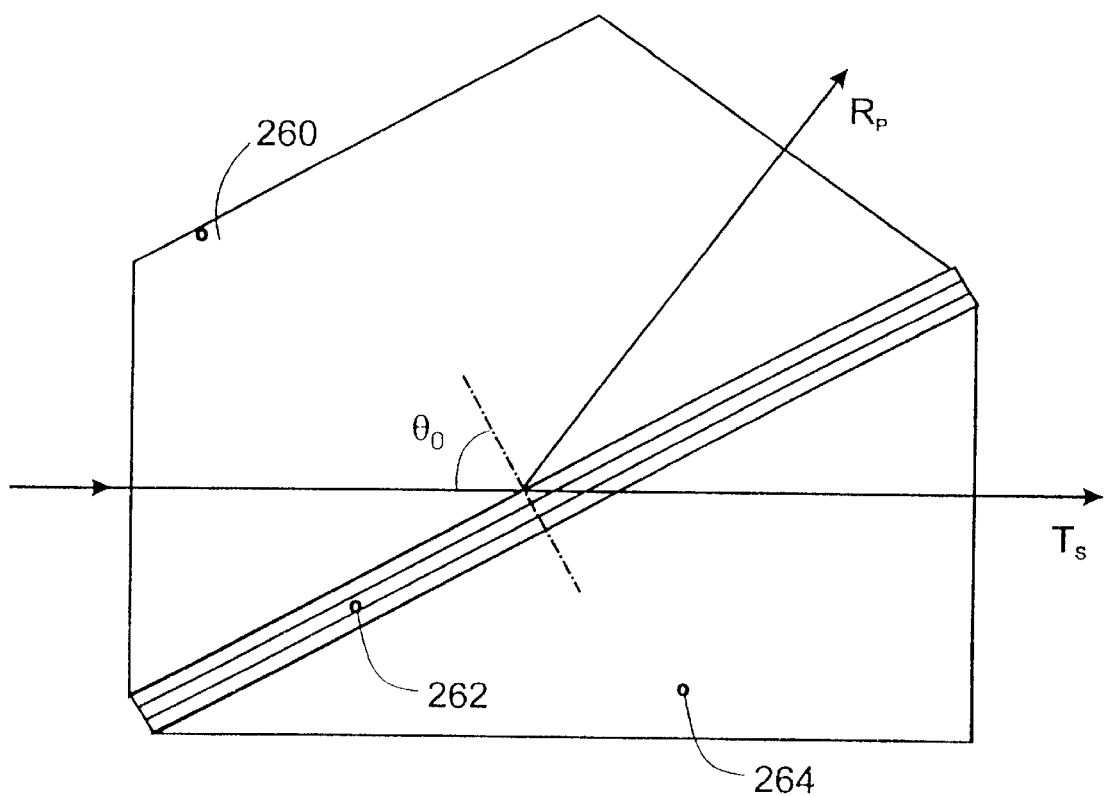
FIG. 26. is a cross-sectional view of another embodiment of a thin film polarizing device in accordance with the present invention. The device acts as a polarizing beam-splitter and both transmitted p-polarized light and reflected s-polarized light are used.

In general, a novel thin film polarizing device employed in the present invention, as shown in FIG. 23, is comprised of first and second light transmissive substrates 230 and 231, and a plurality of thin film layers 238 disposed between the first and second light transmissive substrates. The thin film layers 238 consist of alternating high refractive index layers 233, 235, etc., and low refractive index layers 232, 234, etc. Each high refractive index layer can include a number of high refractive index sub-layers having one or more different refractive indices, and each low refractive index layer can include a number of low refractive index sub-layers each having one or more different refractive indices. The first and second light transmissive substrates, each in the form of a prism, have a refractive index that is greater than the refractive index of each of the low refractive index layers. The thicknesses of the low refractive index layers of the plurality of thin film layers are small enough so that light incident upon the thin film layers at an angle greater than the critical angle can be partially coupled out through the low refractive index layers so that frustrated total internal reflection occurs. This permits interference to take place between the light reflected at the interfaces of the all thin film layers. In addition, the thicknesses of the thin film layers are such that the admittance of the plurality of the thin film layers for s-polarized light is substantially the same as the optical admittance of the substrate for s-polarized light for a wide range of angles of incidence and a broad band of wavelengths when the incident light is incident upon the low refractive index layers at an angle greater that the critical angle. This permits substantially all incident s-polarized light to be substantially transmitted. The plurality of the thin film layers have an admittance for p-polarized light that is substantially different from the optical admittance of the substrate for p-polarized light for a wide-range of angles of incidence and a broad-band of wavelengths and thus they substantially reflect incident p-polarized light. The prism is shaped in such a manner as to allow the incident light to be incident upon the thin film layers at a plurality of angles greater than or equal to the critical angle for the highest refractive index of the low refractive index layers.

FIGS. 24, 25, 26 and 27 represent cross-sectional views of four arrangements for suitable thin film polarizing devices for use in the present invention. The multilayer thin film coatings are embedded between two prisms. The shapes of the prisms are selected in order to make the angle of incidence of the incident light at the hypotenuse larger than the critical angle for the low index layers. The two prisms could be made of the same material. In the arrangement shown in FIG. 24, the shapes of the two prisms 240 and 244 are identical and the thin film coating 246 is deposited at the hypotenuse interface. The thin film polarizing device acts as a transmissive polarizer. Only the transmitted s-polarized light is used and the reflected p-polarized light is absorbed by a light absorber 246. In the arrangement shown in FIG. 25, the shapes of the two prisms 250 and 254 are different. The thin film coating is also deposited at the hypotenuse interface. The thin film polarizing device is also configured as a reflective polarizer and only the reflected p-polarized light is used. The transmitted s-polarized light is absorbed by a light absorber 256. In the arrangements shown in FIGS. 26 and 27, both devices are configured as polarizing beam-splitters. Therefore, the reflected p-polarized light and the transmitted s-polarized are both used. In the arrangement in FIG. 26, the two prisms 260 and 264 have different shapes while in the arrangement in FIG. 27 they are identical. The advantage of this latter arrangement is that the unpolarized beam can be incident on either top-sides of the device. In fact, if a symmetrical layer system solution is found for the multilayer 272, the light can be incident on any of the four sides of the prism arrangement.

Although the two prism substrates can have different refractive indices, normally in practice, they are made of the same material in order to reduce manufacturing costs. The two prisms may be joined together in various ways. For example, they can be joined together with optical cements that have refractive indices matching the refractive index of the substrate. They can also be joined with a liquid that has a refractive index matching the refractive index of the substrate and the out-most edges of the two contact faces of the two prisms are then sealed. The two prisms, with coatings on one or both prisms, can also be brought together by using optical contact. This technique has been successfully developed for the construction of high laser damage threshold polarizers.

Because the thin film polarizing devices in accordance with the present invention are based on frustrated total internal reflection, the layer thicknesses are a fraction of the mean wavelength of the designed spectral region. Hence, the layers are very thin compared to those of conventional thin film polarizers and thus it should be less costly to manufacture such systems. This is especially important in the case of far infrared polarizers where normally the total layer thicknesses are very thick and require a very long deposition time.

The thin film coatings in the thin film polarizing devices can be manufactured by conventional physical or chemical thin film deposition techniques, such as thermal evaporation, sputtering, ion-plating and plasma assisted evaporation. Those process can produce good quality thin films. Since no absorbing coating materials are used in the thin film systems, the thin film polarizing devices are very durable both physically and chemically.

The thin film polarizing devices employed in the present invention are very broad-band and are effective over a very wide range of angles. By controlling the layer thicknesses, the extinction ratio in transmitted light can assume almost any value. The extinction ratio in reflected light is also very high when compared to that of conventional thin film polarizers. If necessary, another polarizing device of the same type can be placed in series to obtain an even higher extinction ratio. The novel thin film polarizing devices can be used in almost all applications where current polarizers or polarizing beam-splitters are used. For example, in the visible and near infrared spectral regions, the novel thin film polarizing devices in accordance with this invention can be used to replace more expensive polarizing devices based on birefringent crystals. In the infrared and far infrared regions they can replace metal grid polarizers.

Figure 27:
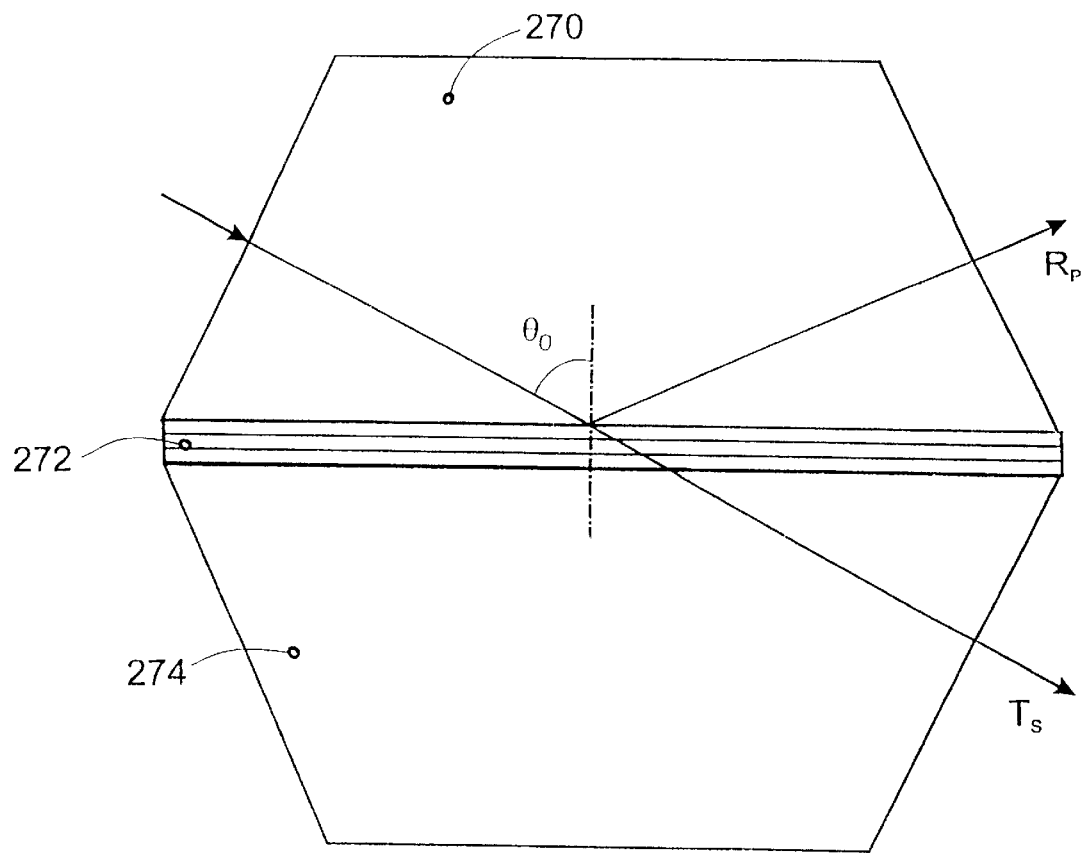
FIG. 27. is a cross-sectional view of an embodiment of a thin film polarizing beam-splitter in accordance with the present invention. This thin film polarizing beam-splitter is designed intended for projection display application.
Figure 28:
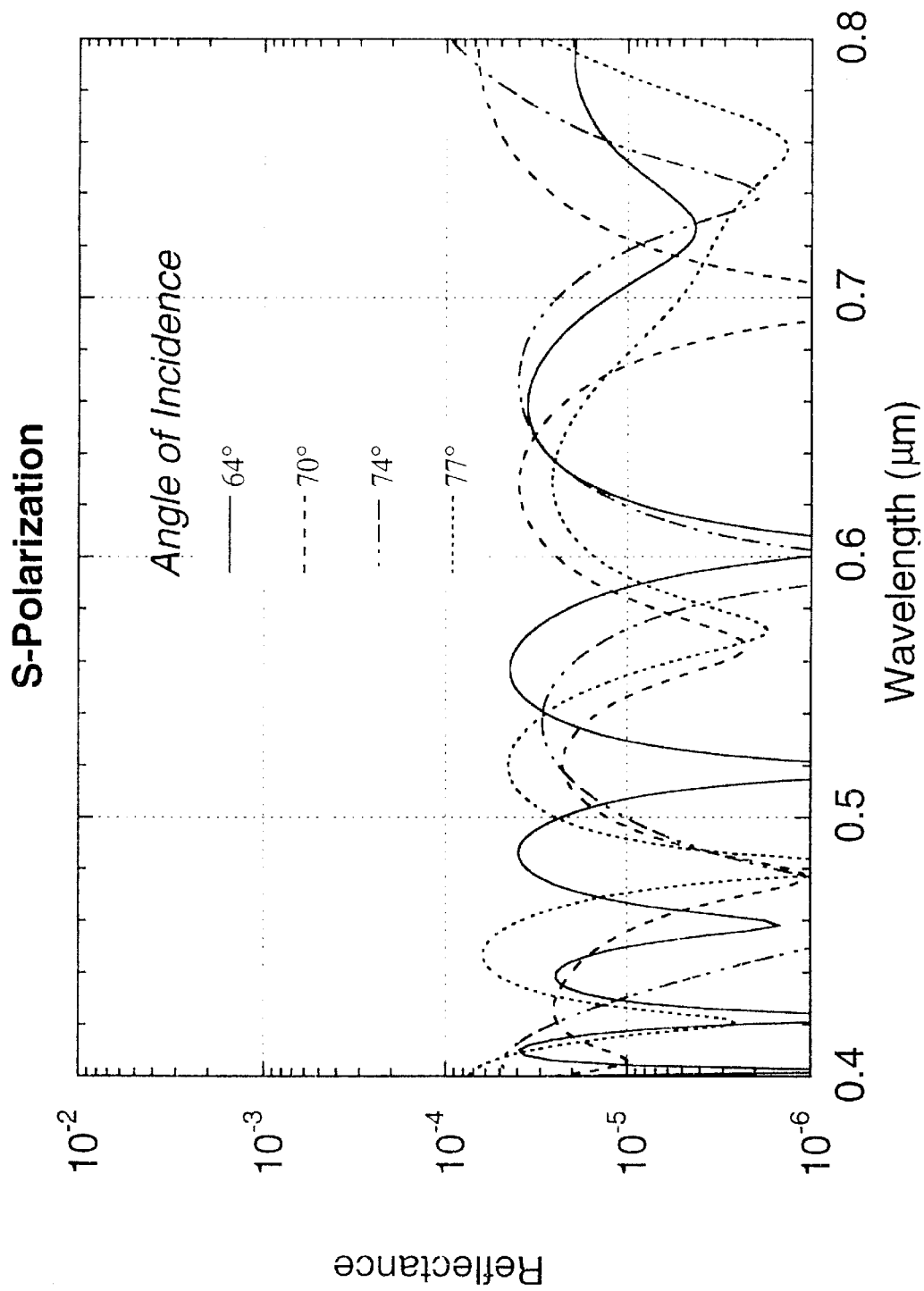
FIG. 28. shows the calculated reflectance curves for s-polarized light as a function of wavelength ratio for the embodiment VIS-1 at different angles of incidence.
Figure 29:
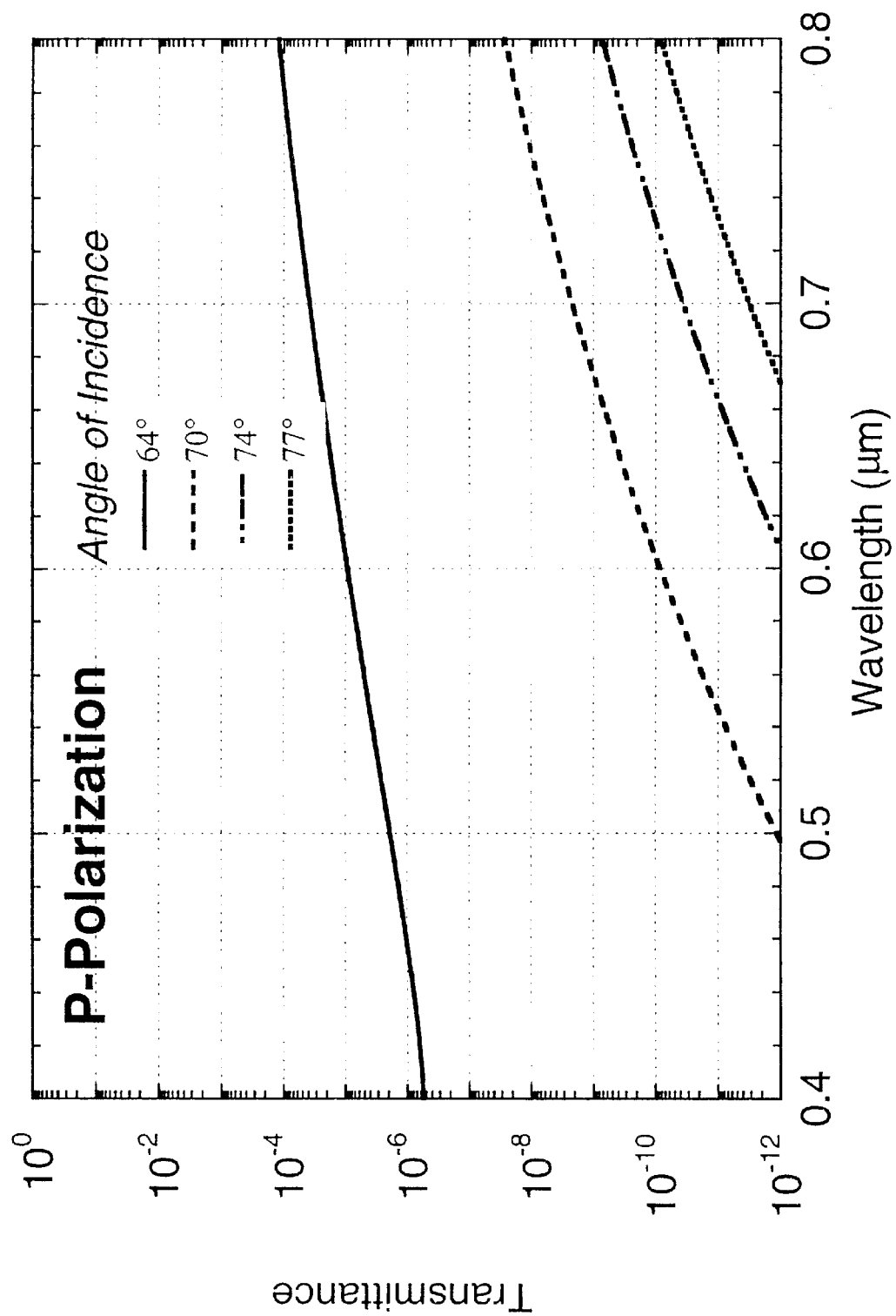
FIG. 29. shows the calculated transmittance curves for p-polarized light as a function of wavelength ratio for the embodiment VIS-1 at different angles of incidence.
Figure 30:
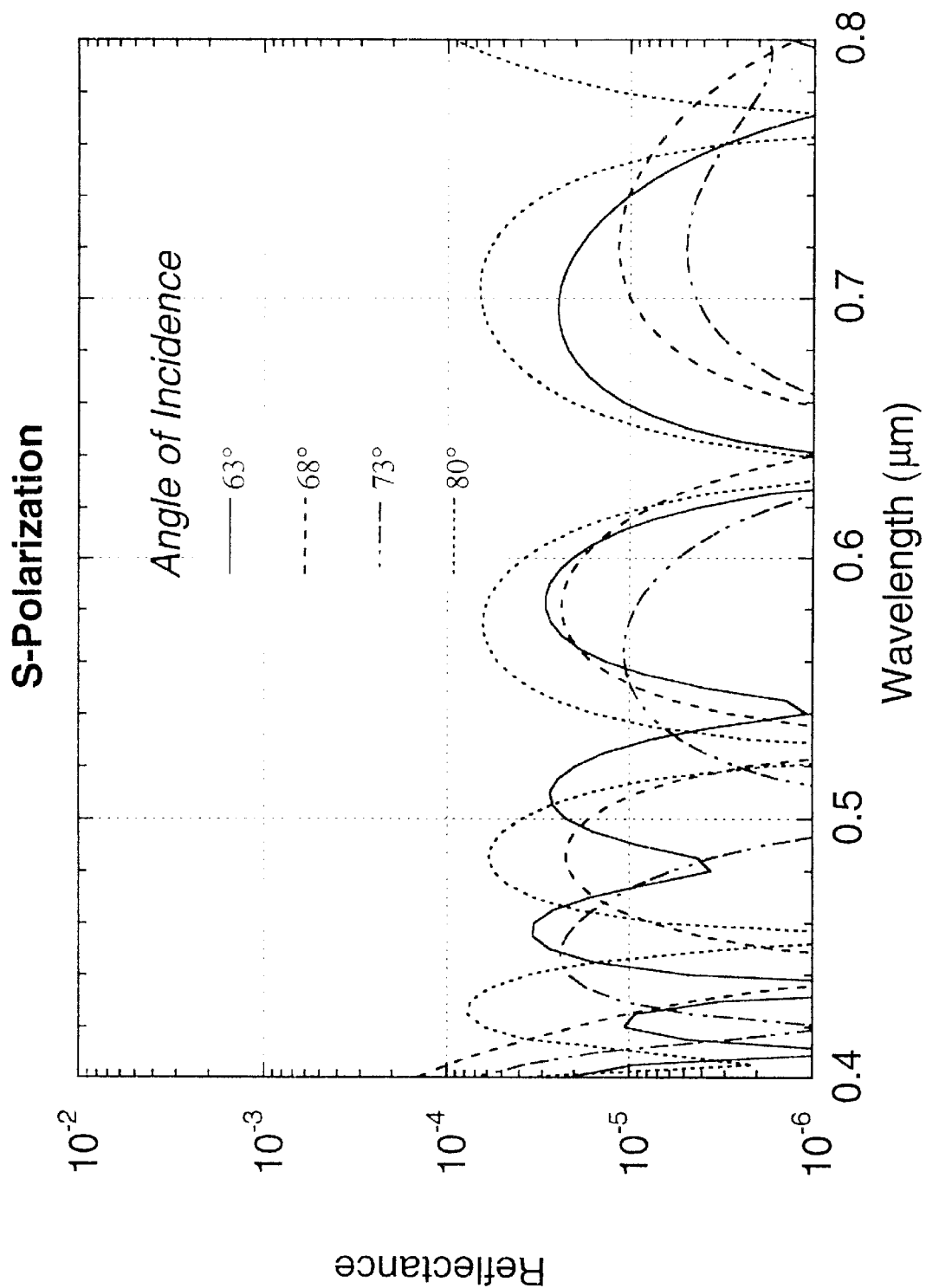
FIG. 30. shows the calculated reflectance curves for s-polarized light as a function of wavelength ratio for the embodiment VIS-2 at different angles of incidence.
Figure 31:
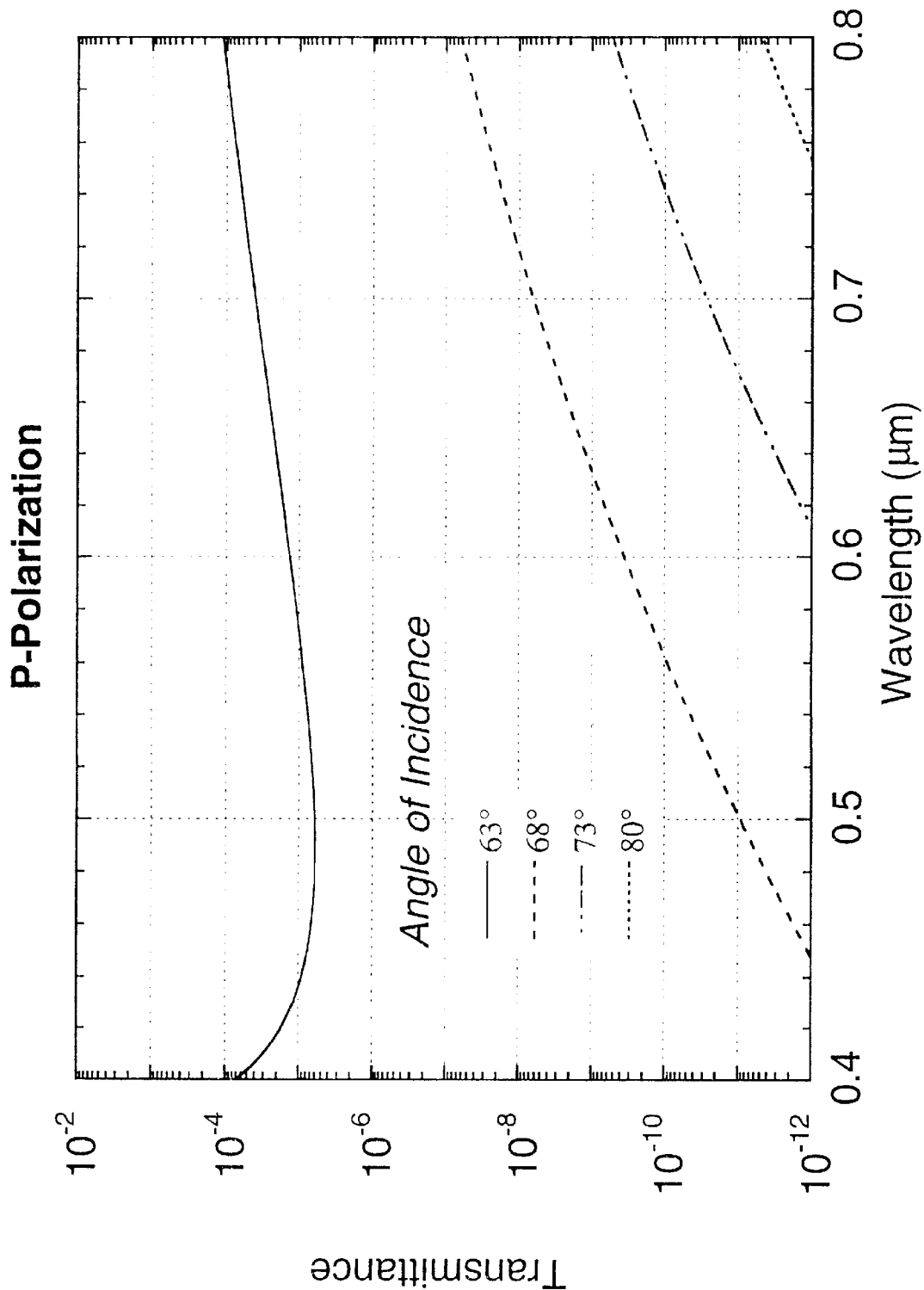
FIG. 31. shows the calculated transmittance curves for p-polarized light as a function of wavelength ratio for the embodiment VIS-2 at different angles of incidence.

Two embodiments of the thin film polarizing beam-splitters or thin film polarizing devices, also referred to as polarization beam discriminators, that will be used in the high efficiency 2D/3D projection displays in accordance with the present invention have been obtained. The layout of the thin film polarizing device is chosen as shown in FIG. 27 having two identical dove prisms and symmetrical thin film coatings. All four faces of the thin film polarizing device can be used to accept light. The two thin film coatings, VIS-1 and VIS-2, were designed for visible light having wavelength region of 0.4–0.8 $\mu$m. For the visible thin film polarizing devices, substrates with refractive indices of 1.75 and 1.85 and coating materials having refractive indices of 1.38 and 2.35 were selected. Plots of the spectral performances of these thin film coatings VIS-1 and VIS-2 at different angles of incidence are given in FIGS. 28 and 29 (VIS-1), and FIGS. 30 and 31 (VIS-2), for s-polarized and p-polarized, respectively.

Clearly, in terms of band-width, angular field and extinction ratios, all two embodiments are significantly better than conventional thin film polarizers or polarizing beam-splitters. The wavelength ratios of 2:1 and 1.5:1, the angular fields of $\pm 11.4°$ and $\pm 15.8°$ in air, and the minimum extinction ratios of $1 \times 10^4$:1 and $1.5 \times 10^4$:1 are obtained for VIS-1 and VIS-2 respectively.

An error analysis has shown that random errors of the order of $\pm 1$ or $\pm 2\%$ in the thicknesses of the layers of polarizers of this type will not unduly affect the performance of the devices. This, of course, relaxes the manufacturing tolerances for these devices. Several prototype of the above polarizing beam-splitters have been fabricated in standard thin film deposition systems. The measured performances showed very good agreements with the calculated performances. They exceed even the most strict requirements for PBSs in very high performance projection displays.

Numerous other thin film polarizers based on interference and frustrated total internal reflection may be employed without departing from the spirit and scope of the invention. For example, other prism materials and coating materials can be used also. In the infrared, the prism material may be made of ZnS, ZnSe, Si, Ge, etc. In the visible, the substrates may be made of various glasses and various plastics. The coating materials can be selected from the common materials used in conventional thin film coatings, such as $MgF_2$, $ThF_4$, $SiO_2$, $Al_2O_3$, $ZrO_2$, $TiO_2$, $Ta_2O_5$, $Nb_2O_5$, Si, ZnS, ZnSe, Si, Ge, etc.

The preferred embodiments of this invention include the above novel thin film polarizing beam-splitter described heretofore. Since the thin film polarizing beam-splitter works in a different manner from conventional beam-splitters, different configurations for high efficiency 2-D and 3-D projection displays are provided.

A high efficiency projection display system in accordance with the principles of the present invention generally comprises a lighting element, a novel thin film polarizing device, at least one imaging element, a projection lens, and an optional screen. The lighting element provides light that is used to form images. The imaging elements, also referred to as spatial light modulators, consists of plurality of small pixels that can be addressed individually to form images. The thin film polarizing device as designed above splits the unpolarized incident light beam into two polarized beams and project them onto the corresponding imaging elements, and then combine the images from the imaging elements. The projection lens projects the combined image onto a screen which then is viewed.

Figure 34:
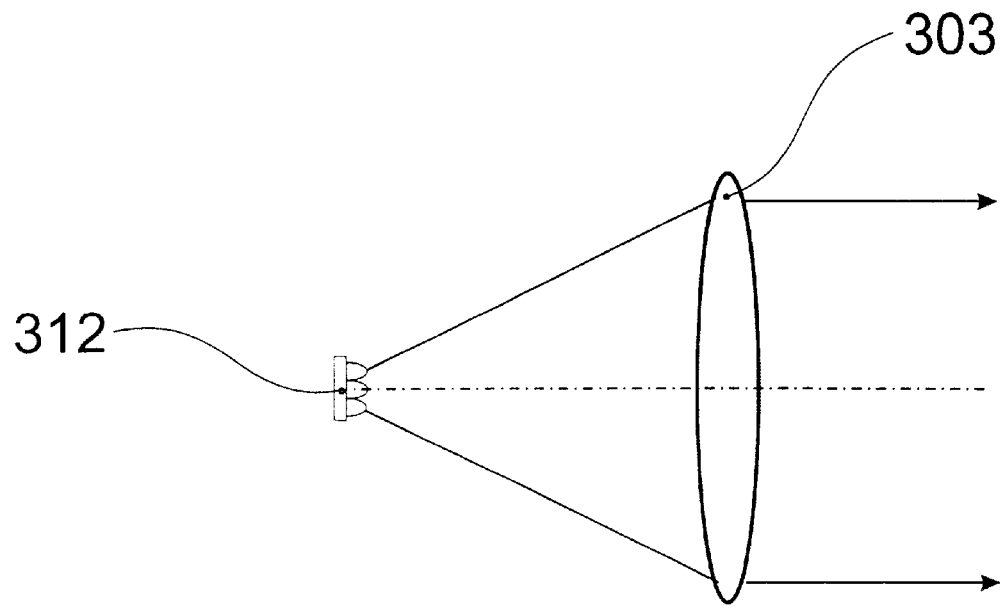
FIG. 34. shows a Light element 3 with colour LEDs.
Figure 35:
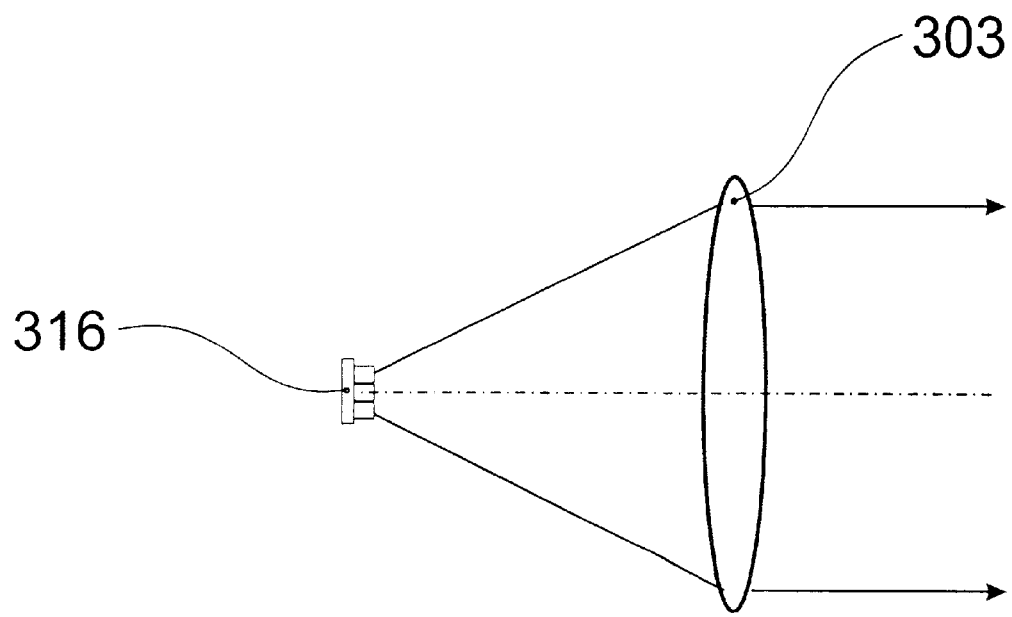
FIG. 35. shows a Light element 4 with colour lasers.

Based on the type of imaging elements, the lighting element can take different forms as shown in FIGS. 32–35. In FIG. 32, Lighting element 1 comprises of a lamp 300, a reflecting mirror 301, a cold mirror 302 to remove unwanted infrared and ultraviolet light from the light beam and a collimating lens 303. The lamp emits white light that contains three primary colours of blue, green and red in order to form black and white, or colour images. In FIG. 33, Lighting element 2 consists of a lamp 300 which emits white light, a reflecting mirror 301, a cold mirror 302, a focusing lens 313, a colour filter wheel 310 mounted with R, G, B colour filters, and a collimating lens 303. The colour filter wheel rotates at a fast speed that forms a sequential-colour light which is synchronized with the imaging element. In FIG. 34, R, G and B colour light emitting diodes (LEDs) 312 are used in combine with the collimating lens. The three LEDs can be turned on simultaneously to give a white colour or sequentially to form time-sequential colour which is synchronized with the imaging element. Lighting element 4 (FIG. 35) is the same as the Lighting element 3 in FIG. 34, except that the LEDs are replaced by three Red, Green, and Blue lasers.

Figure 36:
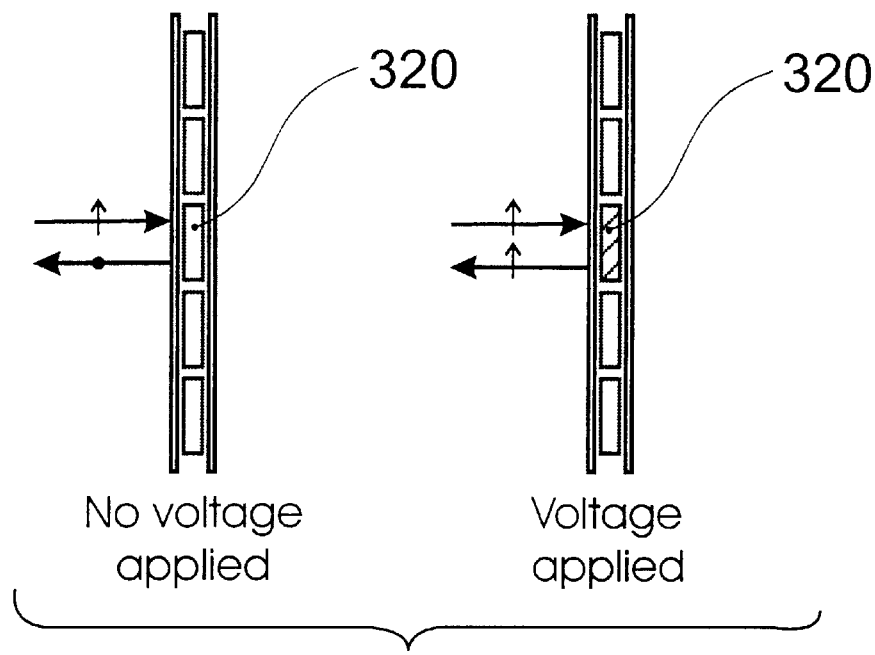
FIG. 36. shows a Imaging element 1 that is a monochrome, reflective, twisted nematic LC panel.
Figure 37:
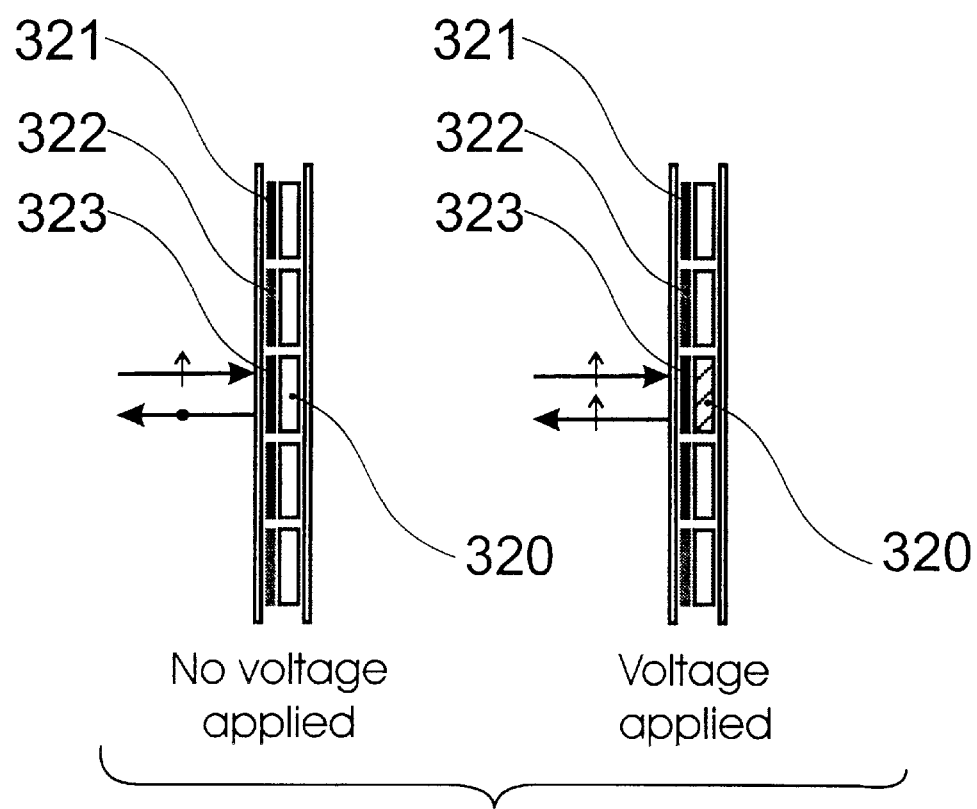
FIG. 37. shows a Imaging element 2 that is a colour, reflective, twisted nematic LC panel.
Figure 38:
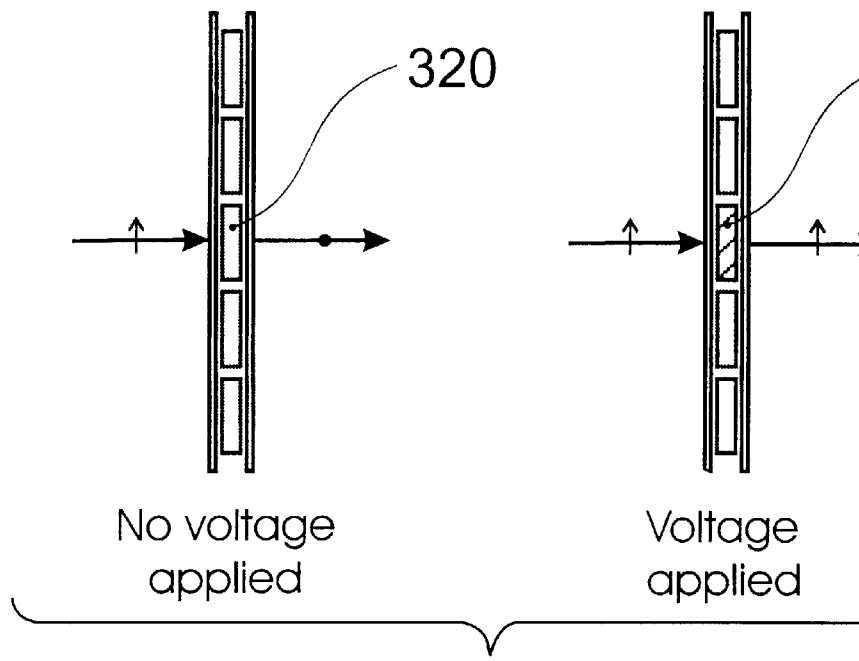
FIG. 38. shows a Imaging element 3 that is a monochrome, transmissive, twisted nematic LC panel.
Figure 39:
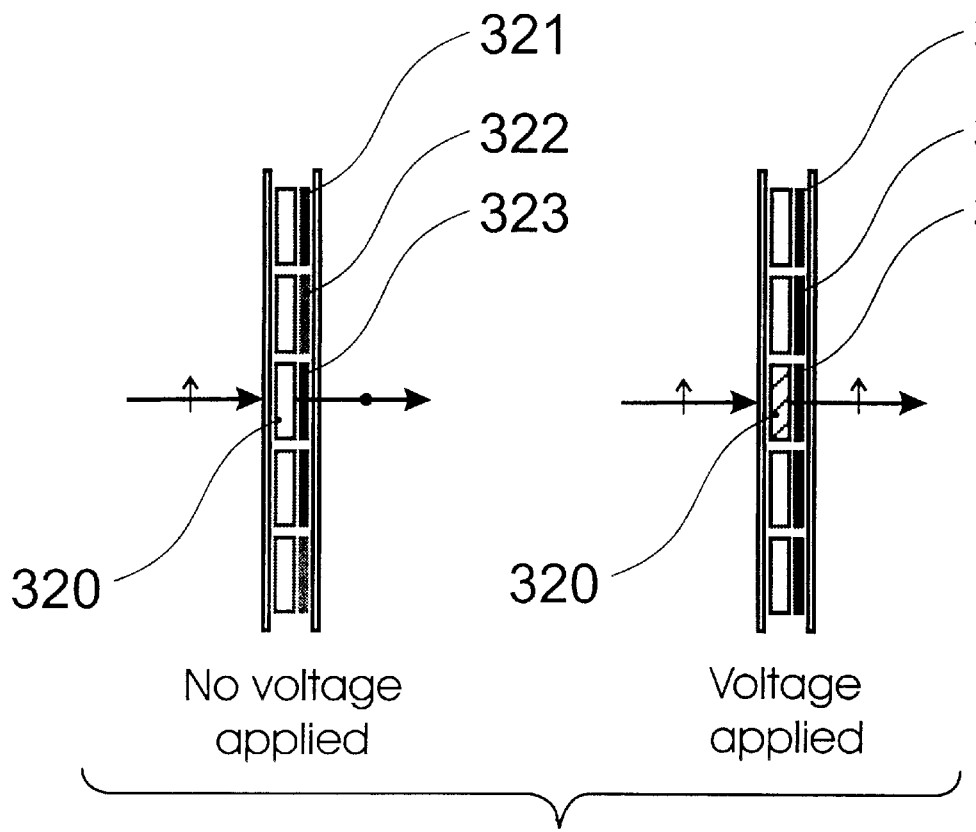
FIG. 39. shows a Imaging element 4 that is a colour, transmissive, twisted nematic LC panel.
Figure 40:
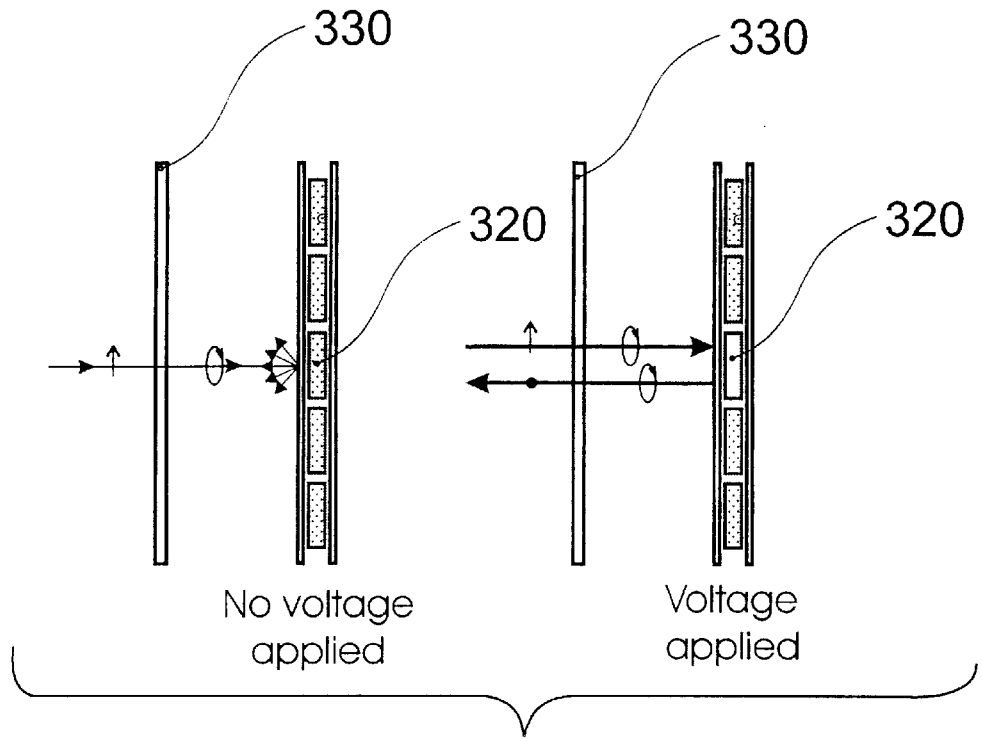
FIG. 40. shows a Imaging element 5 that is a monochrome, reflective, polymer dispersive LC panel with a quarterwave plate.
Figure 41:
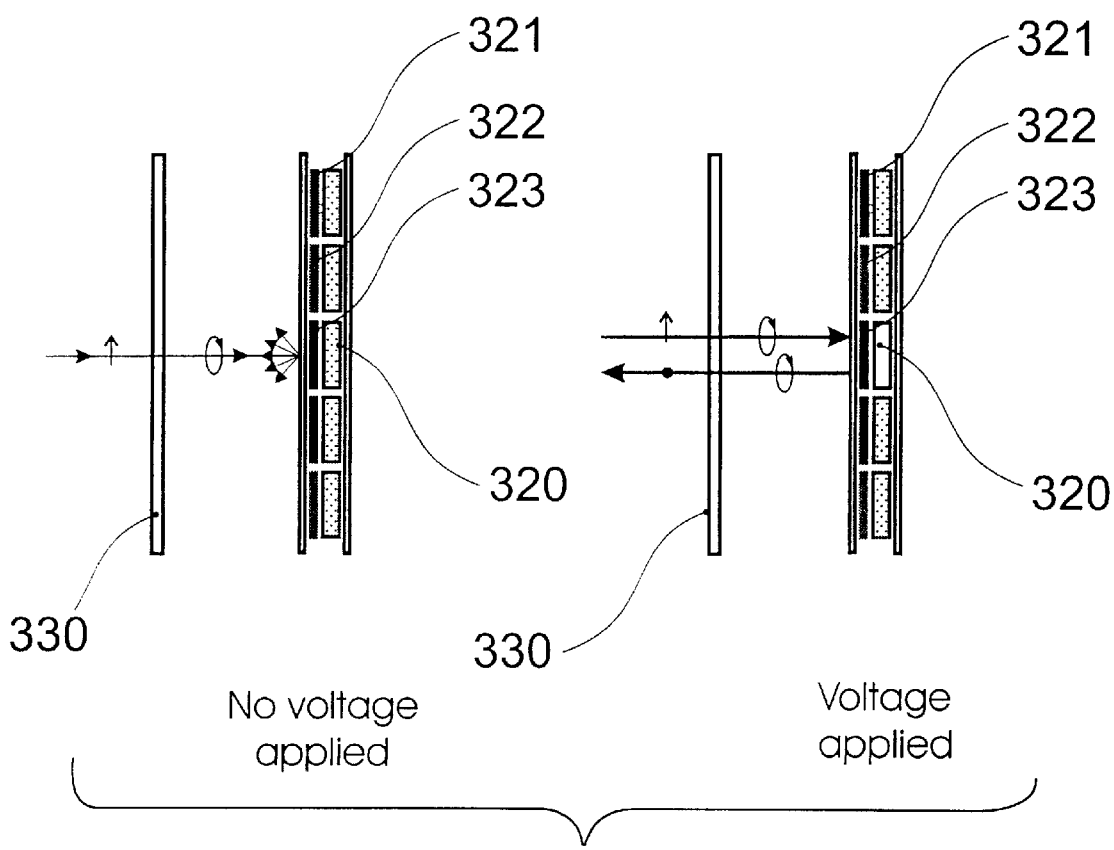
FIG. 41. shows a Imaging element 6 that is a colour, reflective, polymer dispersive LC panel with a quarterwave plate.
Figure 42:
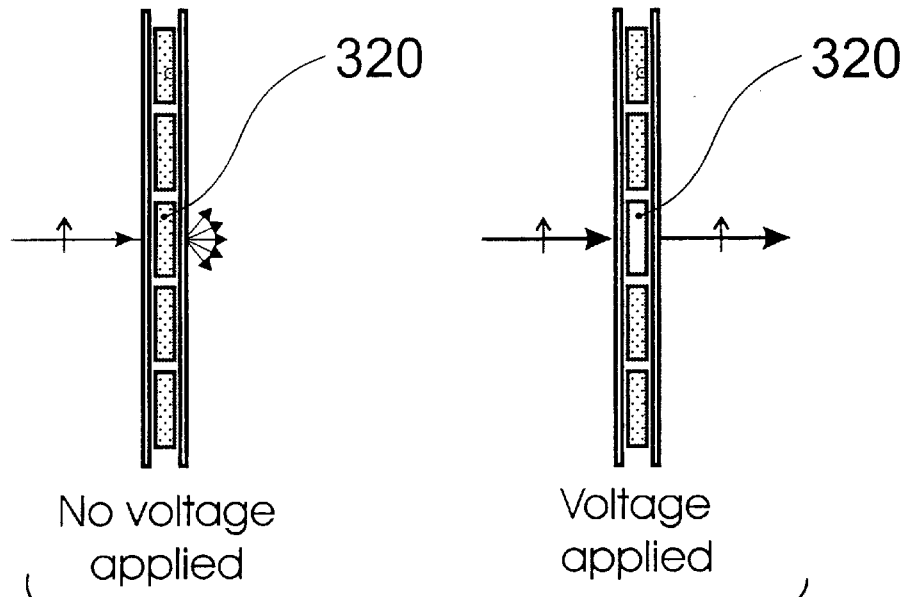
FIG. 42. shows a Imaging element 7 that is a monochrome, transmissive, polymer dispersive LC panel.
Figure 43:
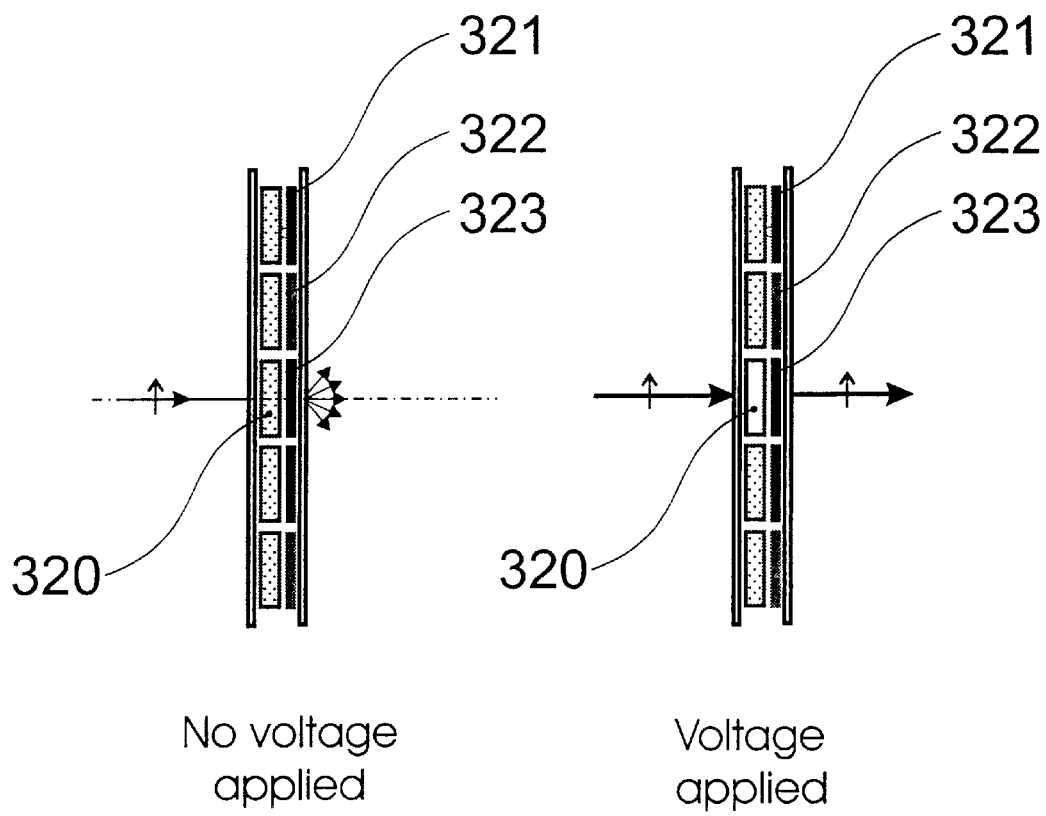
FIG. 43. shows a Imaging element 8 that is a colour, transmissive, polymer dispersive LC panel.
Figure 44:
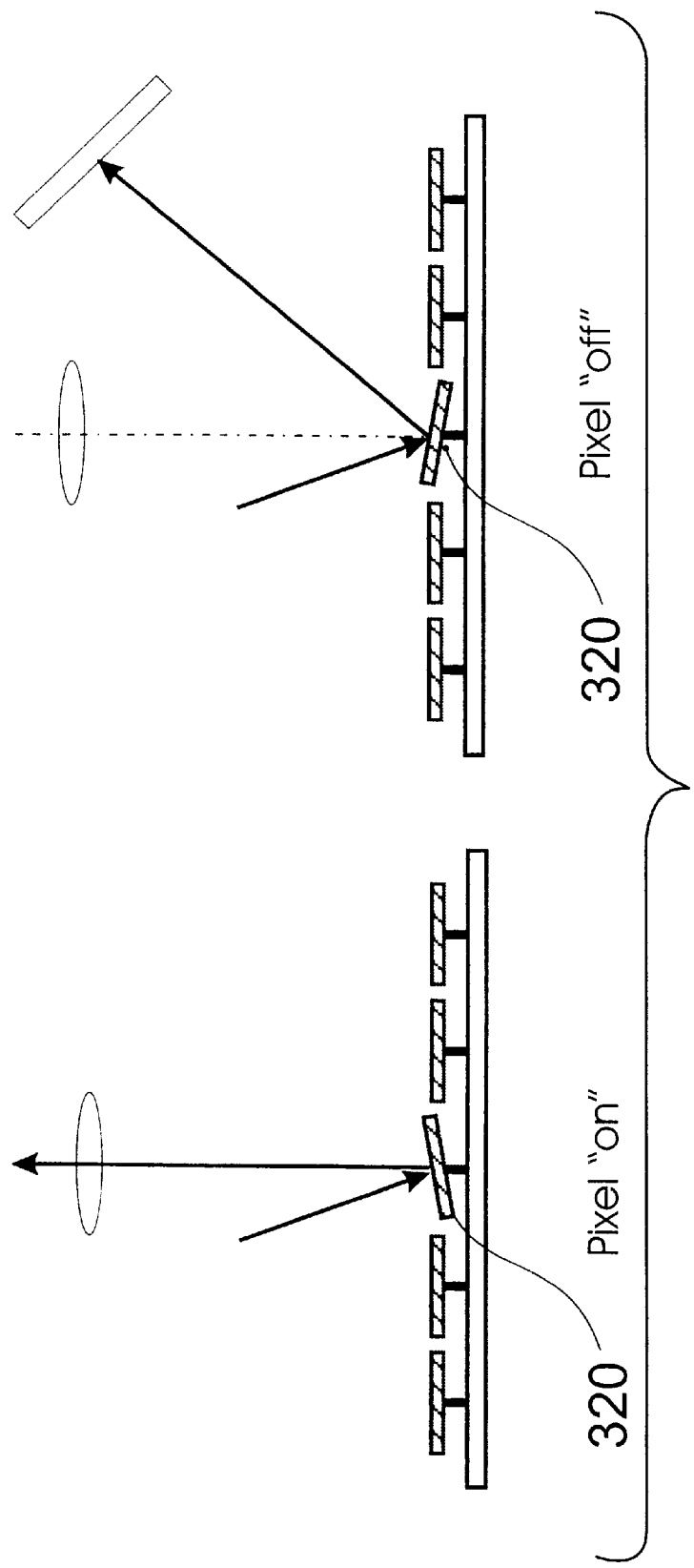
FIG. 44. shows a Imaging element 9 that is a monochrome digital micro-mirror device.
Figure 45:
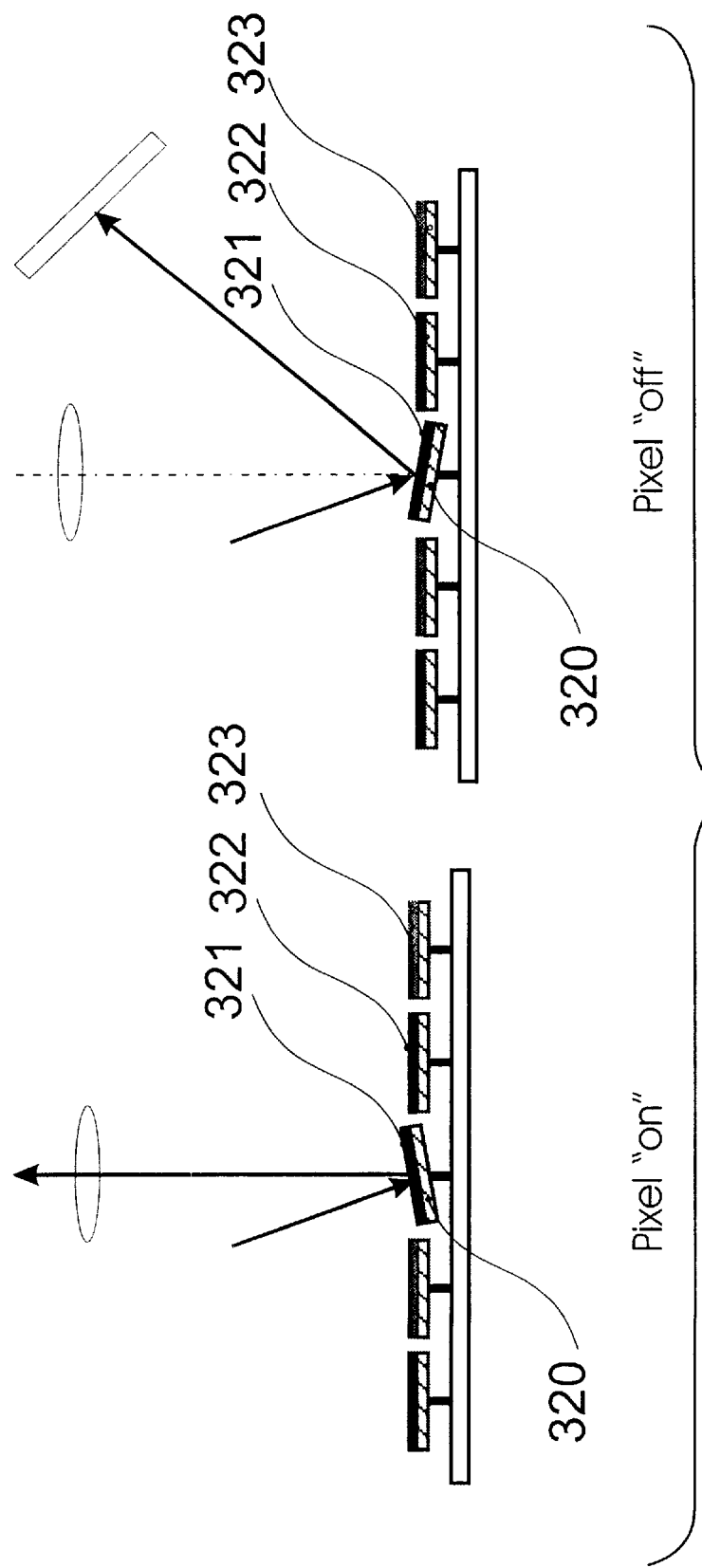
FIG. 45. shows a Imaging element 10 that is a colour digital micro-mirror device.

The imaging elements in FIGS. 36 to 39 are all based on twisted nematic liquid crystal displays. In FIG. 36, imaging element 1 is a monochrome reflective LCD. When no voltage is applied to the liquid crystal cell or pixel 320, the polarization of an incident polarized light is rotated 90°. When a voltage is applied to the liquid cell or pixel, no polarization rotation occurs. The incident beam will retain is original polarization. To view an image, a second polarizer is needed. Imaging element 2 (FIG. 37) is similar to Imaging element 1; however, R, G and B colour filters 321, 322, 323 are added to each individual liquid crystal pixel to only allow the intended colour light to be reflected. Imaging elements 3 and 4, shown in FIGS. 38, 39, are the transmissive versions of imaging elements 1 and 2 respectively. Incident light is transmitted, in stead of reflected by the imaging elements. Imaging elements 5–8, shown in FIGS. 40–43, are based on polymer dispersive liquid crystal displays (PDLCs). In Imaging element 5 (FIG. 40), when no voltage is applied to the pixel 420, the incident light will be scattered and very little light will be collected by an optical system to form images, this pixel is said to be "off". When voltage is applied to the cell or pixel, all the light will be reflected. To use PDLCs in combination with the thin film polarizing beam-splitters, an extra quarterwave plate 330 is added. The purpose of it is to rotate the polarization of the "on" pixels by 90° as in the Imaging element 1–4 case. Imaging elements 6, shown in FIG. 41, is the colour version of Imaging elements 4. Additional R, G, and B filters are added to each individual liquid crystal pixel to form colour pixels. Imagining elements 7–8 are the transmissive versions of imaging elements 4–5. Instead of reflecting light, these imaging elements transmit light. Imagine elements 9–10 (FIGS. 44–45) are based on digital micro-mirror devices. Each individual pixel is a mirror that can reflect the incident beam and can be individually rotated by electronic means to a "on" position in which the reflected light can be collected by an optical system, or to a "off" position in which the reflected light is out of the collecting angle of the optical system and is absorbed by an absorber. Imaging element 9 (FIG. 44) consists of only monochrome mirrors while Imaging element 10 (FIG. 45) consists of colour mirrors as described in U.S. Pat. No. 5,619,059 issued Apr. 8, 1997.

Different embodiments of high efficiency display systems can be formed by combining the above lighting elements, the thin film polarizing devices and the different imaging elements.

Figure 46:
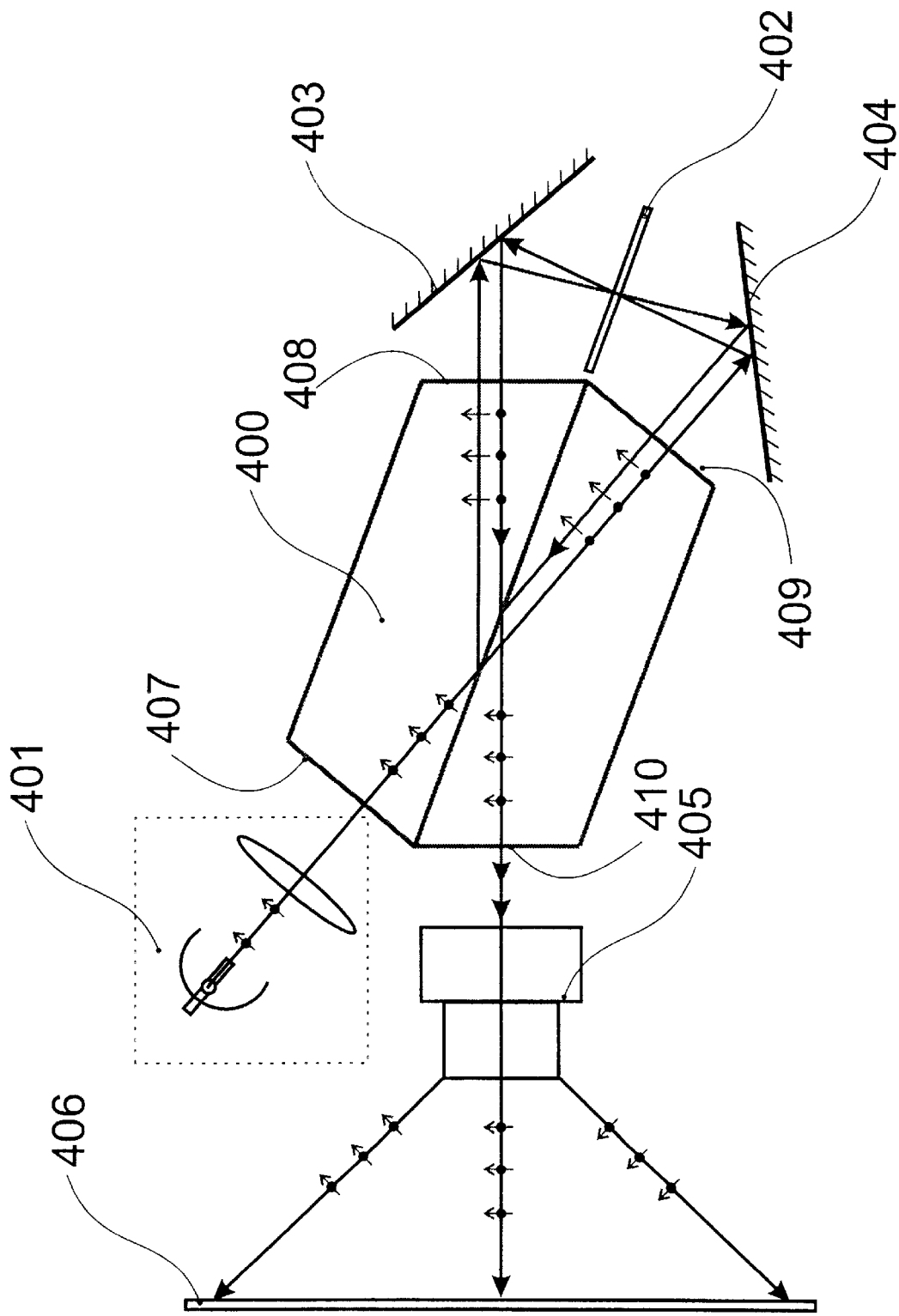
FIG. 46. shows a Imaging system 1 in accordance with the present invention that uses one single transmissive imaging element made of TNLCs or PDLCs with quarterwave plates and are capable of displaying high efficiency 2D images.

In the first embodiment, shown in FIG. 46, Display system 1 consists of a thin film polarizing device 400 in accordance with the present invention, a lighting element 401, a transmissive imaging elements 402 that can be selected from the Imaging elements 3 (TNLC) or 7 (PDLC) to form monochrome images, and the Imaging elements 4 (TNLC) or 8 (PDLC) to form colour images, two mirrors 403, 404, a projection lens 405 and an optional screen 406. In operation, unpolarized light from the lighting element 401 that an be selected from lighting elements 1 to 4 is launched into the end face 407 of the hexagonal thin film polarizing device 400 at an angle of incidence greater than the critical angle at the thin film surface and is split into two polarized light beams by the thin film coating. The p-polarized light is reflected from the thin film layers to the end face 408; the s-polarized light is transmitted through the thin film layers and exits the end face 409.

The reflected p-polarized light exiting the end face 408 is then incident upon the first mirror 403 and is directed to the transmissive imaging element 402. For the "on" pixels, the polarization of the light is not changed by the imaging element; therefore the p-polarized light retains its polarization. After being reflected by the second mirror 404, the transmitted light from the "on" pixels hits the thin film polarizing device 400 through the end face 409, it is reflected again by the thin film layers. The light then exits the end face 410 and is projected onto the screen by the projection lens 405. For the "off" pixels, the polarization of the p-polarized light is rotated 90° by the imaging element 402 and becomes s-polarized. Therefore, the light is transmitted back off the thin film layers toward the lighting element 401 and is not projected onto the screen.

The transmitted s-polarized light exiting the end face 409 is first incident upon the second mirror 404 and is directed to the transmissive imaging element 402. For the "on" pixels, the polarization of the light is not changed and the s-polarized light remains its polarization and is subsequently transmitted again by the thin film polarizing device 400 and projected onto the screen. The light from the "off" pixels is rotated 90° and is sent back toward the lighting element 401.

In this embodiment, to form colour images, a white lighting element 1 in combination with colour TNLC or PDLC can be used, or colour lighting element 2–4 in combination with monochrome TNLC or PDLC can be used. Since both s-polarized and p-polarized light are completely used for imaging, no light loss is present due to their polarization. Therefore, very high efficiency 2D projection display can be obtained. In addition, this embodiment is very compact and can be made in low cost.

Figure 47:
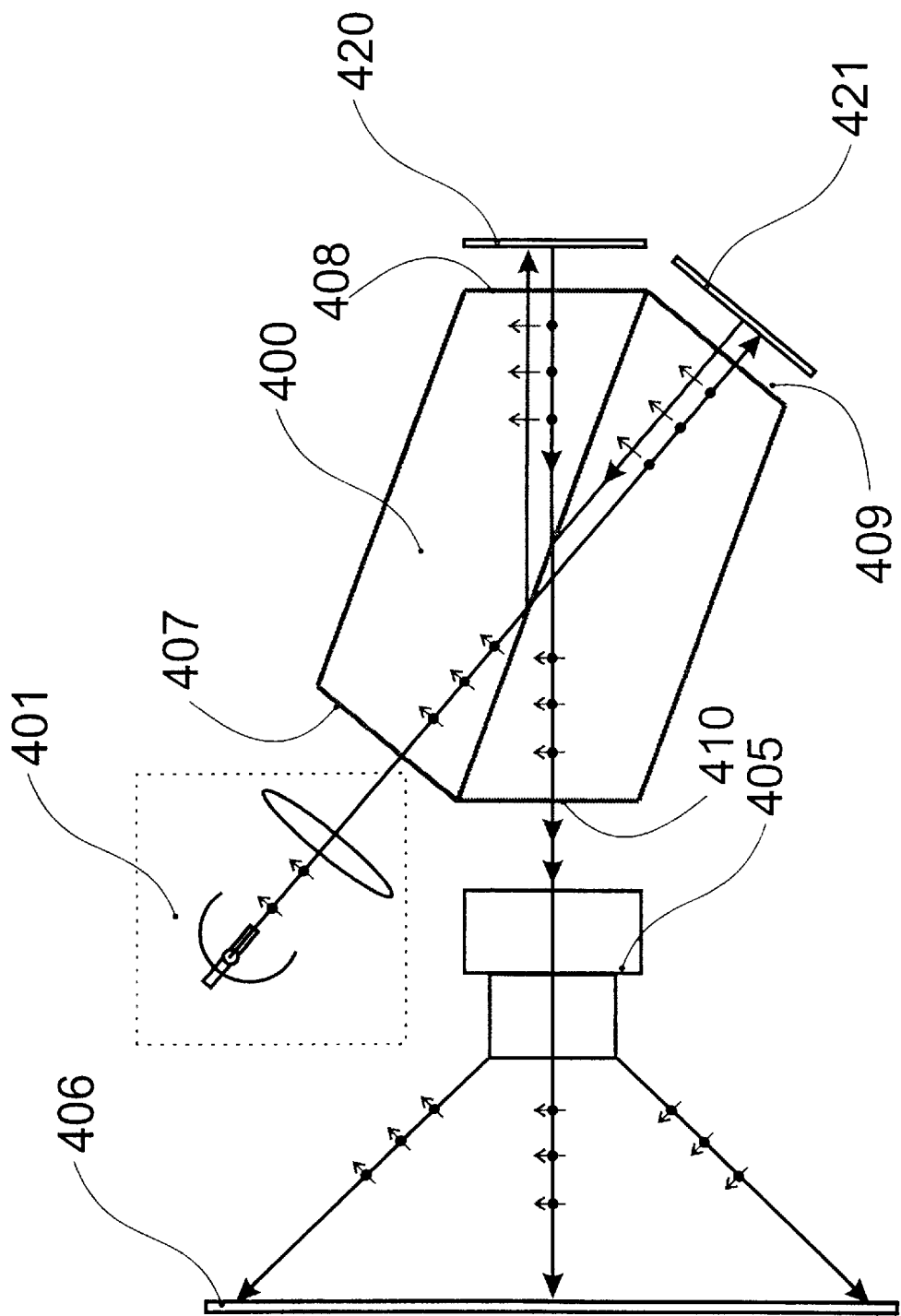
FIG. 47. shows a Imaging system 2 in accordance with the present invention that uses two reflective imaging elements made of TNLCs or PDLCs and are capable of displaying high efficiency 2D and 3D images.
Figure 48:
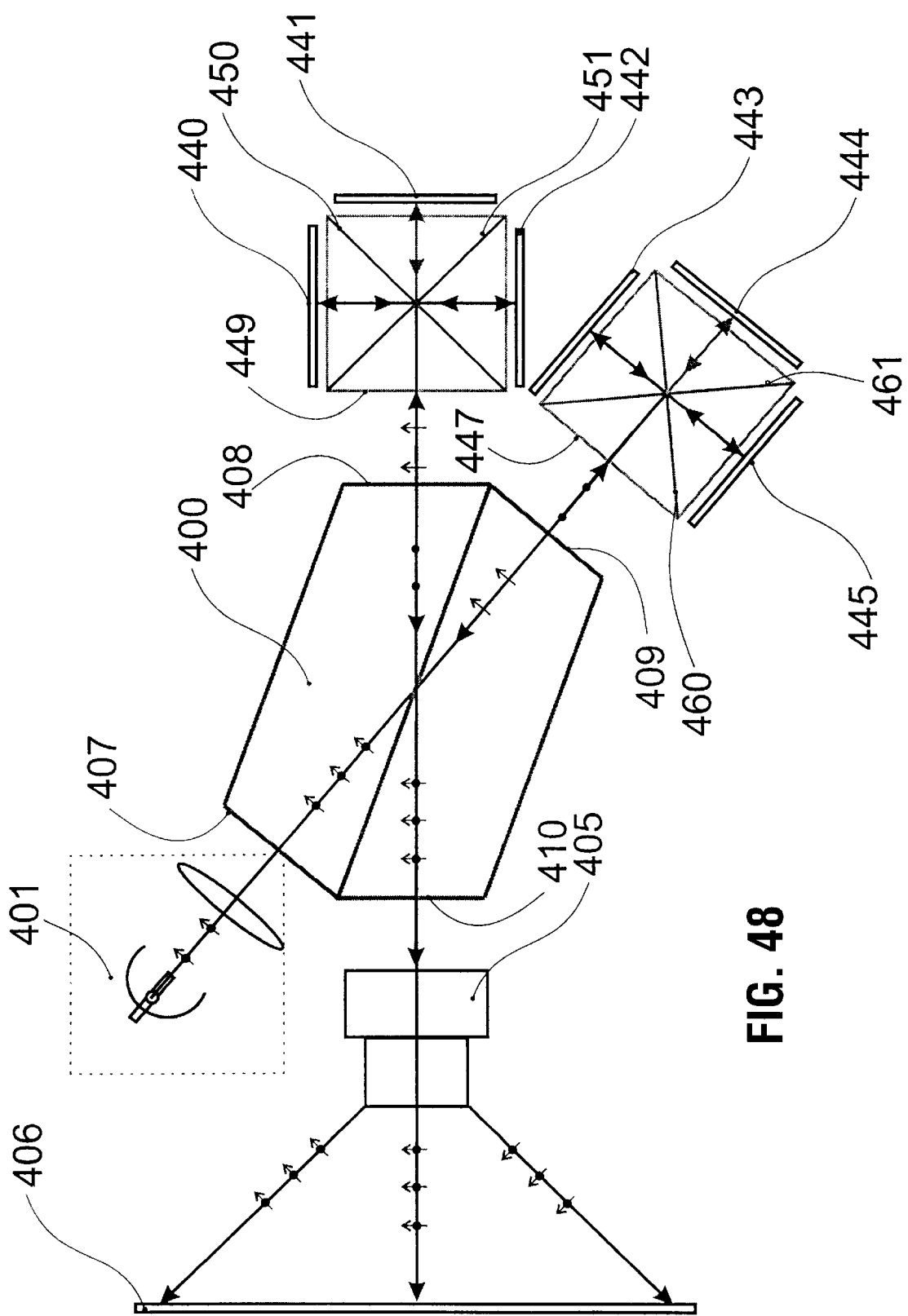
FIG. 48. shows a Imaging system 3 in accordance with the present invention that uses six reflective imaging elements made of TNLCs or PDLCs with quarterwave plates and are capable of displaying super high efficiency 2D and 3D images.
Figure 49:
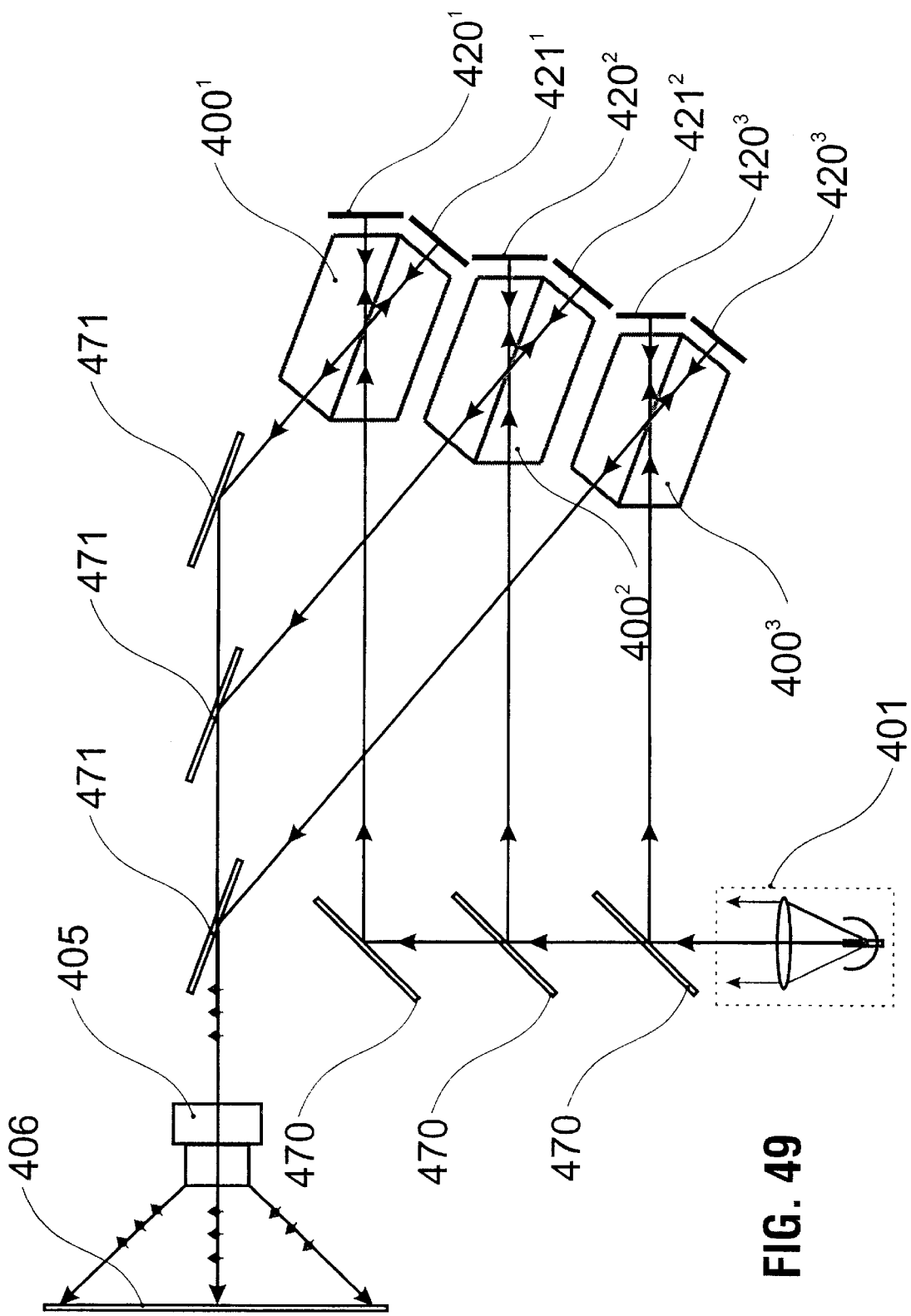
FIG. 49. shows a Imaging system 4 in accordance with the present invention that also uses six reflective imaging elements made of TNLCs or PDLCs with quarterwave plates and are capable of displaying super high efficiency 2D and 3D images.

Display system 2, shown in FIG. 47, consists of a thin film polarizing device 401, a lighting element 401, two identical reflective imaging elements 420 and 421 that can be selected from the Imaging elements 1 (TNLC) or 5 (PDLC) to form monochrome images, and the Imaging elements 2 (TNLC) or 6 (PDLC) to form colour images, a projection lens 405 and an optional screen 406. In operation, unpolarized light from the lighting element 401 is launched into the end face

407 of the thin film polarizing device 400 and is split into two polarized light beams by the thin film coating. The p-polarized light is reflected from the thin film layers to the end face 408; the s-polarized light is transmitted through the thin film layers and exits the end face 409.

The reflected p-polarized light exiting the end face 408 is then incident upon the first reflective imaging element 420. For the "on" pixels, the polarization of the light is rotated 90° by the imaging element; therefore the p-polarized light becomes as s-polarized. When the reflected light from the "on" pixels again hits the thin film polarizing device 400 through the end face 408, it is transmitted through by the thin film layers and exits at the end face 410 and then is projected onto the screen by the projection lens 405. For the "off" pixels, the polarization of the light is not changed by the imaging element 420 and, therefore, the light is reflected back off the thin film layers toward the lighting element 401 and is not projected onto the screen. In this case, the projected image coming from the imaging device 420 only consists of s-polarized light.

The transmitted s-polarized light exiting the end face 409 is then incident upon the second reflective imaging element 421. For the "on" pixels, the polarization of the light is rotated 90° by the imaging element, therefore the s-polarized light becomes as p-polarized. When the reflected light from the "on" pixels again hits the thin film polarizing device 400 through the end face 409, it is reflected by the thin film layers and then projected onto the screen by the projection lens 405. For the "off" pixels, the polarization of the light is not changed by the imaging element 421 and, therefore, the light is transmitted back off the thin film layers toward the lighting element 401 and is not projected onto the screen. In this case, the projected image only consists of p-polarized light.

In this embodiment, to form colour images, a white lighting element 1 in combination with the colour TNLC or PDLC can be used, or colour lighting element 2–4 in combination with monochrome TNLC or PDLC can be used. Clearly, if the images on the imaging elements 403 and 404 are identical and are mirror images of each other, the combined images will be identical too, and a single 2-D image is seen on the screen. In addition, if the images on the imaging elements 420 and 421 represent right-eye and left-eye images (also mirror images in one case), the combined images can be viewed through a polarizing glass and three-dimensional effects can be perceived. Since both s-polarized and p-polarized light are fully used for imaging. No light lost is present due to their polarization. Therefore the display is very efficient and compact when compared to conventional LCDs. Therefore, very high efficiency projection display that is capable of displaying 2D and 3D images can be obtained. 2D and 3D display mode can be easily switched by just changing the input image signals to the imaging elements. No optical reconfiguration is required for displaying 3D images except that viewers have to wear polarizing glasses. This embodiment are specially suitable to home theater.

Display system 3 is a super high efficiency 2D/3D projection display. It consists of one thin film polarizing device 400, a lighting element 401 that emits white light, six identical reflective imaging elements 440, 441, 442, 443, 444, and 445 that can be selected from monochrome Imagining elements 1 (TNLC) or 5 (PDLC), two identical "X" shape colour separation cubes or plates 446, 447, a projection lens 405 and an optional screen 406. In operation, unpolarized light from the lighting element 401 is launched into the end face 407 of the thin film polarizing device 400 and is split into two polarized light beams by the thin film coatin. The p-polarized light is reflected from the thin film layers to the end face 408; the s-polarized light is transmitted through the thin film layers and exits the end face 409.

The reflected p-polarized light exiting the end face 408 is then incident upon the first "X" colour cube 446. The coating 450 reflects red light and transmits green light. The coating 451 reflects blue light and transmits green light. The red, green and blue light beams are separated by the first "X" colour cube 446 and are incident upon the three corresponding monochrome reflective imaging elements 440, 441 and 442 respectively. These monochrome reflective imaging elements are fed with the corresponding colour images. For "on" pixels, the polarization of the light is rotated 90° by all three imaging elements, therefore the p-polarized light becomes as s-polarized. The three colour images from the three imaging elements are combined by the "x" cube again, in the same way as it separates the colours, to form a full colour image. When the reflected light from the "on" pixels again hits the thin film polarizing device through the end face 408, it is transmitted through by the thin film layers and then projected onto the screen by the projection lens 405. For the "off" pixels, the polarization of the light is not changed by the imaging element 440, 441, 442 and, therefore, the light is reflected back off the thin film layers toward the lighting element 401 and is not projected onto the screen. In this case, the projected image only consists of s-polarized light.

The transmitted s-polarized light exiting the end face 409 is then incident upon the second "X" colour cube 447. The coating 460 reflects red light and transmits green light. The coating 461 reflects blue light and transmits green light. The red, green and blue light beams are separated by the second "X" colour cube 447 and are incident upon the three corresponding monochrome reflective imaging elements 443, 444, and 445 respectively. These monochrome reflective imaging elements are fed with the corresponding colour images. For "on" pixels, the polarization of the light is rotated 90° by all three imaging elements, therefore the s-polarized light becomes as p-polarized. The three colour images from the three imaging elements are combined by the "X" cube again, in the same way as it separates the colours, to form a full colour image. When the reflected light from the "on" pixels again hits the thin film polarizing device 400 through the end face 409, it is reflected by the thin film layers and then projected onto the screen by the projection lens 405. For the "off" pixels, the polarization of the light is not changed by the imaging element 443,444,445 and, therefore, the light is transmitted back off the thin film layers toward the lighting element and is not projected onto the screen. In this case, the projected image only consists of p-polarized light.

Clearly, if the colour images on all the imaging elements 440, 445, 441 and 444, 442 and 443 are identical and are mirror image of their counter-parts, the combined full images will be identical too, and a single 2-D image will be seen on the screen. In addition, if the images on the imaging elements 440, 441, 442 and 443, 444, 445 represent right-eye and left-eye images (also mirror images in one case), the combined images can be viewed through a polarizing glass and three-dimensional effects can be perceived. 2D and 3D display mode can be easily inter changed by just changing the input image signals to the imaging elements. No optical reconfiguration is required for displaying 3D images except that viewers have to wear polarizing glasses.

In this embodiment, the white light is first separated into two polarized beams, then each polarized beam is split to three primary colours which are directed to the corresponding imaging elements. No light is lost at all either due to polarization or due to colour. Therefore, super high efficiency projection display can be obtained. This embodiment are specially suitable to entertainment applications such as movie theaters.

Display system 4 is also a super high efficiency 2D/3D projection display. It consists of three thin film polarizing devices 400$^1$, 400$^2$, and 400$^3$, a lighting element 401 that emits white light, six identical reflective imaging elements 420$^1$, 421$^1$, 420$^2$, 421$^2$, 420$^3$, and 421$^3$ that can be selected from monochrome Imagining elements 1 (TNLC) or 5 (PDLC), two sets dichroic colour filter 470, 471, a projection lens 405 and an optional screen 406. The operation of this embodiment is very similar to that of the Display system 2 except that the light incident upon the thin film polarized devices is already separated into colours. In addition, the operation of the Display system 4 has some similarity to the Display system 4. In Displays system 3, the sequence of operation is like this: white light→separating polarization→separating colour→forming colour images→combining colour images→combining polarizations. In Display system 4, the order is changed to the white light→separating colours→separating polarizations→forming colour images→combining polarizations→combining colours. It is clear, the advantages that Display system 2 has also applied to Display system 4. Super high efficiency projection displays that are capable of displaying 2D/3D images can also be obtained in this embodiment.

Figure 50:
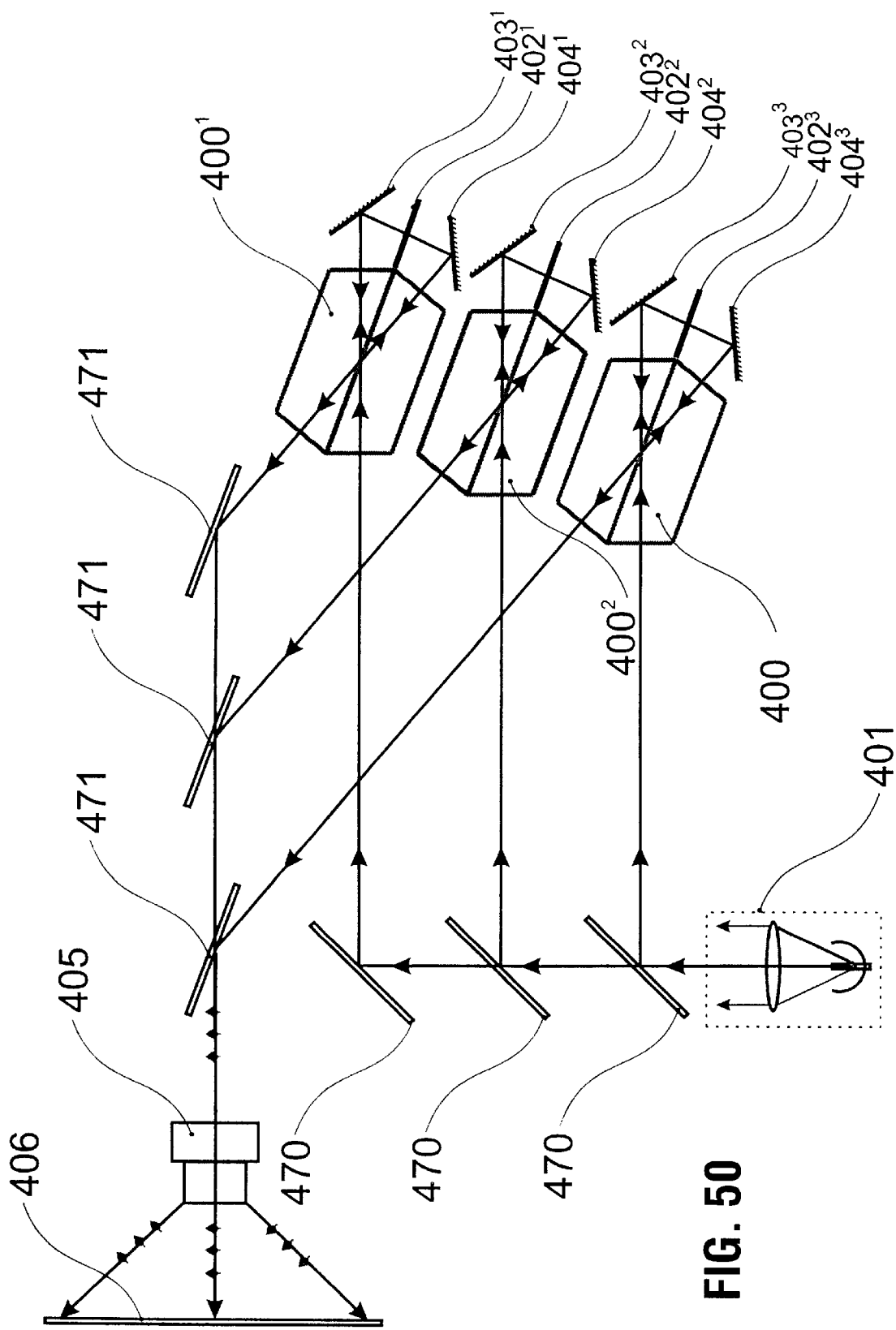
FIG. 50. shows a Imaging system 5 in accordance with the present invention that uses three transmissive imaging element made of TNLCs or PDLCs and are capable of displaying super high efficiency 2D images.

An alternative embodiment of Display system 4 is Display system 5, shown in FIG. 50. In operation, this embodiment is very similar to Display system 1 except that the light incident upon the thin film polarized devices is already separated into colours. It is also similar to Display system 4 except that instead of using six reflective imaging elements, it uses only three transmissive imaging elements 402$^1$, 402$^2$, 402$^3$. It is capable of displaying super high efficiency 2D images.

Figure 51A:
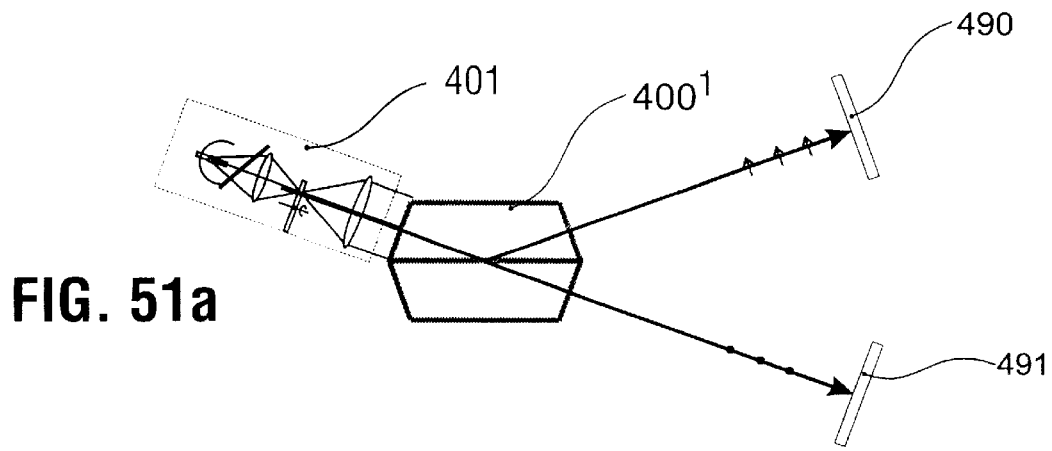
FIGS. 51a to 51c show respectively a cross-sectional view along the line A—A in FIG. 51b, an underneath view, and a cross-sectional view along the line B—B in FIG. 51b.
Figure 51B:
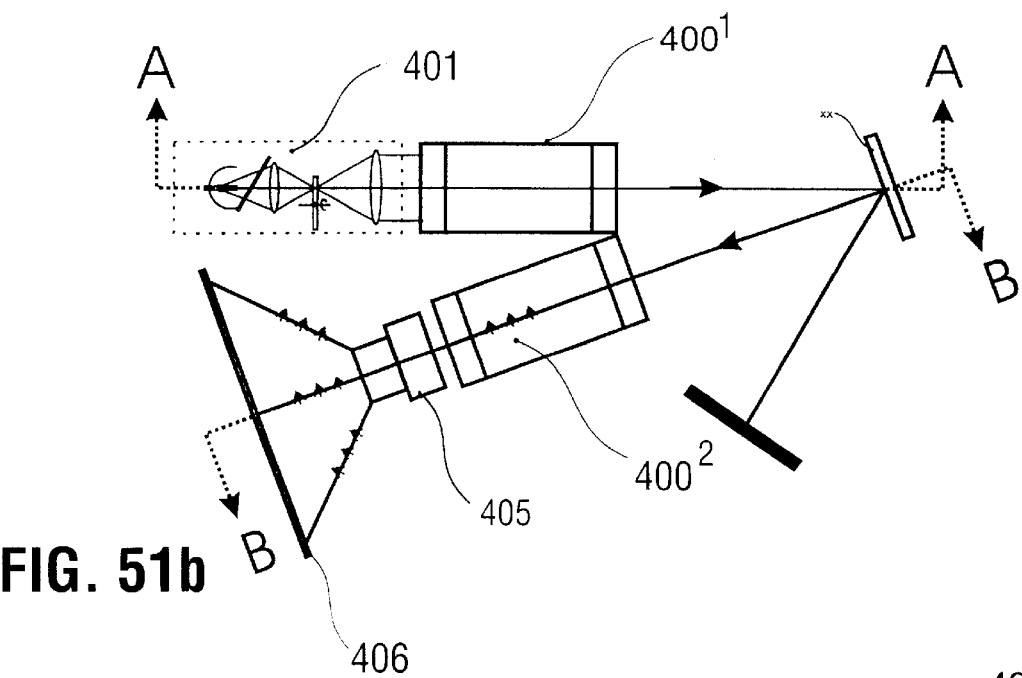
Figure 51C:
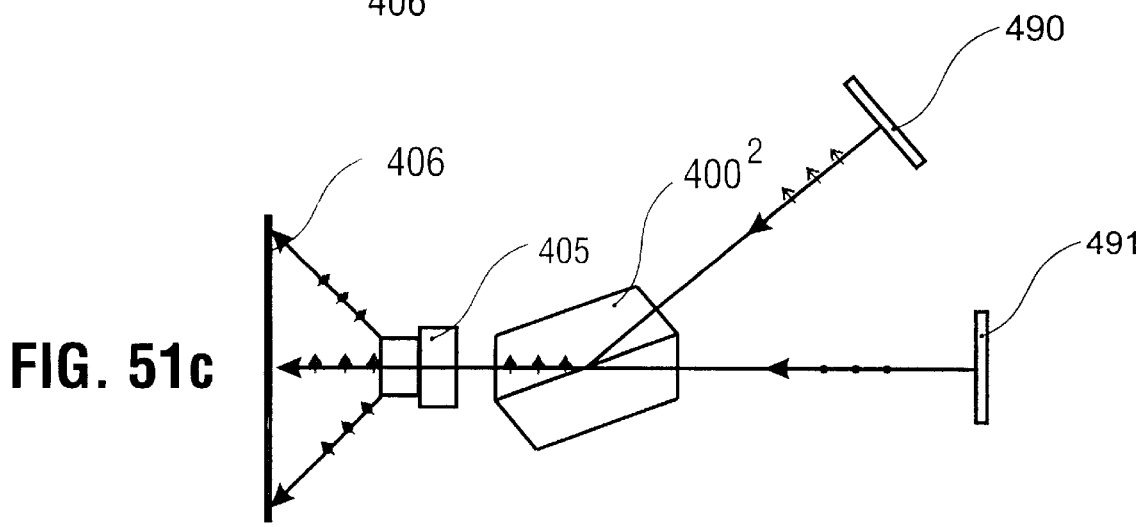

Another embodiment of Display system 6 is suitable for projection high efficiency 2D and 3D images with two DMDs. The top view of the system is shown in FIG. 51$b$. It consists of two identical thin film polarizing devices 400$^1$ and 400$^2$ in accordance with the present invention, a lighting element 401, two identical imaging elements 490 and 491, one for separating the unpolarized light and one for combining the polarized light, made of DMDs (Digital Micro Mirrors), a projection lens 405 and an optional screen 406. In operation, unpolarized light from the lighting element 401 is launched the first thin film polarizing device 400$^1$ and is split into two polarized light beams by the thin film coating 419. The p-polarized light is reflected from the thin film layers 419 to the end face 408$^1$; the s-polarized light is transmitted through the thin film layers 419 and exits the end face 409$^1$.

The reflected p-polarized light exiting the end face 408$^1$ is then incident upon the first DMD 490. For the "on" pixels, the light from DMDs is reflected at an "off" angle about 20° from the incident beam and is directed to the second polarizing device 400$^2$. Since the polarization of the light is not changed by the DMD, the light is reflected by the second thin film polarizing device 400$^2$ is projected onto a screen 406. For "off" pixels, the light from the DMD is reflected at an "off" angle about 60° from the incident beam and is out of the collecting angle of the projection lens 405 and is absorbed by an absorber. In this case, the projected image only consists of p-polarized light.

The transmitted s-polarized light exiting from the first thin film polarizing device 400$^1$ is then incident upon the second DMD 491. For the "on" pixels, the light from DMDs is reflected at an "off" angle about 20° from the incident beam and is directed to the second polarizing device 400$^2$. Since the polarization is not changed by the DMD and light is reflected again by the second thin film polarizing device 400$^2$ and is projected to a screen 406. For "off" pixels, the light from the DMD is reflected at an "off" angle about 60° from the incident beam and is out of the collecting angle of the projection lens and is absorbed by an absorber. In this case, the projected image only consists of s-polarized light.

Clearly, if the images on the imaging elements 490 and 491 are identical but mirror images of each other, the combined image is identical too and a 2D image is formed. In addition, if the images on the imaging elements represent right-eye and left-eye images (also mirror images in one case), the combined image is a 3D image and can be viewed through a polarizing glasses. In this embodiment, 2D and 3D display mode can be easily inter-changed by just changing the input image signals to the imaging elements. No optical reconfiguration is required for displaying 3D images except that viewers have to wear polarizing glasses.

To form fill colour images, colour lighting systems in combination with monochrome DMDs can be used. For example, a colour filter wheel with red, green and blue filters as in Lighting system 2 can be used to form a colour image. In this case, only one colour is displayed at any given time. The perceived colour will be the time-integrated result of the three primary colours. Alternatively, a white lighting system in combination with colour DMDs can be used. For example, tow DMDs (digital micro mirrors) with integrated colour filters disclosed in U.S. Pat. No. 5,619,059 by LiLi, J. A. Dobrowolski, P. D>Grant and B. T. Sullivan entitled "Colour Deformable Mirror Device Having Optical Thin film Interference Colour Coatings". In addition, more complicated and super high efficiency display systems that use more than three DMDs can be formed by expanding Display system 6 in the same way as in Display systems 3 and 4.

Figure 52:
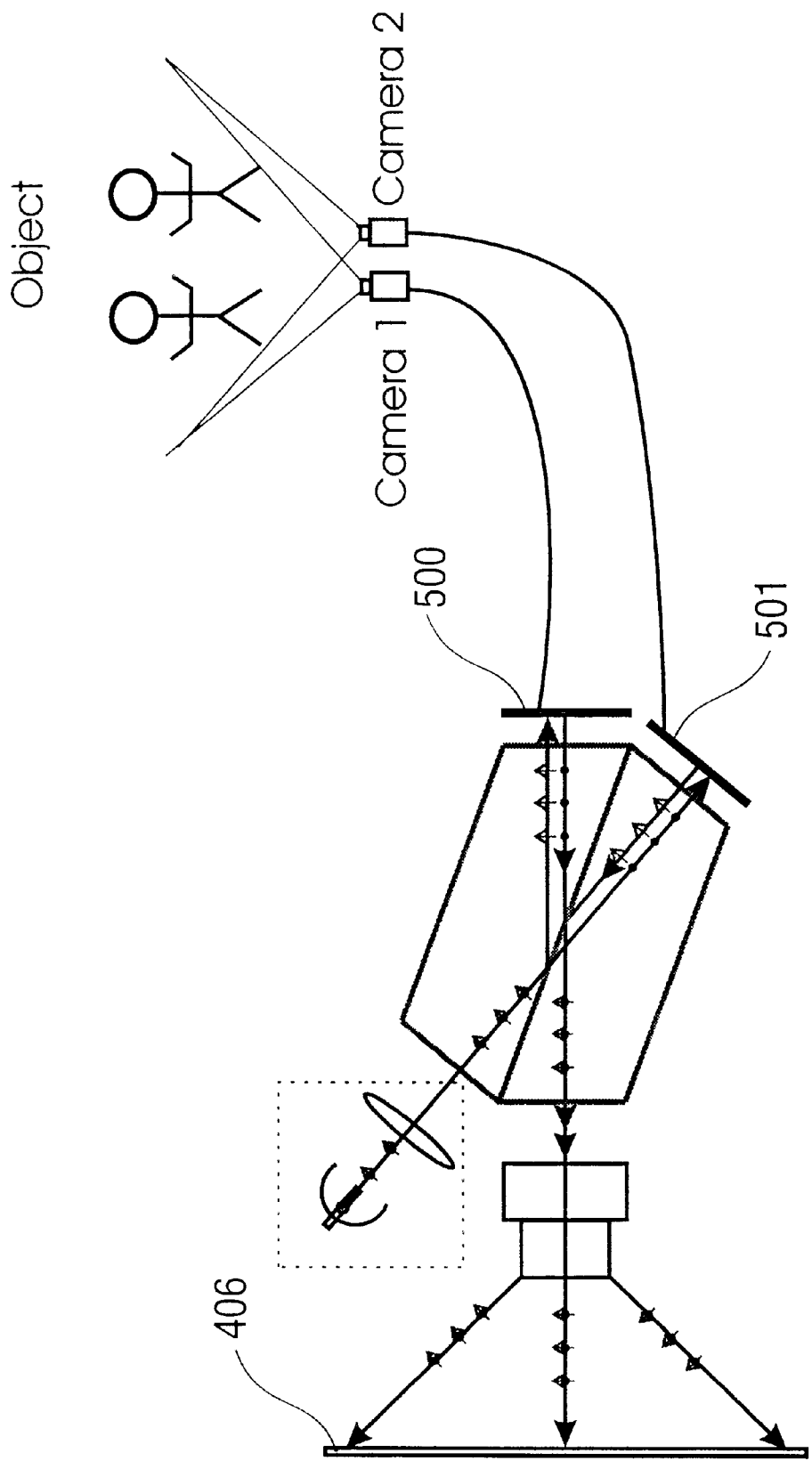
FIG. 52. is a pictorial view of a 3-D projection display system.

As previously stated, in the above Displays systems 2, 3, 4, and 6, the polarization of the light beams returning from the two spatial light modulators are different; one beam is p-polarized and the other is s-polarized. Advantageously, this is an ideal situation for forming 3-D images. To do so, it is necessary for each of the images of the two panels to be recorded by each of two cameras representing the left and right eyes, respectively, as demonstrated in pictorial view FIG. 52. To provide a 3-D image, a scene is recorded by each of two cameras which are disposed at different, offset locations. Thus a first camera records a scene from a first location and a second camera, offset from the first camera, records essentially the same scene from a different location. Preferably, the offset is approximately a distance between the eyes of an average person or a distance related thereto and to the nature of the camera lenses employed. In order for a viewer to perceive 3-D effect the scene recorded by the first camera is viewed by only one of the viewer's eyes. Furthermore, the scene recorded by the second camera is viewed by the other of the viewer's eyes. The configuration shown and described with reference to FIG. 52 lends itself to this 3-D recording and viewing.

The extension of the invention from two dimensions to three dimensions is possible in many display configurations. Therefore, the above configurations can be used equally well for both 2-D and 3-D images The invention uses both s and p-polarization to provide 2-D images which are twice as bright as conventional systems that utilize only one polarization state. Furthermore, the invention provides a novel method of providing and displaying 3D images.

To summarize, in all the described preferred high efficiency projection display embodiments, the thin film polarizing device acts both as the first and as the second polarizer. It has high transmittance and reflectance for the desired polarization, broad bandwidth, larger angular field and very high extinction ratios for both transmitted and reflected light. All light is used for imaging and no light is lost due to undesired polarization and by the thin film polarizing device. Therefore, it solves the problems associated with the use of dichroic sheet polarizers in conventional liquid crystal displays. The preferred display systems are high efficient and can employ high power light sources because of the use of both planes of polarization and the non-absorbing nature of the thin film polarizing devices. In addition, they can also be made very compact since the same thin film polarizing device can act as both the first and second polarizers. Furthermore, high contrast images can be obtained because of the high extinction ratio of the thin film polarizing device. Also, large aperture lighting and projecting optics can be used due to the wide angular field of the thin film polarizing device, which in turn, also enhances the efficiency of the display systems. Finally, most of the display systems are capable of displaying high efficiency 2D and 3D images.

Numerous embodiments of high efficiency display systems that use different configurations and other types of imaging elements can be envisaged without departing from the scope of the invention. As pointed out above, as one skilled in the are would appreciate, it is possible to employ a second thin film polarizer for combining the encoded beams, although the preferred embodiment employs a common device.

We claim:

1. A projection display system comprising:
   a light source for generating an input beam of light;
   a polarizing beam discriminator employing frustrated total internal reflection and thin film interference to discriminate between s and p polarized light, said discriminator separating s and p polarized light beams from said input beam;
   spatial light modulator means for encoding an image onto said respective s and p polarized beams;
   means for combining said encoded s and p polarized beams into an output beam, said combining means employing frustrated total internal reflection and thin film interference; and
   means for focussing the output beam onto a display means.

2. A projection display system as claimed in claim 1, wherein said means for combining said s and p encoded polarized beams into an output beam is provided by said polarizing beam discriminator.

3. A projection display system as claimed in claim 1, wherein said means for combining said s and p encoded polarized beams into an output beam is provided by a second polarizing beam discriminator employing frustrated total internal reflection and thin film interference to discriminate between s and p polarized light.

4. A projection display system as claimed in claim 1, wherein said spatial light modulator means creates an encoded output beam wherein respective image and non-image components of the beam have orthogonal planes of polarization.

5. A projection display system as defined in claim 4, wherein the or each polarizing beam discriminator comprises first and second light transmissive substrates, and a plurality of thin film layers disposed between the first and second light transmissive substrates and having predetermined thicknesses and refractive indices for allowing unpolarized incident light to be separated into s-polarized and p-polarized light beams, wherein frustrated total internal reflection and thin film interference are simultaneously employed to allow s-polarized light to be transmitted and p-polarized light to be reflected over a wide range of wavelengths and angles of incidence.

6. A projection display system as defined in claim 1, wherein the or each polarizing beam discriminator comprises a thin film polarizing device, for separating s-polarized light and p-polarized light by reflecting p-polarized light and transmitting s-polarized light comprising first and second light transmissive substrates, and a plurality of thin film layers disposed between the first and second light transmissive substrates, the thin film layers comprising high refractive index layers and low refractive index layers, the high refractive index layers having one or more different refractive indices, and the low refractive index layers having one or more different refractive indices, and the first and second light transmissive substrates, each in the form of a prism having a refractive index greater than the refractive index of each of the low refractive index layers, the prisms being shaped in such a manner as to allow the incident light to be incident upon the thin film layers at a plurality of angles greater than or equal to the critical angle for the highest refractive index of the low refractive index layers, the thickness of the low refractive index layers of the plurality of thin film layers being small enough so that light incident upon the thin film layers at an angle greater than the critical angle can be partially coupled out through the low refractive index layers such that frustrated total internal reflection occurs, thus permitting interference to take place between the light reflected at the interfaces of all the thin film layers, and in addition, the thicknesses of the thin film layers being such that an equivalent optical admittance of the plurality of the thin film layers for s-polarized light is substantially the same as an optical admittance of the substrate for s-polarized light for a wide range of angles of incidence and a broad band of wavelengths when the incident light is incident upon the low refractive index layers at an angle greater that the critical angle, thereby allowing substantially all the incident s-polarized light to be substantially transmitted, the plurality of the thin film layers having an equivalent optical admittance for p-polarized light that is substantially different from the optical admittance of the substrate for p-polarized light for a wide-range of angles of incidence and a broad-band of wavelengths and thus substantially reflecting the incident p-polarized light.

7. A projection display system as defined in claim 1, wherein the polarization beam discriminator has input and output end faces forming an inside angle greater than 90 degrees.

8. A projection display system as defined in claim 1, wherein said spatial light modulator means comprises a spatial light modulator for each of said polarized beams, each said spatial light modulators being provided with a signal representative of a different image.

9. A projection display system as defined in claim 8, further comprising means for providing information corresponding to two images in the form of a recorded output signal.

10. A projection display system as defined in claim 9, wherein the means for providing information corresponding to two images are in the form of a video output signal.

11. A projection display system as defined in claim 1, wherein said polarizing beam discriminator comprises a prism having first and second pairs of obliquely inclined first and second active faces, said first active face of said first pair receiving the input beam and said second active face of said first pair providing the output beam, said first active face of the second pair providing a first beam of one plane of polarization and said second active face of the second pair providing a second beam having a plane of polarization orthogonal to said first beam.

12. A projection display system as defined in claim 11, wherein said spatial light modulator means comprises a transmissive imaging element through which said p and s polarized beams are transmitted, said imaging element encoding an image onto said polarized beams in such a way that the image component of the transmitted beam has the same plane of polarization as the input beam, and mirrors are provided to reflect each modulated light beam back into the prism through the other active face of the pair from which it emerged.

13. A projection display system as defined in claim 11, wherein said spatial light modulator means comprises a pair of reflective imaging elements corresponding to said respective p and s polarized light beams, said imaging elements encoding an image onto said polarized beams in such a way that the image component of the reflected beam has the opposite plane of polarization as the input polarized beam, said reflective imaging elements returning each modulated light beam through the active face from which it emerged.

14. A projection display system as defined in claim 1, wherein said light source is a white light source and the pixels of the imaging elements are provided with different colour filters to provide a colour display.

15. A projection display system as defined in claim 12, wherein each polarized beam emerging from the polarizing beam discriminator is input to a colour separating/combining prism for directing each primary colour to a respective reflective imaging element, said separating/combining prism combining the encoded primary colours and returning the encoded beam to the active face from which it emerged.

16. A projection display system as defined in claim 1, further comprising filter means for separating said input beam into three primary colours, a said polarizing beam discriminator for each said primary colour and spatial light modulator means for each primary colour, and means for combining the output beams from the polarizing beam discriminators into a common output beam for focussing onto said display means.

17. A projection display system as defined in claim 16 when dependent on any of claims 11 to 15, wherein the spatial light modulator means for each primary colour comprises a pair of reflective imaging devices, each imaging device of each pair being associated with the respective active face from which the beam it encodes emerges from the prism.

18. A projection display system as defined in claim 16 when dependent on any of claims 11 to 15, wherein the spatial light modulator means for each primary colour comprises a transmissive imaging device, and mirrors are provided to reflect each polarized beam emerging from the prism through the imaging device and back into the prism through the other active face from which it emerged.

19. A projection display system as defined in claim 11, wherein a different image corresponding to the left and right eye view is encoded onto each polarized beam so as to create a 3-dimensional image that can be viewed with polarized glasses.

20. A projection display system as defined in claim 1, wherein said light source generates three primary colours which are sequentially transmitted to said spatial light modulator means.

21. A projection display system as defined in claim 20, wherein said light source comprises a source of white light and a colour wheel for sequentially transmitting each colour to the spatial light modulator means, said spatial light modulator means operating in synchronism with said colour wheel to generate a colour image.

22. A projection display system as defined in claim 20, wherein said light source comprises three light emitting diodes of different colour for sequentially transmitting each colour to the spatial light modulator means, said spatial light modulator means operating in synchronism with said colour wheel to generate a colour image.

23. A projection display system as defined in claim 20, wherein said light source comprises three lasers of different colour for sequentially transmitting each colour to the spatial light modulator means, said spatial light modulator means operating in synchronism with said colour wheel to generate a colour image.

24. A projection display system as defined in claim 1, wherein said spatial light modulator means comprise polymer dispersive liquid crystal displays (PDLCDs).

25. A projection display system as defined in claim 24, wherein said polymer dispersive liquid crystal displays (PDLCDs) associated with a quarterwave plate to rotate the plane of polarization of reflected light.

26. A projection display system as defined in claim 1, wherein said spatial light modulators comprise twisted nematic liquid crystal displays.

27. A projection display system as defined in claim 1, wherein said spatial light modulators comprise digital micromirrors, and a second said polarizing beam discriminator combines s and p polarized light reflected by said respective digital micromirrors into said output beam for focussing onto said display means.

* * * * *